US012784383B2

(12) United States Patent
Huang et al.

(10) Patent No.: US 12,784,383 B2
(45) Date of Patent: Nov. 3, 2026

(54) REPLAY OF INDUSTRIAL AUTOMATION SYSTEM OPERATIONS IN EXTENDED REALITY ENVIRONMENTS

(71) Applicant: ROCKWELL AUTOMATION TECHNOLOGIES, INC., Mayfield Heights, OH (US)

(72) Inventors: Yuhong Huang, Acton, MA (US); Thong T. Nguyen, New Berlin, WI (US); Jacek Jonda, Silesia (PL); Robert O. Bradford, Ajax (CA); Eric M. Gardner, Milwaukee, WI (US); Adam M. Shea, Fox Point, WI (US); Imthiaz Ahmed Aejaz Ahmed, Minneapolis, MN (US); Jonathan D. Hoffman, Milwaukee, WI (US); Jamie J. Cechvala, Wauwatosa, WI (US); Haithem Mansouri, East Setauket, NY (US); Ryan C. Gariepy, Kitchener (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 122 days.

(21) Appl. No.: 18/901,844

(22) Filed: Sep. 30, 2024

(65) Prior Publication Data

US 2026/0094385 A1 Apr. 2, 2026

(51) Int. Cl.

| | |
|---|---|
| ***G06T 19/00*** | (2011.01) |
| ***G02B 27/01*** | (2006.01) |
| ***G06T 15/20*** | (2011.01) |

(52) U.S. Cl.
CPC ............ *G06T 19/006* (2013.01); *G06T 15/20* (2013.01); *G02B 2027/014* (2013.01); *G02B 27/0172* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 10,185,848 | B2 | 1/2019 | Nguyen et al. |
| 10,388,075 | B2 | 8/2019 | Schmirler et al. |
| 10,395,072 | B2 | 8/2019 | Nguyen et al. |
| 10,534,940 | B2 | 1/2020 | Nguyen et al. |
| 10,535,202 | B2 | 1/2020 | Schmirler et al. |

(Continued)

OTHER PUBLICATIONS

U.S. Appl. No. 18/446,635.

*Primary Examiner* — Nurun Flora
(74) *Attorney, Agent, or Firm* — Foley & Lardner LLP

(57) ABSTRACT

A system for the replay of automation system operations in an extended reality environment with virtual objects using a display device having an at least partially transparent display. The system stores historical operational data. Upon entering a playback mode, the system generates virtual objects at historical locations representing the devices of the automation system. During playback sampled historical locations are delivered to the display device and the virtual object location is updated so that the automation system appears in motion. Interpolation may be performed between sampled device locations so improve playback speed or decrease the data that is stored. Automation system operations can be replayed in a smaller volume to allow the operator a holistic three-dimensional view of operations.

20 Claims, 39 Drawing Sheets

(56) References Cited

U.S. PATENT DOCUMENTS

| | | | |
|---|---|---|---|
| 10,832,548 | B2 | 11/2020 | Nguyen et al. |
| 10,846,492 | B2 | 11/2020 | Nguyen et al. |
| 10,866,631 | B2 | 12/2020 | Nguyen et al. |
| 10,942,577 | B2 | 3/2021 | Nguyen et al. |
| 10,964,104 | B2 | 3/2021 | Duffy et al. |
| 10,990,093 | B2 | 4/2021 | Gariepy et al. |
| 11,003,868 | B2 | 5/2021 | Nguyen et al. |
| 11,225,275 | B2 | 1/2022 | Gariepy et al. |
| 11,265,513 | B2 | 3/2022 | Schmirler et al. |
| 11,347,304 | B2 | 5/2022 | Nguyen et al. |
| 11,500,915 | B2 | 11/2022 | Nguyen et al. |
| 11,520,317 | B2 | 12/2022 | Tremblay et al. |
| 11,586,852 | B2 | 2/2023 | Nguyen et al. |
| 11,609,345 | B2 | 3/2023 | Nguyen et al. |
| 11,651,528 | B2 | 5/2023 | Nguyen et al. |
| 11,669,156 | B2 | 6/2023 | Nguyen et al. |
| 11,688,107 | B2 | 6/2023 | Nguyen et al. |
| 11,829,126 | B2 | 11/2023 | Nguyen et al. |
| 11,868,122 | B2 | 1/2024 | Schmidt et al. |
| 11,872,706 | B2 | 1/2024 | Cantor et al. |
| 2021/0095973 | A1* | 4/2021 | Simard .............. G01C 21/3438 |
| 2021/0263168 | A1 | 8/2021 | Nguyen et al. |
| 2021/0311475 | A1 | 10/2021 | Gariepy et al. |
| 2021/0342388 | A1 | 11/2021 | Nguyen et al. |
| 2023/0071455 | A1 | 3/2023 | Malkan et al. |
| 2023/0089616 | A1* | 3/2023 | Araújo ...................... G06T 7/50 348/135 |
| 2023/0136597 | A1* | 5/2023 | Thiel ...................... H04N 7/157 345/419 |
| 2023/0305623 | A1* | 9/2023 | Bowman ................. G06F 3/012 |
| 2024/0108985 | A1* | 4/2024 | Terre .................... G02B 27/017 |
| 2024/0320743 | A1 | 9/2024 | Gustafson et al. |
| 2024/0375518 | A1 | 11/2024 | Huang et al. |
| 2025/0037345 | A1* | 1/2025 | Li ........................... A63F 13/55 |
| 2025/0054254 | A1* | 2/2025 | Kahan .................... G06V 20/20 |

* cited by examiner

REPLAY OF INDUSTRIAL AUTOMATION SYSTEM OPERATIONS IN EXTENDED REALITY ENVIRONMENTS

BACKGROUND

The present disclosure relates generally to the field of automation systems. More specifically the present disclosure relates to the field of the control, monitoring, troubleshooting, and optimization of automation systems using extended reality environments.

A large amount of data is available related to the control and monitoring of automations systems. Much of the available data cannot be viewed visually within the real world. The inability to view pertinent information of an automation system leads to difficulties and inefficiencies in controlling, monitoring, and troubleshooting the equipment. Additionally, non-intuitive displays and control equipment require highly trained personnel to operate and maintain the equipment.

SUMMARY

Some embodiments of the present disclosure relate to a system for monitoring and troubleshooting an automation system in an extended-reality environment with virtual objects using a display device having an at least partially transparent display. The system includes one or more memory devices having instructions stored thereon that, when executed by one or more processors, cause the one or more processors to perform operations. The operations include obtaining historical location data indicating historical locations for a portion of the automation system at a set of historical times. The operations also include causing the display device to display the virtual objects representing the portion of the automation system on the at least partially transparent display such that the virtual objects appear at locations in the extended-reality environment based on the historical location data for a first historical time when viewed from a changing viewer perspective through the at least partially transparent display. The operations also include updating the locations at which the virtual objects appear in the extended-reality environment based on the historical location data for subsequent historical times such that the virtual objects appear to be moving between the historical locations in the extended-reality environment.

In some embodiments, the locations are updated at a rate such that time appears to progress faster or slower than real time.

In some embodiments, the operations also include storing a time of an event of interest. The locations are updated at the rate such that time appears to progress slower than real time for a time period proximate the time of the event.

In some embodiments, the operations also include storing a set of times of events of interest and receiving, from a viewer, a selected time of the set of times for which to provide the historical location data.

In some embodiments, the operations also include interpolating between stored samples of the historical location data to determine the locations at which the virtual objects appear in the extended-reality environment.

In some embodiments, the interpolating includes at least one of linear interpolation, spline interpolation, curve fitting, or using a dynamic system model to obtain best estimates of the locations.

In some embodiments, the extended-reality environment includes real-world devices displayed at current locations and the virtual objects displayed at the historical locations. The operations also include indicating the real-world devices of the extended-reality environment that are not updated based on the historical location data.

In some embodiments, the extended-reality environment includes a fixed volume that appears to remain in a fixed location in the extended-reality environment when viewed from the changing viewer perspective through the at least partially transparent display. The virtual objects appear to remain within the fixed volume of the extended-reality environment as the virtual objects move between the historical locations and are shown from a perspective of a virtual camera that moves between the historical locations along with the virtual objects.

In some embodiments, the extended-reality environment includes a fixed volume that appears to remain in a fixed location in the extended-reality environment when viewed from the changing viewer perspective through the at least partially transparent display. The virtual objects are positioned within the fixed volume in the extended-reality environment and a location of the fixed volume differs from an actual location of the portion of the automation system represented by the virtual objects in the fixed volume.

Some embodiments of the present disclosure relate to one or more non-transitory computer-readable storage media having instructions stored thereon that, when executed by one or more processors, cause the one or more processors to obtain historical location data indicating historical locations for a portion of an automation system at a set of historical times. The instructions also cause the one or more processors to cause a display device to display virtual objects representing the portion of the automation system on an at least partially transparent display such that the virtual objects appear at locations in an extended-reality environment based on the historical location data for a first historical time when viewed from a changing viewer perspective through the at least partially transparent display. The instructions also cause the one or more processors to update the locations at which the virtual objects appear in the extended-reality environment based on the historical location data for subsequent historical times such that the virtual objects appear to be moving between the historical locations in the extended-reality environment.

In some embodiments, the locations are updated at a rate such that time appears to progress faster or slower than real time.

In some embodiments, the instructions causing the one or more processors to store a time of an event of interest. The locations are updated at the rate such that time appears to progress slower than real time for a time period proximate the time of the event.

In some embodiments, the instructions causing the one or more processors to store a set of times of events of interest and receiving, from a viewer, a selected time of the set of times for which to provide the historical location data.

In some embodiments, the instructions causing the one or more processors to interpolate between stored samples of the historical location data to determine the locations at which the virtual objects appear in the extended-reality environment.

In some embodiments, the interpolating includes at least one of linear interpolation spline interpolation, curve fitting, or a simulation of the portion of the automation system.

In some embodiments, the instructions also cause the one or more processors to indicate, on the at least partially transparent display, real-world devices of the extended-reality environment that are not updated based on the historical location data.

In some embodiments, the extended-reality environment includes a fixed volume that appears to remain in a fixed location in the extended-reality environment when viewed from the changing viewer perspective through the at least partially transparent display. The virtual objects appear to remain within the fixed volume of the extended-reality environment as the virtual objects move between the historical locations and are shown from a perspective of a virtual camera that moves between the historical locations along with the virtual objects.

Some embodiments of the present disclosure relate to a system for monitoring and troubleshooting an automation system in a virtual-reality environment with virtual objects on a headset display device. The system includes one or more memory devices having instructions stored thereon that, when executed by one or more processors, cause the one or more processors to perform operations. The operations include causing the headset display device to display the virtual objects representing a portion of the automation system on the headset display device such that the virtual objects appear at locations in the virtual-reality environment based on historical location data. The operations also include interpolating between stored samples of the historical location data to determine the locations at which the virtual objects appear. The operations also include updating the locations at which the virtual objects appear based on subsequent historical location data.

In some embodiments, the locations are updated at a rate such that time appears to progress faster or slower than real time.

In some embodiments, the operations further also include storing a time of an event of interest. The locations are updated at the rate such that time appears to progress slower than real time for a time period proximate the time of the event.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Overview

Figure 1:
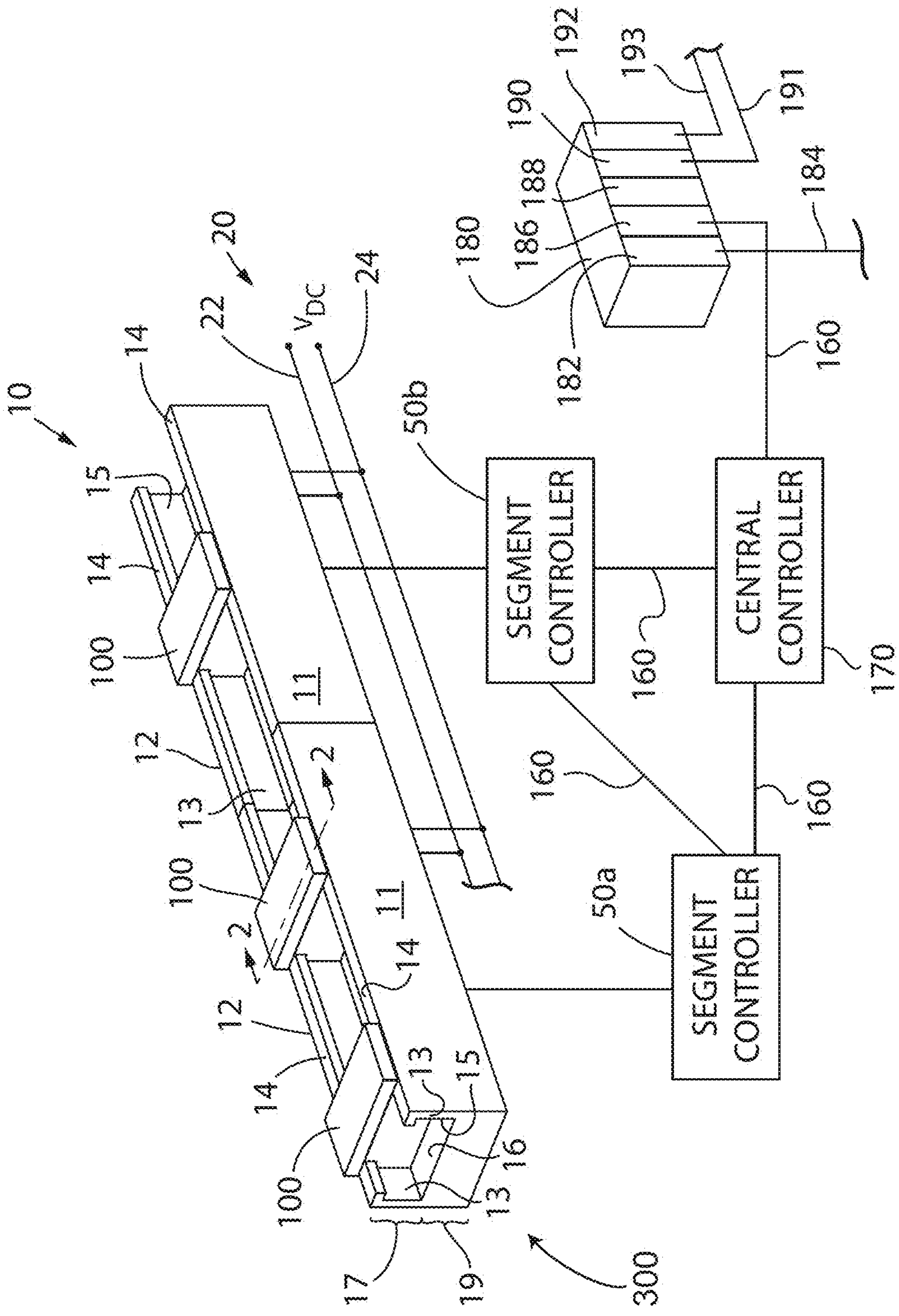
FIG. 1 is a schematic representation of an exemplary control system for a linear drive system, according to some embodiments.

Referring generally to the FIGURES systems and methods to generate extended reality (XR) environments are shown. Various XR environments are described along with the hardware and software configured to generate the XR environments. Virtual objects of a XR environment may be presented on a XR enabled display device. The virtual objects may be displayed on an at least partially transparent display so that the virtual objects appear to be anchored (e.g., embedded, inserted, integrated, etc.) in the real-world at a virtual object location when viewed through the at least partially transparent display.

Virtual objects can enrich the automation system environment with additional information, human-machine interfaces, and other control related information that is not available in the real-word or cannot be easily viewed visually in the real world. XR environments generated by the systems and methods described herein may be used to troubleshoot equipment (e.g., by visual peer analysis non-visual attributes, slower than real-time three-dimensional replays, etc.); monitor equipment with skins and overlays representing non-visual operating conditions; optimize automation systems by viewing three-dimensional simulations anchored with the real-world automation system or viewing system constraints visually; and control the system by providing control panels that can be moved nearer a monitoring location or can be used to control a mobile system. The systems and methods can be applied to a general set of automation systems, devices, and components, including, but not limited to independent cart technology, motors and motor drives, and autonomous mobile robots.

Independent Cart Technology

Referring to FIGS. 1-4, a transport system (e.g., a linear drive system 300, an induction drive system, etc.) for moving articles or products includes a track 10 having multiple segments 12. In some embodiments, multiple segments 12 are coupled with each other and arranged end-to-end (e.g., serially) to define the overall track configuration. The segments 12 may be straight segments having generally the same length. In some embodiments, the segments 12 have various sizes, lengths, and shapes and can be coupled with each other to form the track 10 according to a desired shape (e.g., an elliptical path, a circular path, etc.). In some embodiments, track segments 12 may be coupled with each other to form a generally closed loop that supports one or more movers 100 (e.g., carts, trains, movable blocks, etc.) that are movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The width of the track 10 may be greater in either the horizontal or vertical direction according to application requirements. The movers 100 will travel along the track and take various orientations according to the configuration of the track 10 and the relationships discussed herein may vary accordingly.

According to some embodiments, each track segment 12 includes an upper portion 17 and a lower portion 19. The upper portion 17 is configured to couple with (e.g., slidably, translatably, etc.) and support the movers 100, according to some embodiments. In some embodiments, the lower portion 19 is configured to house one or more control elements. In some embodiments, the upper portion 17 includes a generally u-shaped channel 15 extending longitudinally along the upper portion 17 of each segment. The channel 15 includes a bottom surface 16 and a pair of side walls 13, according to some embodiments. In some embodiments, each side wall 13 includes a rail 14 extending along an upper edge of the side wall 13. The bottom surface 16, side walls 13, and rails 14 may extend longitudinally along the track segment 12 and define a guideway along which the movers 100 travel. In some embodiments, the surfaces of the channel 15 (i.e., the bottom surface 16, side walls 13 and rails 14) are planar surfaces made of a low friction material along which movers 100 may slide. In some embodiments, the contacting surfaces of the movers 100 may also be planar and made of a low friction material. In some embodiments, the surface may be, for example, nylon, Teflon®, aluminum, stainless steel, etc. In some embodiments, the contacting surfaces of the movers 100 are provided as a slidable bearing which may degrade over time. In some embodiments, the hardness of the surfaces on the track segment 12 are greater than the contacting surface of the movers 100 such that the contacting surfaces of the movers 100 wear faster than the surface of the track segment 12. In some embodiments, the contacting surfaces of the movers 100 may be removably mounted to the housing 11 of the mover 100 such that they may be replaced if the wear exceeds a predefined amount. In some embodiments, the movers 100 may include low-friction rollers to engage the surfaces of the track segment 12. The low-friction rollers may include bearings. In some embodiments, the surfaces of the channel 15 may include different cross-sectional forms with the mover 100 including complementary sectional forms. In some embodiments, the track segment 12 and mover have other combinations of shapes and construction such that the mover 100 can interface with (e.g., rest upon, hang upon, etc.) the track segments 12 and travel along the track segments 12.

In some embodiments, each mover 100 is configured to slide along the channel 15 as it is propelled by a linear drive system 300. The mover 100 includes a body 102 configured to fit within the channel 15, according to some embodiments. The body 102 includes a lower surface 106, configured to engage the bottom surface 16 of the channel, and side surfaces 108 configured to engage the side walls 13 of the channel, according to some embodiments. In some embodiments, the mover 100 further includes a shoulder 105 extending inward from each of the side surfaces 108. In some embodiments, the shoulder 105 has a width equal to or greater than the width of the rail 14 protruding into the channel. In some embodiments, a neck of the mover extends upward to a top surface 104 of the body 102. In some embodiments, the neck extends for the thickness of the rails such that the top surface 104 of the body 102 is generally parallel with the upper surface 32 of each rail 14. In some embodiments, the mover 100 further includes a platform 110 secured to the top surface 104 of the body 102. In some embodiments, the platform 110 is generally square and the width of the platform 110 is greater than the width between the rails 14. In some embodiments, the lower surface 114 of the platform 110, an outer surface of the neck, and an upper surface of the shoulder 105 define a channel 115 in which the rail 14 runs. In some embodiments, the channel 115 serves as a guide to direct the mover 100 along the track. In some embodiments, one or more platforms or attachments of various shapes may be secured to the top surface 104 of the body 102. Further, various workpieces, clips, fixtures, and the like may be mounted on the top 112 of each platform 110 for engagement with a product to be carried along the track by the mover 100. The platform 110 and any workpiece, clip, fixture, or other attachment present on the platform may define, at least in part, a load present on the mover 100.

Figure 3:
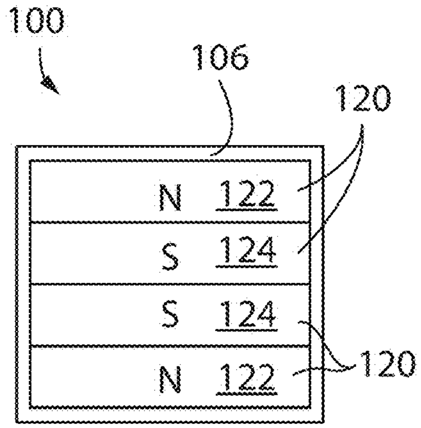
FIG. 3 is a bottom plan view of the mover of FIG. 2, according to some embodiments.
Figure 4:
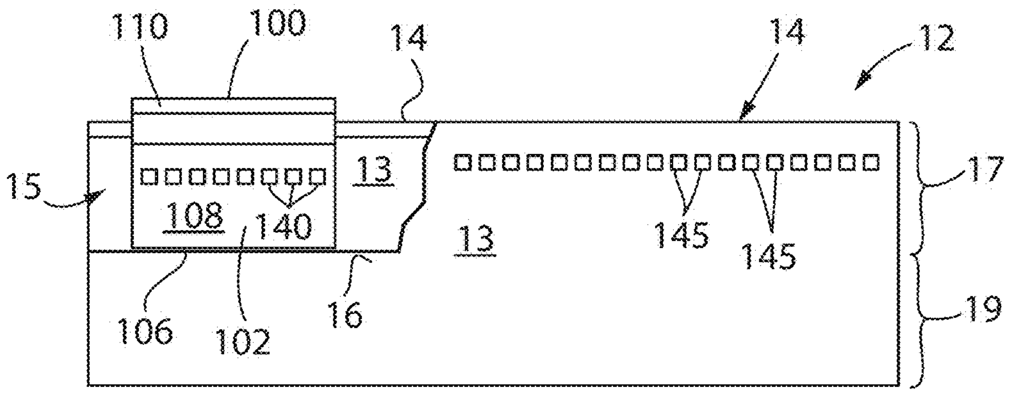
FIG. 4 is a partial side cutaway view of the mover and track segment of FIG. 2, according to some embodiments.

The mover 100 is induced or driven to move (e.g., travel) along the track 10 by a linear drive system 300, according to some embodiments. The linear drive system 300 is incorporated in part on each mover 100 and in part within each track segment 12, according to some embodiments. One or more drive magnets 120 are mounted to each mover 100. With reference to FIG. 3, the drive magnets 120 are arranged in a block on the lower surface of each mover. The drive magnets 120 include positive magnet segments 122, having a north pole, N, facing outward from the mover and negative magnet segments 124, having a south pole, S, facing outward from the mover, according to some embodiments. In some embodiments, two positive magnet segments 122 are located on the outer sides of the set of magnets and two negative magnet segments 124 are located between the two positive magnet segments 122. In some embodiments, the positive and negative motor segments are placed in an alternating configuration. In some embodiments, a single negative magnet segment 124 may be located between the positive magnet segments 122. Various other configurations of the drive magnets 120 may be utilized according to some embodiments. In some embodiments, the positive magnet segments 122 are half-width magnets while the negative magnet segments 124 are full width magnets. While FIG. 3 illustrates a single cycle magnet array, the mover 100 may also or alternatively be driven to move along the track 10 by drive magnets 120 arranged in a two cycle array (e.g., a stack of magnets alternating between full north pole, N, magnets and half segment south pole, S, magnets).

Figure 5:
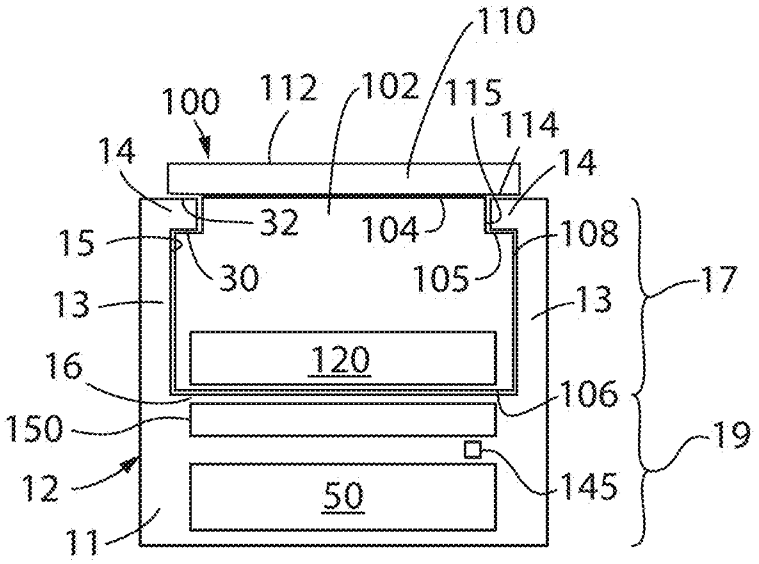
FIG. 5 is a sectional view of another embodiment of a mover and track segment included in the linear drive system taken at 2-2 of FIG. 1, according to some embodiments.

The linear drive system 300 further includes a series of coils 150 spaced along the length of the track segment 12. With reference also to FIG. 5, the coils 150 may be positioned within a housing 11 for the track segment 12 and below the bottom surface 16 of the channel 15. The coils 150 are energized sequentially according to the configuration of the drive magnets 120 present on the movers 100. The sequential energization of the coils 150 generates a moving electromagnetic field that interacts with the magnetic field of the drive magnets 120 to propel each mover 100 along the track segment 12.

Figure 2:
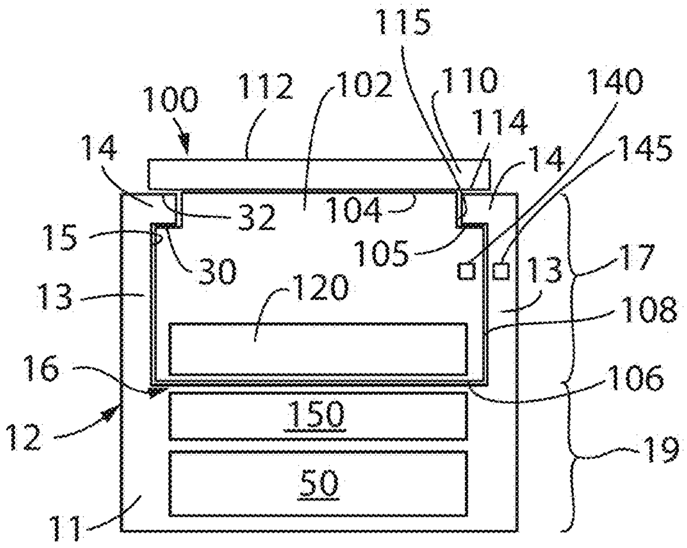
FIG. 2 is a sectional view of a mover and track segment included in the linear drive system taken at 2-2 of FIG. 1, according to some embodiments.

A segment controller 50 is provided within each track segment 12 to control the linear drive system 300 and to achieve the desired motion of each mover 100 along the track segment 12. Although illustrated in FIG. 1 as blocks external to the track segments 12, the arrangement is to facilitate illustration of interconnects between controllers. As shown in FIG. 2, it is contemplated that each segment controller 50 may be mounted in the lower portion 19 of the track segment 12. A first segment controller 50*a* is shown with a first track segment, and a second segment controller 50*b* is shown with a second track segment. It is contemplated that any number "n" of segment controllers 50*n* (see FIG. 8) may be included in the linear drive system 300. Each segment controller 50 is in communication with a central controller 170 which is, in turn, in communication with an industrial controller 180. The industrial controller may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 180 includes: a power supply 182 with a power cable 184 connected, for example, to a utility power supply; a communication module 186 connected by a network medium 160 to the central controller 170; a processor module 188; an input module 190 receiving input signals 191 from sensors or other devices along the process line; and an output module 192 transmitting control signals 193 to controlled devices, actuators, and the like along the process line. The processor module 188 may identify when a mover 100 is required at a particular location and may monitor sensors, such as proximity sensors, position switches, or the like to verify that the mover 100 is at a desired location. The processor module 188 transmits the desired locations of each mover 100 to a central controller 170 where the central controller 170 operates to generate commands for each segment controller 50.

Figure 8:
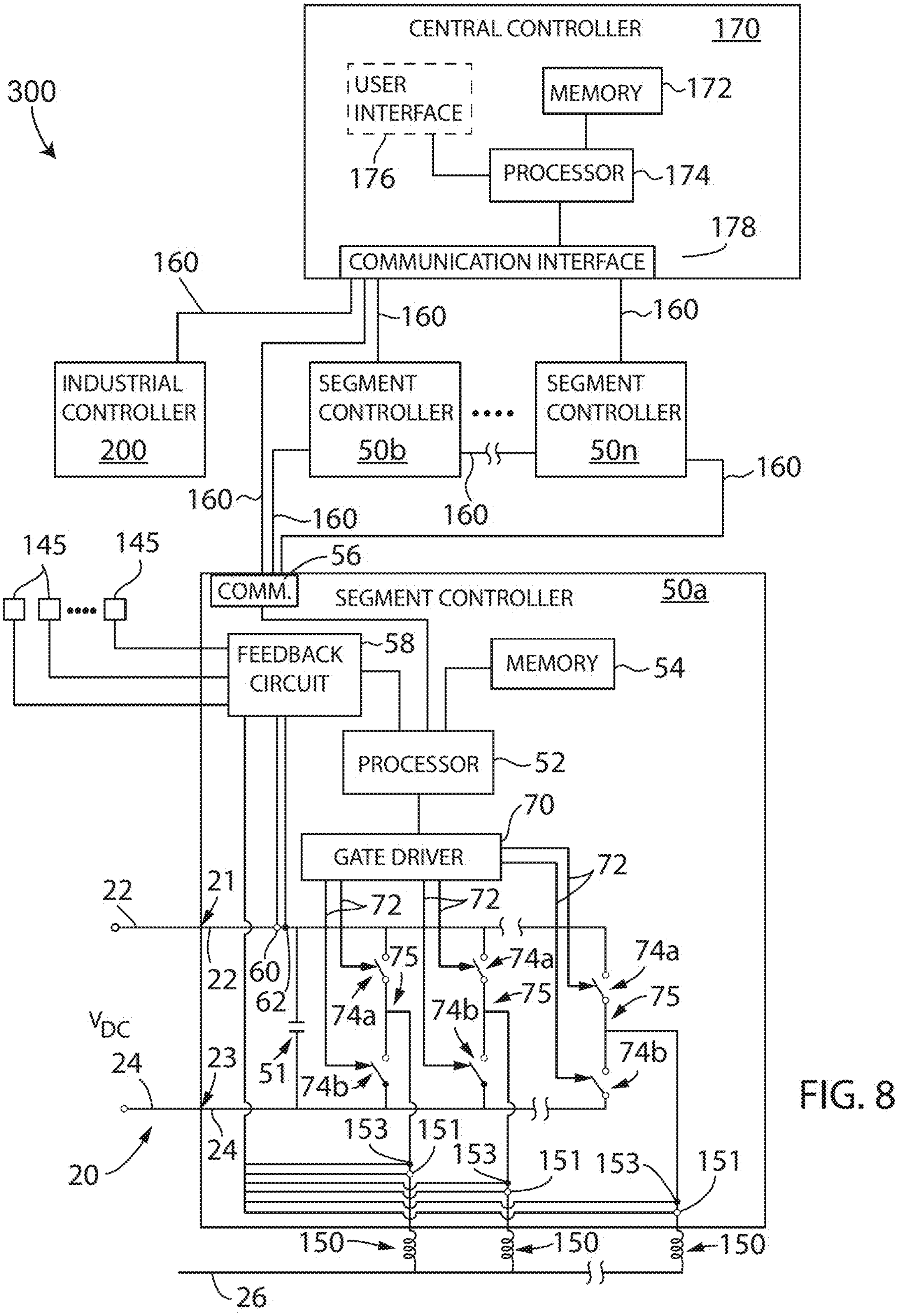
FIG. 8 is a block diagram representation of the control system of FIG. 1, according to some embodiments.

With reference also to FIG. 8, the central controller 170 includes a processor 174 and a memory device 172. It is contemplated that the processor 174 and memory device 172 may each be a single electronic device or formed from multiple devices. The processor 174 may be a microprocessor. In some embodiments, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. In some embodiments, the configuration may be performed via a remote device connected via a network and a communication interface 178 to the central controller 170. It is contemplated that the system controller 170 and user interface 176 may be a single device, such as a laptop, notebook, tablet or other mobile computing device. In some embodiments, the user interface 176 may include one or more separate devices such as a keyboard, mouse, display, touchscreen, interface port, removable storage medium or medium reader and the like for receiving information from and displaying information to a user. In some embodiments, the system controller 170 and user interface may be an industrial computer mounted within a control cabinet and configured to withstand harsh operating environments. In some embodiments, still other combinations of computing devices and peripherals may be utilized or incorporated into the system controller 170 and user interface 176. In some embodiments, user interface 176 includes an extended reality system to provide enhanced interface capability. In some embodiments, central control or a portion thereof may be implemented within a cloud computing architecture.

In some embodiments, the extended reality system (as described in more detail in a later section) provides an interface on an at least partially transparent display such that virtual objects of the interface appear to be anchored (e.g., embedded, inserted, integrated, etc.) in the physical environment of the viewer and may appear to remain at the same location as the viewer changes orientation and location (e.g., as they change their perspective). In some embodiments, extended reality system may provide interfaces on a tablet or other handheld devices overlayed on a visual display of the physical environment. Extended reality system may be used to provide an interface to configure an ICT system. For example, the track may be large, and the physical interface may be in a single location, the extended reality system may advantageously provide a virtual interface wherever the viewer is located; thus, allowing them to configure the system when monitoring different areas of the track. In some embodiments, mixed reality system may be used to provide rules of operation for the ICT track (e.g., speed limits around curves) or view calculations of behavioral limits (e.g., minimum safe stopping distance). In some embodiments, the extended reality system may overlay information regarding status, modes, or degradation (e.g., with a colored overlay) on the physical component within the extended reality environment to provide quick visual indication of faults or degradation.

The central controller 170 includes one or more programs stored in the memory device 172 for execution by the processor 174. The system controller 170 receives a desired position from the industrial controller 180 and determines one or more motion profiles for the movers 100 to follow along the track 10. A program executing on the processor 174 is in communication with each segment controller 50 on each track segment via a network medium 160. The system controller 170 may transfer a desired motion profile to each segment controller 50. In some embodiments, the system controller 170 may be configured to transfer the information from the industrial controller 180 identifying one or more desired movers 100 to be positioned at or moved along the track segment 12, and the segment controller 50 may determine the appropriate motion profile for each mover 100.

A position feedback system provides knowledge of the location of each mover 100 along the length of the track segment 12 to the segment controller 50. According to some embodiments, illustrated in FIGS. 2 and 4, the position feedback system includes one or more position magnets 140 mounted to the mover 100 and an array of sensors 145 spaced along the side wall 13 of the track segment 12. The sensors 145 are positioned such that each of the position magnets 140 are proximate to the sensor as the mover 100 passes each sensor 145. The sensors 145 are a suitable magnetic field detector including, for example, a Hall Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The feedback signal may be an analog signal provided to a feedback circuit 58 which, in turn, provides a signal to the processor 52 corresponding to the magnet 140 passing the sensor 145.

Figure 6:
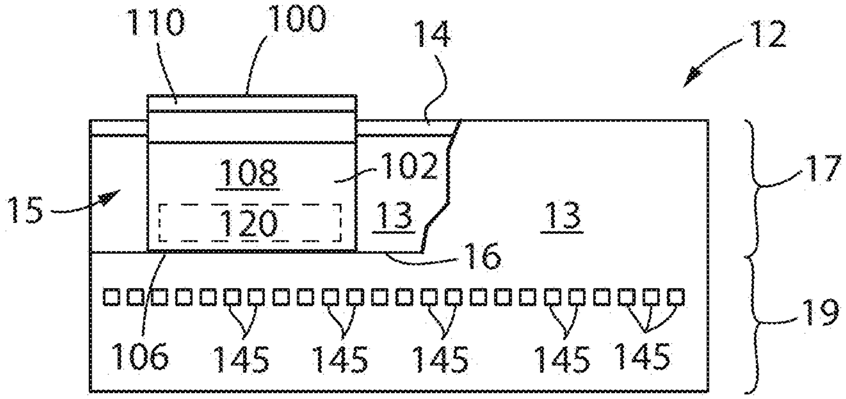
FIG. 6 is a partial side cutaway view of the mover and track segment of FIG. 5, according to some embodiments.
Figure 7:
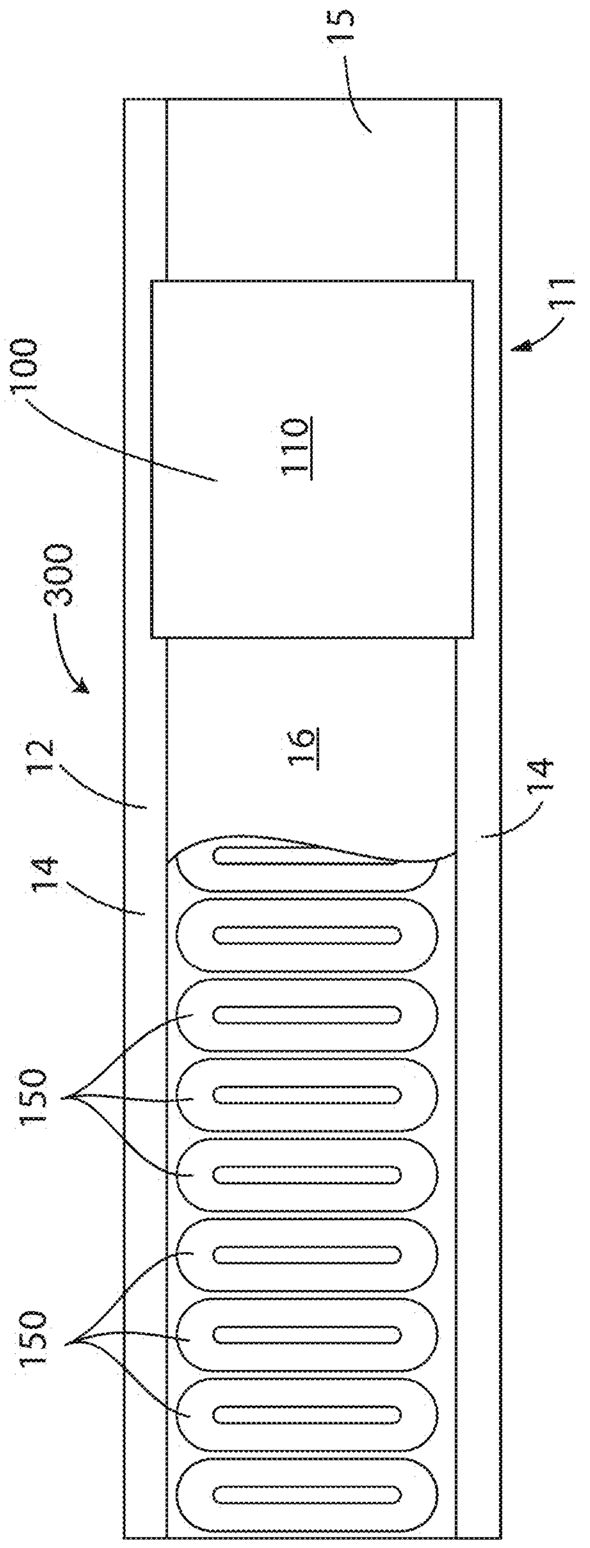
FIG. 7 is a partial top cutaway view of the mover and track segment of FIG. 2, according to some embodiments.

According to some embodiments, illustrated in FIGS. 5 and 6, the position feedback system utilizes the drive magnets 120 as position magnets. Position sensors 145 are positioned along the track segment 12 at a location suitable to detect the magnetic field generated by the drive magnets 120. According to the illustrated embodiment, the position sensors 145 are located below the coils 150. In some embodiments, the position sensors 145 may be interspersed with the coils 150 and located, for example, in the center of a coil or between adjacent coils. According to still another embodiment, the position sensors 145 may be positioned within the upper portion 17 of the track segment 12 and near the bottom surface 16 of the channel 15 to be aligned with the drive magnets 120 as each mover 100 travels along the tracks segment 12.

The segment controller 50 also includes a communication interface 56 that receives communications from the central controller 170 and/or from adjacent segment controllers 50. The communication interface 56 extracts data from the message packets on the industrial network and passes the data to a processor 52 executing in the segment controller 50. The processor may be a microprocessor. In some embodiments, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that system controller 30.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates the switching signals 72. In some embodiments, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. A DC bus 20 receives a DC voltage, VDC, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. In some embodiments, each track segment 12 may be configured to include a rectifier section (not shown) and receive an AC voltage input. The rectifier section in each track segment 12 may convert the AC voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 23 may be negative, such that the potential on the negative rail 24 is greater than the potential on the positive rail 22. Each of the voltage rails 22 and 24 are configured to conduct a DC voltage having a desired potential, according to application requirements. According to some embodiments, the positive rail 22 may have a DC voltage at a positive potential and the negative rail 24 may have a DC voltage at ground potential. In some embodiments, the positive rail 22 may have a DC voltage at ground potential and the negative rail 24 may have a DC voltage at a negative potential. According to some embodiments, the positive rail 22 may have a first DC voltage at a positive potential with respect to the ground potential and the negative rail 24 may have a second DC voltage at a negative potential with respect to the ground potential. The resulting DC voltage potential between the two rails 22 and 24 is the difference between the potential present on the positive rail 22 and the negative rail 24.

It is further contemplated that the DC supply may include a third voltage rail 26 having a third voltage potential. According to some embodiments, the positive rail 22 has a positive voltage potential with respect to ground, the negative rail 24 has a negative voltage potential with respect to ground, and the third voltage rail 26 is maintained at a ground potential. In some embodiments, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately providing positive or negative voltages to one the coils 150.

The power section in each segment controller 50 may include multiple legs, where each leg is connected in parallel between the positive rail 22 and the negative rail 24. According to the illustrated embodiment, three legs are shown. However, the number of legs may vary and will correspond to the number of coils 150 extending along the track segment 12. Each leg includes a first switching device **74*a* and a second switching device 74*b* connected in series between the positive rail 22 and the negative rail 24 with a common connection 75 between the first and second switching devices 74*a*, 74*b*. The first switching device 74*a* in each leg 221 may also be referred to herein as an upper switch, and the second switching device 74*b* in each leg 221 may also be referred to herein as a lower switch. The terms upper and lower are relational only with respect to the schematic representation and are not intended to denote any particular physical relationship between the first and second switching devices 74*a*, 74*b*. The switching devices 74 include, for example, power semiconductor devices such as transistors, thyristors, and silicon controlled rectifiers, which receive the switching signals 72 to turn on and/or off. Each of switching devices may further include a diode connected in a reverse parallel manner between the common connection 75 and either the positive or negative rail 22, 24**.

The processor 52 also receives feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. The energized coils 150 create an electromagnetic field that interacts with the drive magnets 120 on each mover 100 to control motion of the movers 100 along the track segment 12.

In operation, the load may vary on a mover 100 as the mover travels along the track. As previously discussed, the mover 100 includes a platform 110 secured to the top surface 104 of the body 102 of the mover 100. It is contemplated that platforms or attachments of various shapes may be secured to the top surface 104 of the body 102. Further, various workpieces, clips, fixtures, and the like may be mounted on the top of each platform 110 for engagement with a product to be carried along the track by the mover 100. The platform 110 and any workpiece, clip, fixture, or other attachment present on the platform may define, at least in part, a load present on the mover 100. For a given system, each mover 100 may have the same platform and/or attachments to uniformly interact with identical product being loaded on and off the mover 100. The product may constitute an additional load and may vary at different locations along a track. For example, a mover 100 may initially have no additional load present. At a first station, a container, such as a box, bottle, or the like may be loaded on to the mover 100. At a second station, product may be partially or fully loaded into the container. At additional stations, steps, such as additional loading, closing, labeling, and the like may be taken that further alter the load present on each mover. At a final station, the load may be removed and the mover 100 returns to the initial station. According to the exemplary application, the load varies along each section of track after additional packaging and/or product is placed on the mover 100. In addition, wear or damage on contacting surfaces, bearings, and the like may cause variations in the loading between movers 100 or variations in loading for a single mover over time.

In order to optimize performance of the linear drive system 300, it is desirable to characterize loads present on the movers 100 at various locations along the track. According to some embodiments, the segment controller 50 may be configured to provide a characterization of a load present on each mover 100 as it travels along the corresponding track segment 12. The mover 100 is initially positioned at a point of interest along a track segment 12. The expected load to be present on the mover 100 may also be included on the mover. For example, if a container and/or product is present on the mover 100 during operation, an appropriate container and/or product may be loaded on the mover 100 prior to characterization. As will be discussed in more detail below, the segment controller 50 then executes a characterization module to obtain a frequency response corresponding to performance of a mover 100 at a location and with an expected load. In some embodiments, the segment controller 50 may sample data and transmit stored data to the central controller 170 or to another remote processing device to obtain the frequency response corresponding to performance of the mover 100 at a location and with an expected load.

Figure 9:
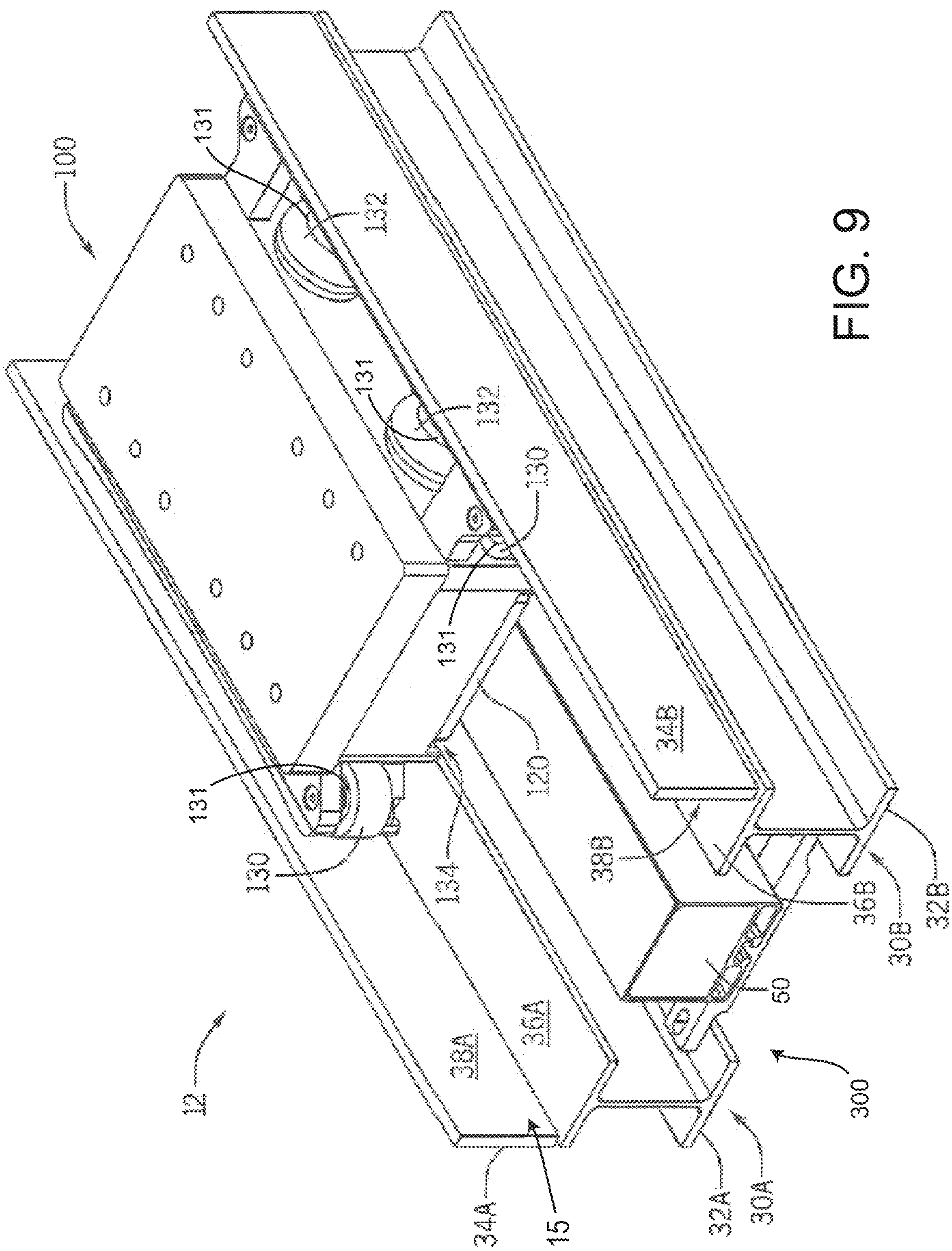
FIG. 9 is a perspective view of a mover for the linear drive system of FIG. 1, according to some embodiments.

Referring to FIG. 9, the mover 100 may include wheels 130, 132 configured to roll along one or more surfaces (e.g., both a horizontal surface and a vertical surface). For example, a first set of wheels 130 may mounted horizontally and configured to engage inner, vertical surfaces 38A and 38B of rails 30A and 30B of the track segments 12 (e.g., on guiding segments 34A and 34B of rails 30A and 30B). A second set of wheels 132 may be mounted vertically and configured to engage inner, horizontal surfaces 36A and 36B of each of the rails 30A and 30B. In some embodiments, the two sets of wheels 132 are used to align the mover 100 within the channel 15 of the track segment 12 as the mover 100 travels along the track 10. In some embodiments, only one set of wheels 132 are used to facilitate transportation of the mover 100 along the track 10. In some embodiments, the wheels 132 and 130 each include a corresponding bearing 131 that is configured to facilitate improved rotation of the wheels 132 and 130.

Referring to FIGS. 1-9, the track 10, the linear drive system 300, a control system for the linear drive system 300, any of the movers 100 of the linear drive system 300, or any diagnostic techniques for the linear drive system 300 may be the same as or similar to U.S. application Ser. No. 15/702,983, now U.S. Pat. No. 11,165,372 B2, U.S. application Ser. No. 15/710,977, now U.S. Pat. No. 10,442,637 B2, U.S. application Ser. No. 16/015,699, now U.S. Pat. No. 10,432,117 B1, U.S. application Ser. No. 15/701,578, now U.S. Pat. No. 10,562,715 B2, and/or U.S. application Ser. No. 17/355,714, the entire disclosures of all of which are incorporated by reference herein.

Autonomous Mobile Robots

Figure 10:
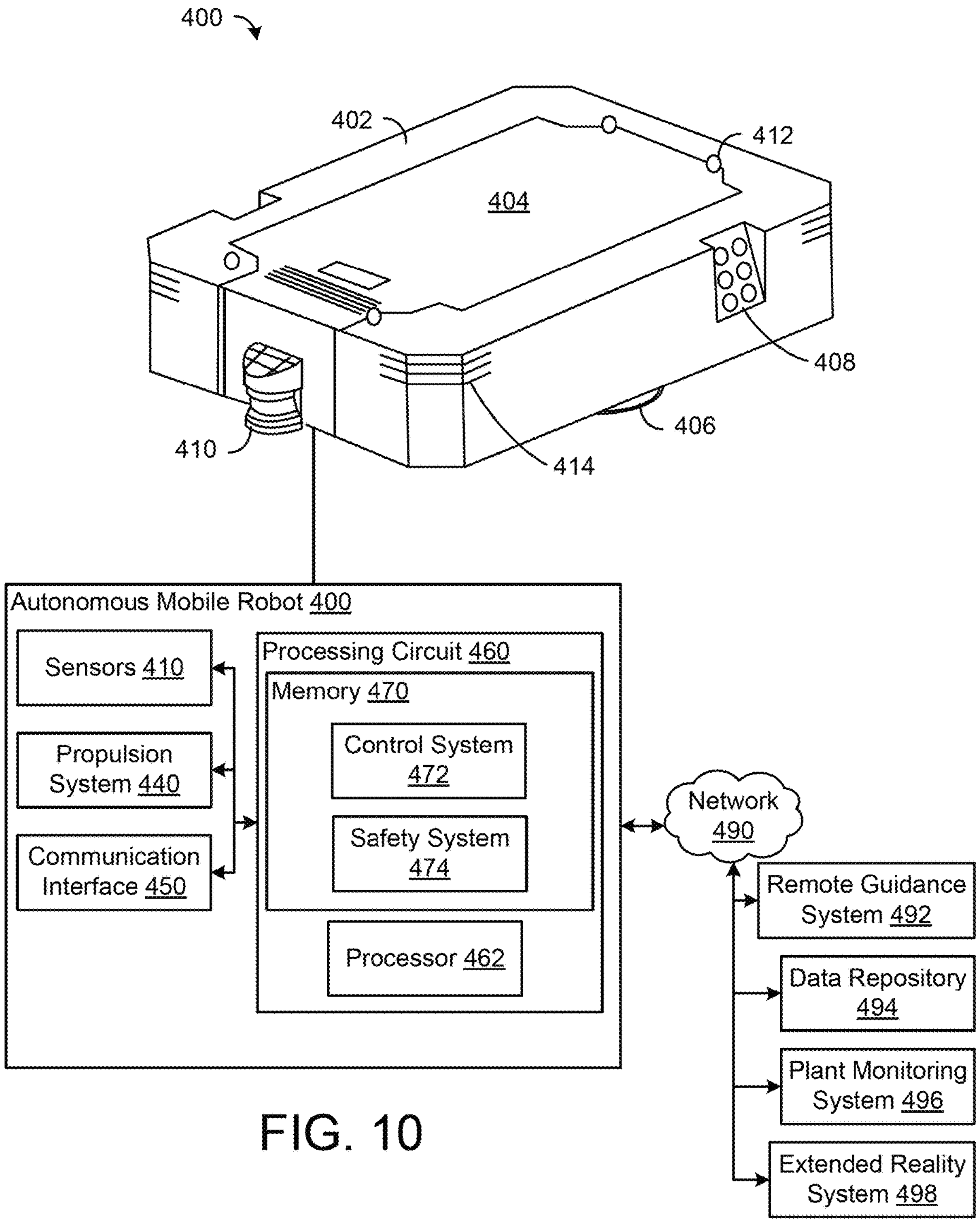
FIG. 10 is an autonomous mobile robot with a block diagram of a control system, according to some embodiments.

Some embodiments of the present disclosure relate to autonomous mobile robots (AMRs). Referring to FIG. 10, an implementation of autonomous mobile robot 400 is shown according to some embodiments. AMR 400 is depicted as a terrestrial robot; however, in some embodiments AMRs could include robots configured to move through the air or over water. In some embodiments, AMR 400 includes chassis 402 to generally contain or support various other components of AMR 400. In some embodiments, AMR 400 includes load-bearing surface 404 for carrying one or more items. In some embodiments, load-bearing surface 404 may raise and lower in order to load load-bearing surface 404 with items from a stall or loading area. In some embodiments, AMR 400 includes anchor points (e.g., anchor point 412). Anchor points may be used in order to tie down or otherwise secure a load to the AMR. In some embodiments, AMR 400 includes wheel 406 as part of propulsion system 440. Propulsion system 440 may be configured to propel or generally move the vehicle within its environment, whether it be on land, in the air, or on water. In some embodiments, AMR 400 includes control panel 408 for user input and indicator lights 414 to indicate certain statuses or modes to other occupants of the environment of AMR 400. In some embodiments, AMR 400 includes sensors 410. Sensors 410 may include any type of sensor necessary for the AMR 400 to perform its function (e.g., to navigate its environment and to interact with its payloads). In some embodiments, sensors 410 may include a global position system (GPS), monocular cameras, stereo cameras or other cameras capable of directly resolving depth, light detection and ranging (LIDAR) sensors, accelerometers, inertial measurement units (IMU), gyroscopes, sound navigation and ranging sensors (SONAR), hall effect sensors, or any other sensor or sensing systems.

Figure 11:
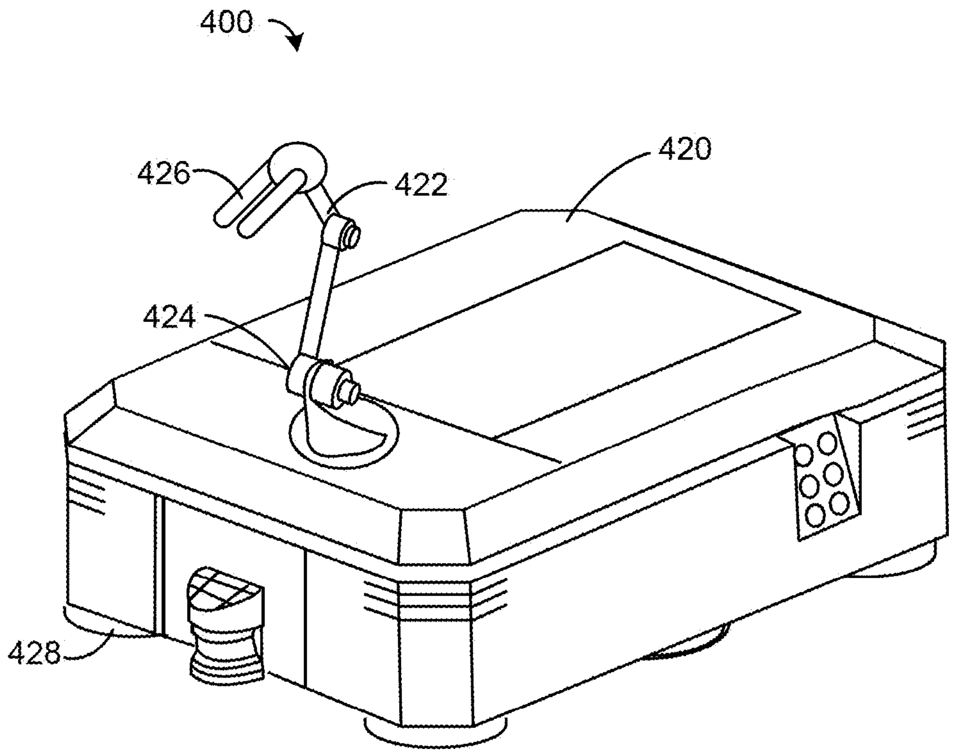
FIG. 11 is another autonomous mobile robot, according to some embodiments.

Referring to FIG. 11, a second implementation of autonomous mobile robot 400 is shown according to some embodiments. In some embodiments, AMR 400 may provide additional functionality through attachments (e.g., arm attachment 420). Attachment 420 may provide additional sensors and actuators required to perform the new functionality. For example, attachment 420 may include a robot arm including servos (e.g., servo motor 424), arm members and joints (e.g., member 422), or picker 426. AMR 400 may also include raisable feet (e.g., foot 428) to provide a sturdy base while performing any function.

With reference to FIG. 10, AMR 400 is shown to include processing circuit 460 and communications interface 450 according to some embodiments. In some embodiments, communications interface 450 is used to provide communicable connectivity over network 490 to various remote applications. Remote applications may include remote guidance system 492, data repository 494, plant monitoring system 496, or extended reality system 498. In some embodiments, processing circuit 460 contains memory 470 and processors (e.g., processor 462) to perform on-board processes (e.g., control system processes and or safety processes). The processors may be a general purpose or specific purpose processors, an application specific integrated circuit (ASIC), one or more field programmable gate arrays (FPGAs), a group of processing components, other suitable processing components or a combination thereof. The processors may be configured to execute computer code and/or instructions stored in the memories or received from other computer readable media (e.g., CDROM, network storage, a remote server, etc.). The memories can include one or more devices (e.g., memory units, memory devices, storage devices, etc.) for storing data and/or computer code for completing and/or facilitating the various processes described in the present disclosure. Memory 470 may include random access memory (RAM), read-only memory (ROM), hard drive storage, temporary storage, non-volatile memory, flash memory, optical memory, or any other suitable memory for storing software objects and/or processor instructions. Memory 470 may include database components, object code components, script components, or any other type of information structure for supporting the various activities and information structures described in the present disclosure. Memory 470 can be communicably connected to the processors and can include computer code for executing (e.g., by the processors) one or more processes described herein.

In some embodiments, memory 470 includes instructions for on-board processes (e.g., control systems 472 and safety system 474). For example, AMR 400 may receive a task and a path to get to the location of the task from remote guidance system 492, or determine the task and/or path itself using control systems 472. Control systems 472 may be responsible for executing that path by, for example, using propulsion system 440 to bring the AMR 400 up to speed and turning the wheels. Safety system 474 may be continuously monitoring the environment for obstacles (e.g., humans, animals, packages, shelves, etc.) that remote system did not consider or have up to date information when computing the path. If an obstacle is detected, control system 472 may determine a path around the obstacle and rejoin the original path being followed and/or request a new path from remote guidance system 492. It is noted that the various subsystems shown as configured on the AMR 400 or processes shown performed on the AMR 400 may, in some embodiments, be configured on or performed on a remote system (e.g., on-site remote system, off-site remote system, or cloud). Similarly, any subsystems configured on a remote system or process performed on a remote system may, in some embodiments, be configured on or performed on the AMR 400. In some embodiments, any distribution of the subsystems across the AMR 400 and the remote systems may be used including a distribution that has all instructions stored and executed on the AMR 400 or a distribution that has all instructions stored and executed on remote systems.

In some embodiments, remote applications or systems which can interact with AMR 400 include remote guidance system 492, data repository 494, plant monitoring system 496, or extended reality system 498. In some embodiments, data repository 494 is configured to receive and store data required to recreate the operations of the AMR 400. For example, data repository 494 may include periodic or aperiodic samples of the location, orientation, and velocity of AMRs (e.g., AMR 400). In some embodiments, data repository 494 may include samples of the modes or states of the AMRs (e.g., idle, charging, executing task, etc.) and/or may include samples of the various measurements obtained from sensors 410 or calculations based on the various measurements. In some embodiments, data repository 494 may include data regarding interactions with AMRs. For example, AMR 400 data repository may include an indication of a "check-out" (e.g., a plant operator reserving the right to configure the AMR 400 and preventing others from also configuring the AMR 400 at the same time) of AMR 400.

In some embodiments, plant monitoring system 496 may be configured to receive data from data repository 494 and/or AMR 400 to monitor the operations of the AMR 400. For example, AMR 400 may take a time to get from one task location to another or otherwise be out of site of a plant operator; plant monitoring system 496 may be used to check the status, mode, operations, etc. of AMR 400. In some embodiments, plant monitoring system 496 may be configured to perform calculations to determine the degradation or wear of AMR 400 or any component thereof. For example, plant monitoring system 496 may calculate the time since the last time the lift system was lubricated, the number of charge/discharge cycles the battery has undergone, or the current energy storage capacity of the battery for display to a plant operator. Plant monitoring system 496 may provide an additional human-machine interface (HMI) to provided additional configurations relative to control panel 408, and or to provide remote interactions when the user is not in the proximity of the AMR 400. Plant monitoring system 496 may provide functionality that allows an operator to change a task, check out the AMR 400, provide new operating parameters, view the expected path of the AMR 400, or otherwise interact with the AMR 400 or any of its onboard or remote systems (including remote guidance system 492).

In some embodiments, remote applications include remote guidance system 492. Remote guidance system 492 may be configured to provide supervisory control for AMR 400. For example, remote guidance system may provide a path for AMR 400 to follow to get to a task location. The path may include a trajectory that allows AMR 400 to navigate around various obstacles within its environment. In some embodiments, the path provided may be subject to various constraints on the behavior of the AMR 400. For example, the path may adhere to various "rules of the road" defined for the environment of the AMR 400. A rule of the road may include boundaries of a manufacturing plant that the AMR 400 is operating within; speed limits and/or mandatory pauses at various locations within the plant; indications of which AMR 400 has the right of way at various locations; or any other rule that is used to constrain the behavior of the AMR 400. In some embodiments, remote guidance system 492 performs an optimization routine to determine a good path to provide to AMR 400. In some embodiments, the optimization routine is performed by control system 472. Optimization may be performed by conventional techniques including model predictive control, gradient decent, non-linear programming, or mixed integer non-linear programming; simulated biological/physical behaviors including genetic algorithms, particle swarm optimization, simulated annealing, or ant colony optimization; and artificial intelligence methods including convolutional neural networks, recurrent neural networks, reinforcement learning, or transformer networks. In some embodiments, the optimization is performed subject to constraints defined by the rules of the road and/or other behavioral limitations of the AMR 400 within an environment. In some embodiments, the optimization may be performed for a fleet of AMRs simultaneously. Advantageously, allowing remote guidance system 492 to prevent the path of an AMR 400 from interfering with the path of another AMR 400. In some embodiments, the path is generated for each AMR 400 individually and if second AMR interferes with the path the AMR 400 will use onboard control systems to maneuver around the second AMR or will request a modified path from remote guidance system 492.

In some embodiments, remote applications include extended reality system 498. Extended reality system 498 will be described in more detail in the present disclosure. Some features of extended reality system 498 may be provided by a mixed reality system and may be used to provide another interface for AMRs or a fleet of AMRs (e.g., including AMR 400) on an at least partially transparent display to allow for virtual objects (e.g., projections on the display) to appear as though they are anchored (e.g., embedded, inserted, integrated, etc.) in the physical environment. For example, mixed reality system may provide a convenient interface for configuring the AMR 400, providing a new task, or viewing the expected trajectory of the AMR 400. Mixed reality system may provide the advantage of interacting with the interface anchored within the physical environment. For example, by providing a representation of a control panel within the mixed reality environment that has a familiar look for the operator, but would be difficult to provide on a device such as an AMR 400. In some embodiments, extended reality system 498 may provide interfaces on a tablet or other handheld device overlaid on a video display of the physical environment. In some embodiments, extended reality system 498 may be configured to allow the user to adjust the rules of the road through communication with AMR 400 or with remote guidance system 492. In some embodiments, mixed reality system may provide an immersive three-dimensional playback of the operations of a plant. In some embodiments, extended reality system 498 may be configured to provide various overlays (as seen through the partially transparent display) on AMRs (e.g., AMR 400) that provide information about the status, mode, or degradation of the AMR 400 or component thereof. For example, the mixed reality system may provide a red overlay to indicate a fault or significant degradation within an AMR 400.

Motors and Drives

Motors are generally used to move items within an automation system. For example, motors can run a conveyor or to run a pump that compresses fluid in a hydraulic system.

Figure 12:
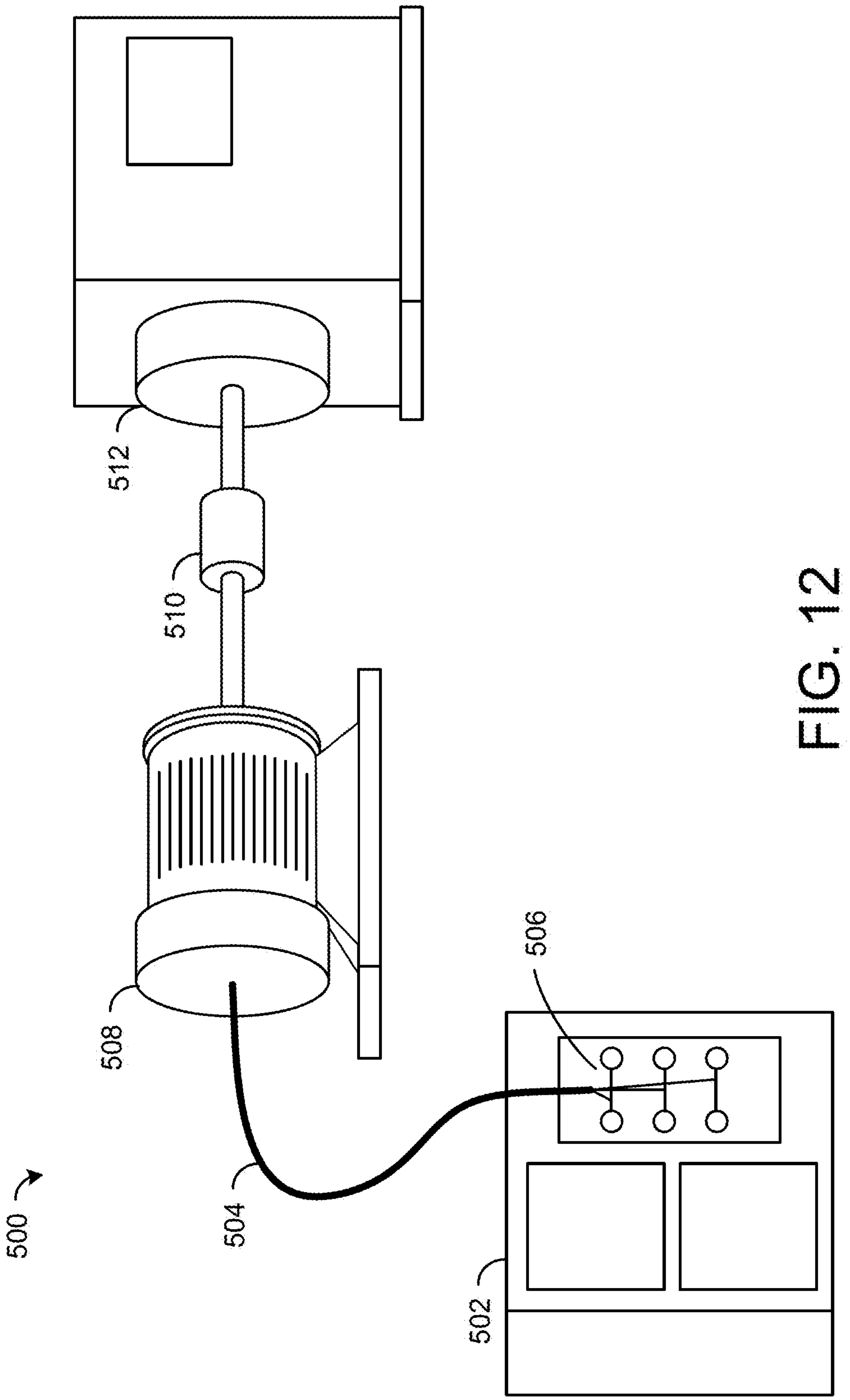
FIG. 12 is an illustrative view of a motor and motor drive system, according to some embodiments.

FIG. 12 shows motor and drive system 500 according to some embodiments. In some embodiments, motor and drive system 500 includes variable speed drive 502, electrical cable 504 electrically connecting the drive to motor 508, inverter circuit 506, motor 508, shaft 510, and load 512. While the motor and drive system 500 shown in FIG. 12 includes a variable frequency drive (VFD) 502 it is noted that not all motors 508 are connected to a VFD 502. In some embodiments, the motor 508 may use starters other than a VFD 502 or have an integrated starter. The motor and drive system 500 shown in FIG. 12 is a three-phase motor; in some embodiments of the present disclosure, motors will be other than a three-phase motor (e.g., a single-phase motor).

In some embodiments, drive 502 is configured to use inverter circuit 506 to create three-phase electrical power at a specific voltage and frequency. The motor 508 (e.g., induction motor or permanent magnet motor) may use the three-phase electrical power to create rotational motion along shaft 510 to drive the load 512 (e.g., a hydraulic pump or a conveyor belt). Varying the frequency of the electrical output of the drive 502 may cause the rotational speed of the motor 508 to change and thus may cause the speed of an attached conveyor to change. The voltage of the electrical output of the drive 502 may also be changed in response to a load that requires more or less torque or to compensate for the change in motor impedance changes as frequency changes.

Motors (e.g., motor 508) may appear to be stationary even though they are moving at high speed. The rotational speed of the motor 508 may be difficult for the human eye to perceive. Extended-reality environments may provide an advantage of being able to see physical quantities that the human eye cannot perceive, thus making trouble shooting, monitoring, and optimizing and drive systems 500 less difficult. In some embodiments, the direction of the spin of the motor 508 may be indicated with a virtual object in an XR environment. In some embodiments, vibrations of the motor 508 may be accentuated by a virtual object representation of the motor 508 to shake or by using a color overlay. In some embodiments, electrical or magnetic quantities may be overlaid on various components or areas of the motor 508 or drive 502. In some embodiments, the runtime or other indication of the wear of a motor 508 may be indicated with a color overlay in an XR environment.

In some embodiments, the extended reality system (as described in more detail in a later section) provides an interface on an at least partially transparent display such that virtual objects of the interface appear to be anchored in the physical environment of the viewer and may appear to remain at the same location as the viewer changes orientation and location (e.g., as they change their perspective). In some embodiments, extended reality system may provide interfaces on a tablet or other handheld devices overlayed on a visual display of the physical environment. Extended reality system may be used to provide an interface to configure a motor and drive system 500 that is part of a production line. For example, the production line may be large, and the physical interface may be in a single location, the extended reality system may advantageously provide a virtual interface wherever the viewer is located; thus, allowing them to configure the system when monitoring different areas of the production line.

Extended Reality

Extended reality (XR) may refer to any of virtual reality (VR), mixed reality (MR), or augmented reality (AR). Virtual reality may refer to an immersive, three-dimensional environment where a viewer is able to interact with virtual objects and control the perspective by moving their head. Virtual reality, for example, may be used to view a simulation of an automation process in an immersive way. Augmented reality may refer to superimposing information onto the real world. Augmented reality may be viewed through a tablet, smartphone or other handheld device which uses cameras and sensors to recreate the real-world environment on the display and overlay information and or objects. Augmented reality may also use specialized headsets with at least partially transparent displays. Images may be produced on the at least partially transparent display so that objects appear to be anchored (e.g., embedded, inserted, integrated, etc.) in the real world. For example, augmented reality may be used to add color overlays to indicate a fault or to add arrows to help the user navigate to a particular machine. Mixed reality may refer to an augmented reality in which the virtual objects interact with the real-world objects (e.g., the behavior of the virtual object is affected by the presence or behavior of the real-world object or vice versa). Mixed reality may be viewed using specialized headsets with at least partially transparent displays, or on a tablet, smartphone, or other handheld device.

An at least partially transparent display may refer to a display where virtual objects can be superimposed, overlayed, embedded, and/or anchored in the real-world environment. An at least partially transparent display may refer to an optically see-through (OST) display. A light image, for example, is projected (e.g., guided, reflected, diffracted) so that the image appears on the display in the wearer's field of view and the real-world can be seen through the display. An at least partially transparent display may also refer to a video see-through (VST) display. The display screen of a VST display may not physically be see-through, however, the display can simulate a transparent display using cameras and projecting the real-world objects on the display with virtual objects. It is worth noting that there are several technical and market terms used to describe an at least partially transparent display as used in the present disclosure. In addition to OST, and VST, passthrough, video passthrough, virtual see-through, and other terms used to describe displays configured to produce virtual objects may be considered an at least partially transparent display.

A virtual object may refer to any digital content that is presented so that it appears embedded and/or anchored in the real-world. For example, a virtual object may refer to a three-dimensional object, a graphic, an icon, a button, an avatar, a control lever, etc. Virtual objects are not limited to visual representations and can include, for example, audio representations (e.g., a virtual audio source), haptics (e.g., a virtual heat source or a vibration source), and/or any other modality (e.g., type) of sensory perception that can be presented (e.g., cause to be perceived) to the user by an extended reality device. For example, the at least partially transparent display described throughout the present disclosure can be configured to present virtual objects to a user visually (e.g., 3D models, graphics, icons, etc.), aurally (e.g., via speakers, audio cues, etc.), haptically (e.g., vibrations, temperature, touch-based input, etc.), and/or via any other mode of sensory perception. The term "present" is used throughout the present disclosure to refer to any way information can be conveyed to a user via any or all of the user's senses (e.g., visually, aurally, haptically, etc.). It is contemplated that any type of information which is described herein as being presented visually (e.g., displayed, shown, viewed, etc.) can also or alternatively be presented using other modalities of sensor perception. Advantageously, additional modes of sensory perception can further the immersiveness of an extended reality environment beyond the visual mode. Haptics, for example, can provide sensory cues, simulating touch and texture, which improves engagement and can help identify problems (e.g., troubleshoot, etc.) virtually using the same senses one would use interacting with the real-world objects. Audio sources can provide sensory cues from any direction (e.g., not limited by one's field of view) allowing efficient navigation to a problematic area.

Figure 13:
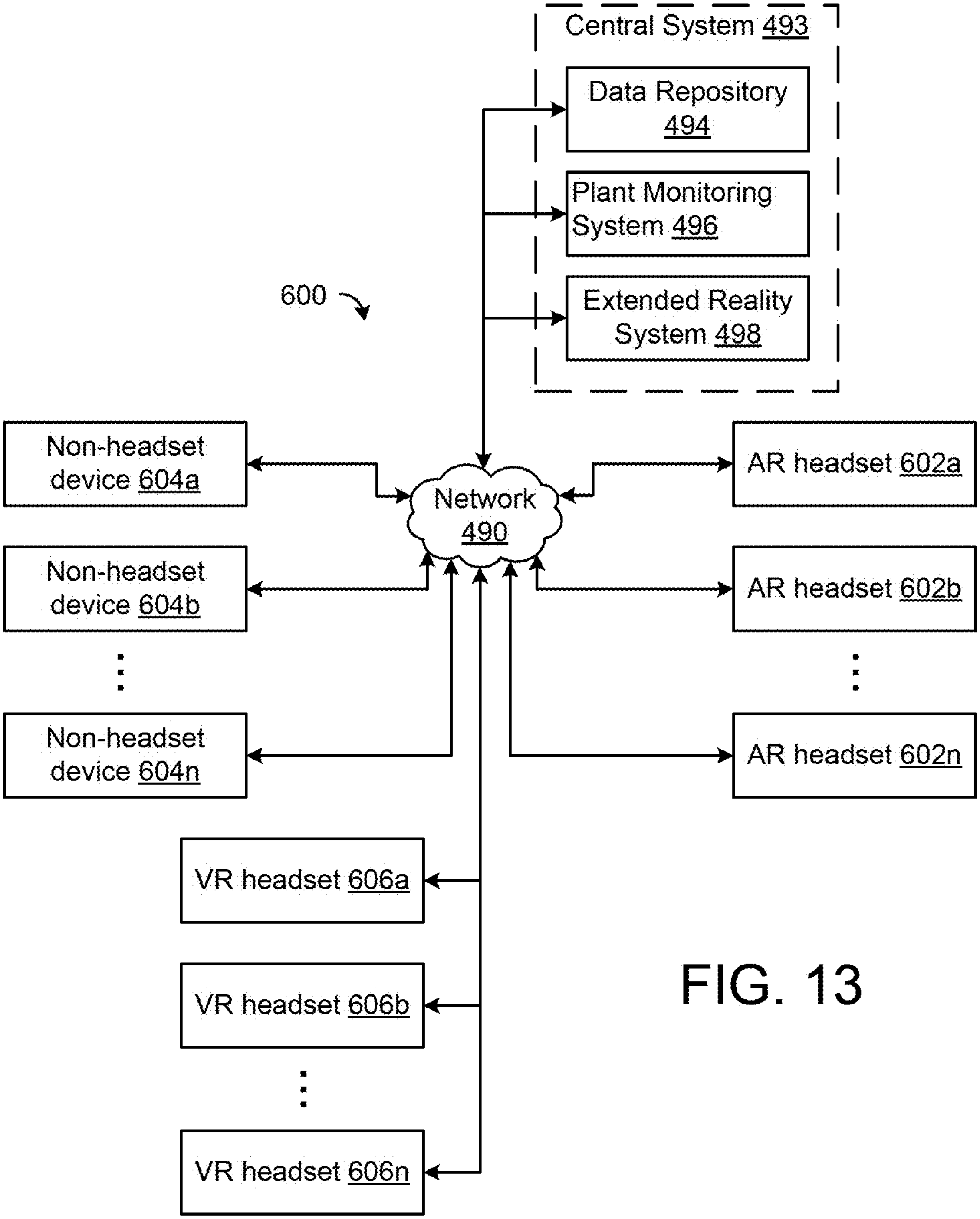
FIG. 13 is a block diagram of an extended reality system, according to some embodiments.

With reference to FIG. 13, extended reality enabled plant operations system 600 is an implementation of an extended reality enabled plant operations system, optimization, monitoring, and servicing of an automation systems according to some embodiments. In some embodiments, extended reality enabled plant operations system 600 includes a number augmented reality (AR) headsets (e.g., headsets 602*a*-602*n*), a number of virtual reality headsets (e.g., headsets 606*a*-606*n*), and a number of non-headset (e.g., handheld) devices (e.g., devices 604*a*-604*n*) all communicably connected to an implementation of a central system 493 including: extended reality system 498, plant monitoring system 496, and data repository 494 over network 490. Network 490 may include wireless and wired connections to the various equipment and the central system. The non-headset devices may be configured with a camera and display device to enable viewing an extended reality environment. In some embodiments, non-headset devices may include tablets, smartphones, laptops, a desktop computer connected to a camera, etc. AR and VR headsets may be configured with a wearable display to enable viewing an extended reality environment. The display on AR headsets may be configured with an at least partially transparent display so that AR and MR environments may include the actual real-world objects (as seen through the display) without recreating an image of the real-world objects on the display.

In some embodiments, data repository 494, plant monitoring system 496, and extended reality system 498 are used together in order to produce various XR environments. In some embodiments, data repository 494 is used to store the data required to produce various virtual environments (e.g., location data of ICT carts or AMRs, temperature of a drive, or rotational speed of a motor). Plant monitoring system 496 may be used to perform calculations and or simulations using information from data repository 494 that can be display using any of the devices (e.g., devices 602-606) and viewed in the XR environment. Extended reality system 498 may be used to perform calculations related to where to display an object on the display so that it appears to be in the correct location within the XR environment, or to keep a current three-dimensional surface (e.g., a map, a surface approximated by a Delaunay triangulation, etc.) of the real-world environment with which virtual objects in an MR environment may interact. Processes or functionality described as provided by data repository 494, plant monitoring system 496, or extended reality system 498 may be distributed over any of these systems, another remote system, or by the handheld devices, or headsets without limitation. For example, extended reality system 498 may provide a location for a virtual object and an AR headset 602*a*-*n* may perform the necessary geometric calculations to ensure that that virtual object appears to be at the given location for any perspective of the person wearing the headset.

Figure 14:
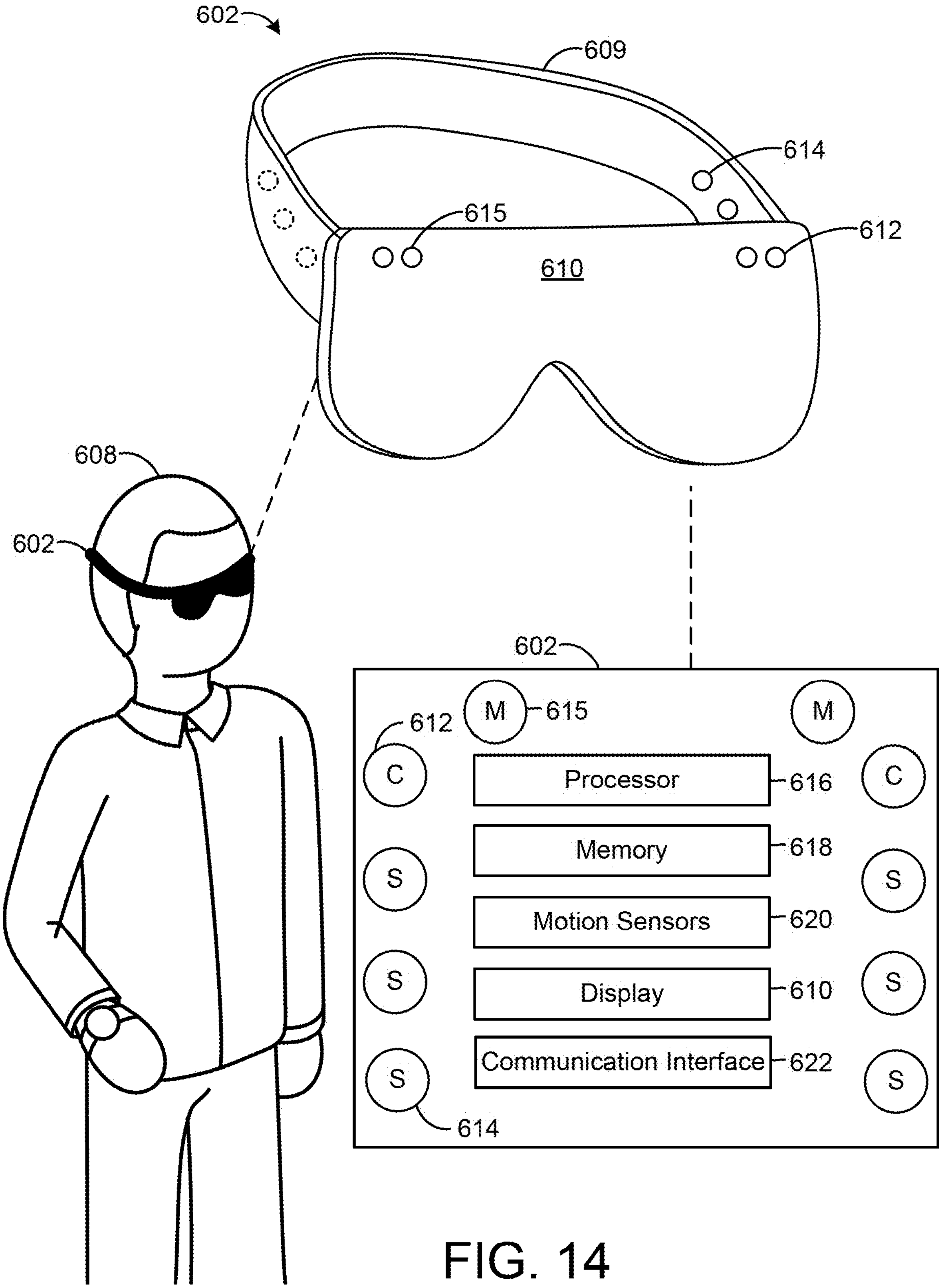
FIG. 14 is an illustrative view and block diagram of an augmented-reality headset, according to some embodiments.
Figure 15:
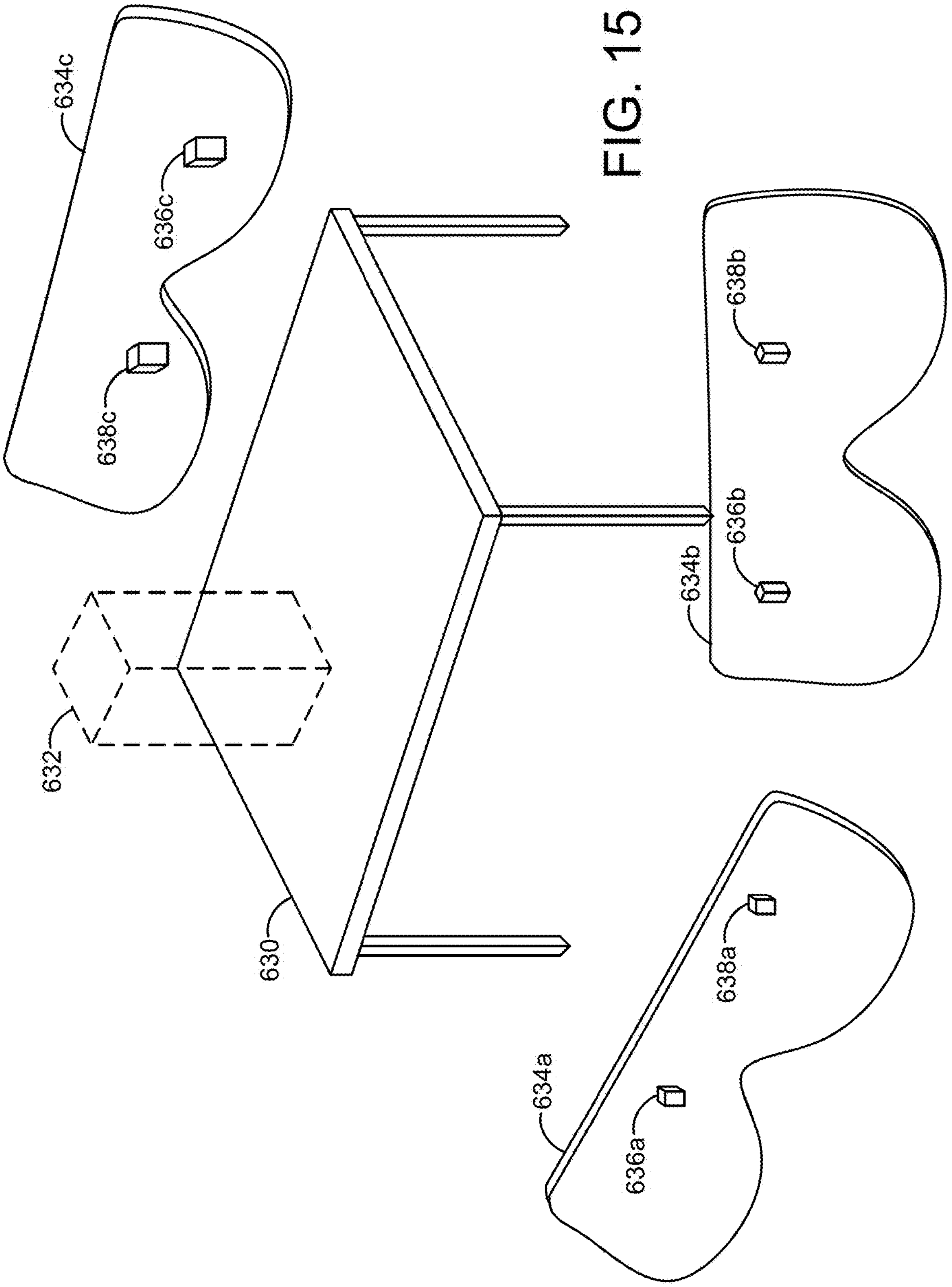
FIG. 15 is an illustrative view of a virtual object as seen from different perspectives through an augmented-reality headset, according to some embodiments.

FIGS. 14 and 15 illustrate more details of the components and functionality of an AR headset, according to an exemplary embodiment. With reference to FIG. 14, AR headset 602 is shown to be wearable by a person 608 according to some embodiments. Person 608 may be referred to by their role (e.g., operator, viewer, etc.). In some embodiments, AR headset includes strap 609, at least partially transparent display 610, a number of cameras (e.g., camera 612), a number of speakers or a speaker array (e.g., including speaker 614), a number of microphones (e.g., microphone 615), processor 616, memory 618, motion sensors 620, and communications interface 622. Strap 609 may be provided to allow AR headset to be worn by the viewer. In some embodiments, temples (or arms) or any suitable manner for fastening the headset to the viewer such that they are able to look through display 610 may be used.

In some embodiments, at least partially transparent display 610 is positioned in front of the viewer's eyes so that they are able to look through the display and see the real-world. In some embodiments, at least partially transparent display 610 is configured to display virtual objects such that they are in the viewer's field of view when observing the real-world through display 610. A virtual object may include a location in the XR environment at which to appear; AR headset may perform calculations to determine where on display 610 the virtual object should be displayed to give it the appearance of existing at the location in the XR environment. In some embodiments, the virtual objects are displayed on two locations of display 610 such that each virtual object is in the field of view for one eye of the viewer. By manipulating the distance between the virtual objects AR headset 602 may provide the illusion that the virtual object is at different distances from the viewer. In some embodiments, precise manipulation of the location on the display of the virtual object may allow the AR headset to cause the virtual object to appear at any location withing the XR environment. In some embodiments, the at least partially transparent display does not need to be worn by the user. For example, a sheet of plastic or glass may provide a partially transparent material; light may be projected onto the sheet of plastic or glass; if the viewer location is tracked, the location to project the virtual object may be calculated to cause an overlay. For such an example, if the illusion of depth is required (e.g., it is desired that the object appears at a certain location behind the glass), polarized light may be projected on the glass and glasses with polarized lenses of opposite polarity may and be used to view the XR environment.

In some embodiments, AR headset 602 includes a number of cameras (e.g., camera 612). Cameras may be configured to collect images or frames (e.g., of a video) in order to develop a representation of the real-world environment for the extended reality system 498 to use. Frames and images may be combined with location data of the camera in order to provide environmental information. For example, various frames collected by the cameras and used to produce a three-dimensional surface of the objects within the mixed reality environment (e.g., a surface produced from a Delaunay triangulation). In some embodiments, other cameras may be used in conjunction with the cameras on AR headset 602 or alone. For example, cameras on handheld device (e.g., handheld device 604 or a camera mounted to an autonomous mobile robot may be used to create the surfaces representing the real-world environment.

In some embodiments, AR headset 602 includes a number of speakers (e.g., speaker 614). Speakers may be used to provide audio indications within the XR environment. For example, audio may be used to indicate that a gesture was detected or that a new virtual object was acquired. In some embodiments, a number of speakers in several locations on AR headset 602 allow for the production of spatial audio. The number of speakers may be able to simulate the perception of audio coming from different directions, distances, and heights in the XR environment. In some embodiments, spatial audio may be simulated by causing some speakers to play louder than others, by filtering the various frequencies, and/or by adding reverberation to the sound. In some embodiments, AR headset 602 includes a number of microphones (e.g., microphone 615). Microphones may be used to provide voice activation of various or functionality within an XR environment. For example, and object may be selected by looking an object and saying, "select object." Objects may also be selected by looking at the object for a period of time (e.g., gazing). In some embodiments, a number of microphones are used to perform beamforming (e.g., focusing on audio from certain directions. For example, audio from certain directions may be filtered to eliminate noise and make recognition of voice commands more reliable or to prevent one person's voice commands from activating another's AR headset.

In some embodiments, AR headset 602 includes communication interface 622. Communication interface 622 may be configured to communicate with any remote applications to receive and/or store data as described with reference to FIG. 13. In some embodiments, processor 616 may be one of a number of processors included in AR headset 602. The processors may be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.). The processors may be configured in various computer architectures, such as graphics processing units (GPUs). In some embodiments, memory 618 may store instructions for AR headset 602. The memory may include one or more devices (e.g., memory units, memory devices, storage devices, etc.) for storing data and/or computer code for completing and/or facilitating the various processes described in the present disclosure. The memories may include random access memory (RAM), read-only memory (ROM), hard drive storage, temporary storage, non-volatile memory, flash memory, optical memory, or any other suitable memory for storing software objects and/or computer instructions. The memories may include database components, object code components, script components, or any other type of information structure for supporting the various activities and information structures described in the present disclosure. The memories may be communicably connected to the processors and can include computer code for executing (e.g., by the processors) one or more processes described herein. In some embodiments, memory 618 includes instructions that when executed by the one or more processors (e.g., processor 616) perform operations including causing an image or virtual object to be generated on the at least partially transparent display 610. The operations may also include performing calculations to determine the location on display 610 that the image (or images in the case of a stereoscopic display) to cause the virtual object to appear at a location in the XR environment. The operations may include continually performing the calculations and updating the location of the image on display 610 so that the virtual object remains at the same location in the XR environment.

In some embodiments, motion sensors 620 provide the processor(s) the location and orientation of the AR headset thereby providing the viewer's perspective to perform said calculations so that the virtual object remains in a fixed location. For example, if the viewer was looking at a virtual object, the image of the object may be generated on the middle portion of each half (one half per eye) of display 610, if the viewer turns their head to the right (thereby changing their perspective), the image of the virtual object may be on the left side of each half of the display 610. In some embodiments, motion sensors 620 include an inertial measurement unit (IMU), accelerometers, GPS, and/or any other sensor capable of providing a precise location and orientation of AR headset 602.

With reference to FIG. 15 a displaying a virtual object such that it appears on to be at a fixed location for several viewer perspectives is described according to some embodiments. The several viewer perspectives may either be several viewers all viewing the same XR environment, a single viewer changing their perspective with time, or a combination of many viewers all changing their perspective. FIG. 15 shows an environment with table 630 and virtual object 632. In some embodiments, a viewer observing this scene from the perspective of AR headset 634*a* would see the table through the display of the headset and two images (636*a* and 638*a*) of the virtual object would be created on the display to give the stereoscopic perception of depth such that the virtual object appears to be sitting on the table. In some embodiments, as the viewer moves (e.g., to the location of AR headset 634*b*) the images on the display (636*b* and 638*b*) of the headset will move so that virtual object 632 appears to remain on the table. For example, the images on 634*a* may move left on the display as the viewer moves right as the virtual object is no longer center of the viewers field of view. In some embodiments, the calculations of where to display the images of the virtual object will be performed continuously so that the object appears to be on the table regardless of the viewer location or orientation. For example, the images on AR headset 634*c* may be larger and closer together as the viewer has moved closer to the location of the virtual object.

In some embodiments, the viewer of the virtual object may be able to interact with that object through gestures. For example, extending the index finger forward at a location of a pushbutton may cause activation of the button. As another example, a pinching gesture with the and at the location of a virtual object may allow the viewer to hold the virtual object. After the virtual object is held, rotating the hand may rotate the virtual object, translating the hand may translate the virtual object, and opening the pinch gesture may let go of the virtual object. In some embodiments, depending on the configuration of the virtual object and XR environment, the virtual object may remain at the location and orientation before it was let go or it may fall, as if affected by gravity, back to the table or the floor.

Many of the features and functionalities described referring to an AR headset may be offered similarly on a non-headset device with a camera and opaque display. In some embodiments, the device is a handheld device such as a tablet, smartphone, or any handheld hardware with a camera and display. In some embodiments, the device is a laptop or desktop computer. In some embodiments, the camera and the display are not required to be a component of the same device. In some embodiments, the camera captures the environment from the perspective of the camera. Calculations may be performed to determine the location on the display the virtual object should be created and the size of the virtual object on the display. The display may then recreate the image from the camera with the virtual object in the scene. By continually performing the calculations, the location of the virtual object on the display can be updated as the camera's perspective is changed. In some embodiments, a handheld device or other device that is not a headset may still produce a three-dimensional effect to cause the virtual object to appear at a certain depth in the scene. For example, a three-dimensional effect may be created by a display capable of polarizing the light. Two images of the scene are simultaneously displayed with orthogonal polarization and glasses with polarized lenses may be worn so each eye views one of the images. As another example, autostereoscopy may be used to produce a three-dimensional effect by displaying 2 images, wherein each image may only be visible by one eye due to a parallax barrier or series of slits with the pixels such that certain pixels can only be viewed from one eye. In some embodiments, the gestures used to interact with a virtual object on handheld or other device with an opaque display and camera may be different than those used by the AR headset. For example, double tapping the display may be used to select a virtual object with which to interact.

Many of the features and functionalities described referring to an AR headset may be offered similarly on a VR headset. In some embodiments, the VR headset may recreate the environment on its display from on-headset cameras, from data stored in a data repository related to the three-dimensional layout of the environment, or any combination of the two sources of data. A VR headset may create two images of the extended-reality environment in order to cause the perception of depth within the XR environment. In some embodiments, calculations are continually performed in order to determine the location of the two images of the XR environment on the display as the viewer changes their perspective (e.g., moves their head).

Using the terminology of augmented-reality, virtual-reality, mixed-reality, and extended-reality to describe an embodiment of the present disclosure should not be interpreted as limiting. It should be considered that it may be possible for an embodiment of the present disclosure described in terms of a MR environment using an AR headset could also be provided by a VR embodiment using a VR headset or by an AR environment using a handheld device, etc.

Selecting and Acquiring Extended Reality Rights

Figure 16:
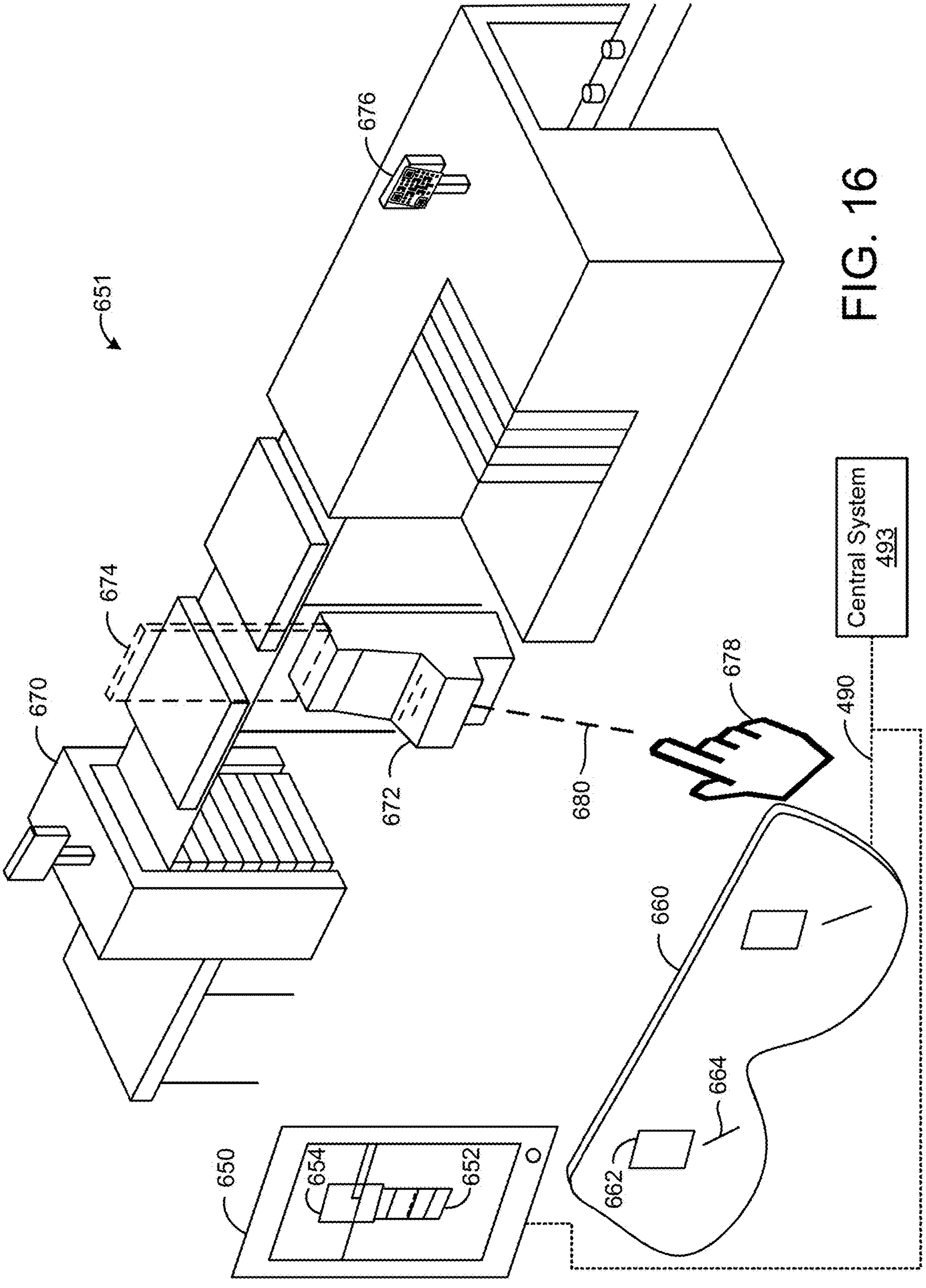
FIG. 16 is an illustrative view of an automation system in an extended reality environment as seen through an augmented-reality headset and on an augmented-reality enabled display device, according to some embodiments.

In some embodiments, selection of equipment to interact with is done within the XR environment. With reference to FIG. 16, in some embodiments, there are several manners by which a device can be acquired. XR environment 651 includes real world objects (e.g., automation system 670, control panel 672, QR code 676, hand 678), virtual objects (e.g., virtual sign 674, ray 680, sign), and various devices for viewing the XR environment 651 (e.g., AR headset 660 and tablet 650) according to some embodiments. As described in previous sections, AR headset 660 may cause images to be generated on its at least partially transparent display to create an XR environment 651 with the virtual objects that appear anchored (e.g., embedded, inserted, integrated, etc.) within the real-world objects (e.g., image of virtual sign 662 and image of ray 664) and tablet 650 may create an image of the real-world including image 652 of the control panel and add to it the virtual objects including image 654 of virtual sign 674.

In some embodiments, selecting virtual object or a physical object may allow an operator to configure a device or control system of the automation system. In some embodiments, the user may enter a selection mode. In some embodiments, various status overlays and information may be included in the XR environment 651. For example, in a selection mode, a virtual object (e.g., virtual sign 674) may be created to display the IP address of the equipment selected. In some embodiments, IP address signs may always be depicted on virtual signs in XR environment 651. In some embodiments, color overlays are generated to indicate equipment is not available for configuration. For example, control panel 672 may be remotely operated by someone else and has a "checked out" status to prevent others from modifying the equipment; a red color overlay or skin could be superimposed on the control panel or the entirety of the equipment to give visual indication of the status. In some embodiments, color overlays or other virtual objects may be used to indicate to the viewer that they do not have permission or the correct role to configure the equipment.

In some embodiments, various gestures may be used to select the equipment and/or virtual object. For example, tapping the object may select it. In some embodiments, an AR headset can allow for various hand gestures to be used in the selection process. For example, it is possible to create a virtual ray (e.g., 680) that extends from the operator's pointer finger. Selection may be confirmed if the ray is held on a selectable object for a period of time, if the user says the word "select," or any other gesture or remark that could be used to indicate the operator wants to select the object that the ray is currently pointed at. In some embodiments, selection can be performed by the eyes. For example, the AR headset may monitor the orientation of the eyes to determine the object at which the operator is looking. In some embodiments, gestures may include measuring muscle signals (e.g., myography) and/or neural activity. For feedback to the user, the AR headset may create a virtual glow or other indication on or around the object at which the user is looking or gazing. Selection may again be confirmed by a suitable gesture or remark. In some embodiments, a selection may be made by looking or gazing at a QR code for the equipment (e.g., QR code 676). In some embodiments, after a selection is made an indication that the selection occurred may be created for the user. For example, an indication could include a noise, a glow effect, a color overlay, or any combination of thereof.

In some embodiments, AR headset 602 or handheld device 604 will query the central system 493 to determine available interactions for a selected equipment and the operator. In some embodiments, the operator currently using a specific AR headset or handheld device may be linked to that device (e.g., a mapping between operator and device may be stored in central system 493) to facilitate the tracking of operator permissions. For example, automation system 670 may allow for interactions including: stop, start, reset, add task, change schedule, configure, view configuration, and view statistics. The response to the query from the central system 493 may indicate that automation system 670 is currently checked out and being configured; in response only the view statistics option may be displayed. In some embodiments, other options may be hidden or greyed out. In some embodiments, the queries to central system 493 are made continuously so that the options may be displayed any time the user looks at a particular equipment, processing system, or component. In some embodiments, if the query finds that the equipment is checked out, an option to call the person who has it checked out may be made available. Selecting the call option may create a voice connection between the operator's headset and the head set of the person who has the equipment checked out. The call option may allow for a convenient method to determine why the person has the equipment checked out and to discuss additional configurations that should be made, reducing the need to find the person or wait for them to finish and increase overall plant operating efficiency.

In some embodiments, the response to the query from the central system 493 may indicate that the operator does not have configuration access to automation system 670. AR headset 602 or handheld device 604 may hide or grey out the change schedule and configure options and not send any such command back to the central system for processing. In some embodiments, permissions may be dictated by the role of the operator within the plant. For example, a level 1 operator may be able to stop the system and view the statistics, a level 2 operator may be able to stop, start, and reset the system and view the statistics, and a plant manager may have all options available.

In some embodiments, the operator must be within an area in order to configure, stop, start, reset, or perform any other action on the equipment that may have safety implications. Motion sensors 620 of AR headset 602 or handheld device 604 may be used to track the location of the operator and determine if the operator is within the designated area. Various options may be hidden, greyed out, or otherwise indicated as being unavailable when the operator is not in the designated area. In some embodiments, the designated area is determined by the distance from the equipment. For example, the operator must be at least a first distance away from the equipment for their own safety and be at most a second distance away from the equipment so that they can properly monitor the equipment during their interaction.

The user may wish to find a particular piece of equipment. In some embodiments, the user may select the equipment from a list or by speaking the unique identifier (e.g., name) of the equipment. The query may be sent back to central system 493 requesting the location of the equipment. Central system 493 may then respond with the equipment location. In some embodiments, the location of the equipment may be indicated in the XR environment 651 with audio or visual cues. For example, a sound may be generated using the number of speakers on the AR headset 602 such that it is perceived by the operator to come from the location of the equipment; virtual objects can be created on the display of AR headset 602 or handheld device 604 to indicate the direction of the equipment or the best way to travel to the equipment.

In some embodiments, when a processing system, equipment, or component thereof is selected for interaction. AR headset 602 or handheld device 604 may send an indication to central system 493 that the equipment is being checked out. This may prevent other users from also operating the same equipment, processing system, or component thereof without the current operator's knowledge. In some embodiments, once a processing system, equipment, or component thereof is selected, communications may be established to quickly route commands from AR headset 602 or handheld device 604 without checking for permissions again.

Virtual Human Machine Interfaces in Extended Reality

Figure 17:
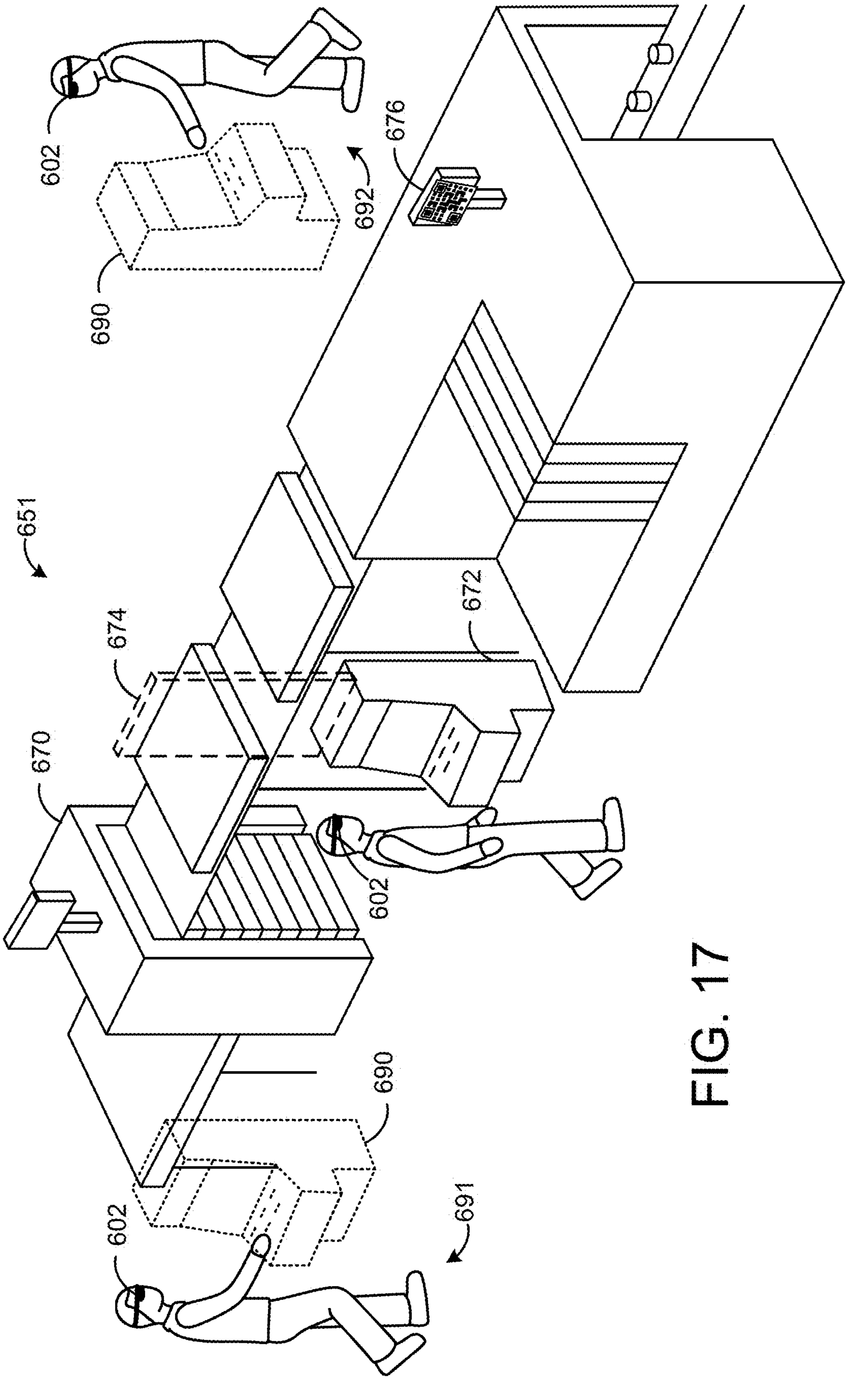
FIG. 17 is an illustrative view of an automation system with a virtual control panel in an extended reality environment, according to some embodiments.
Figure 18:
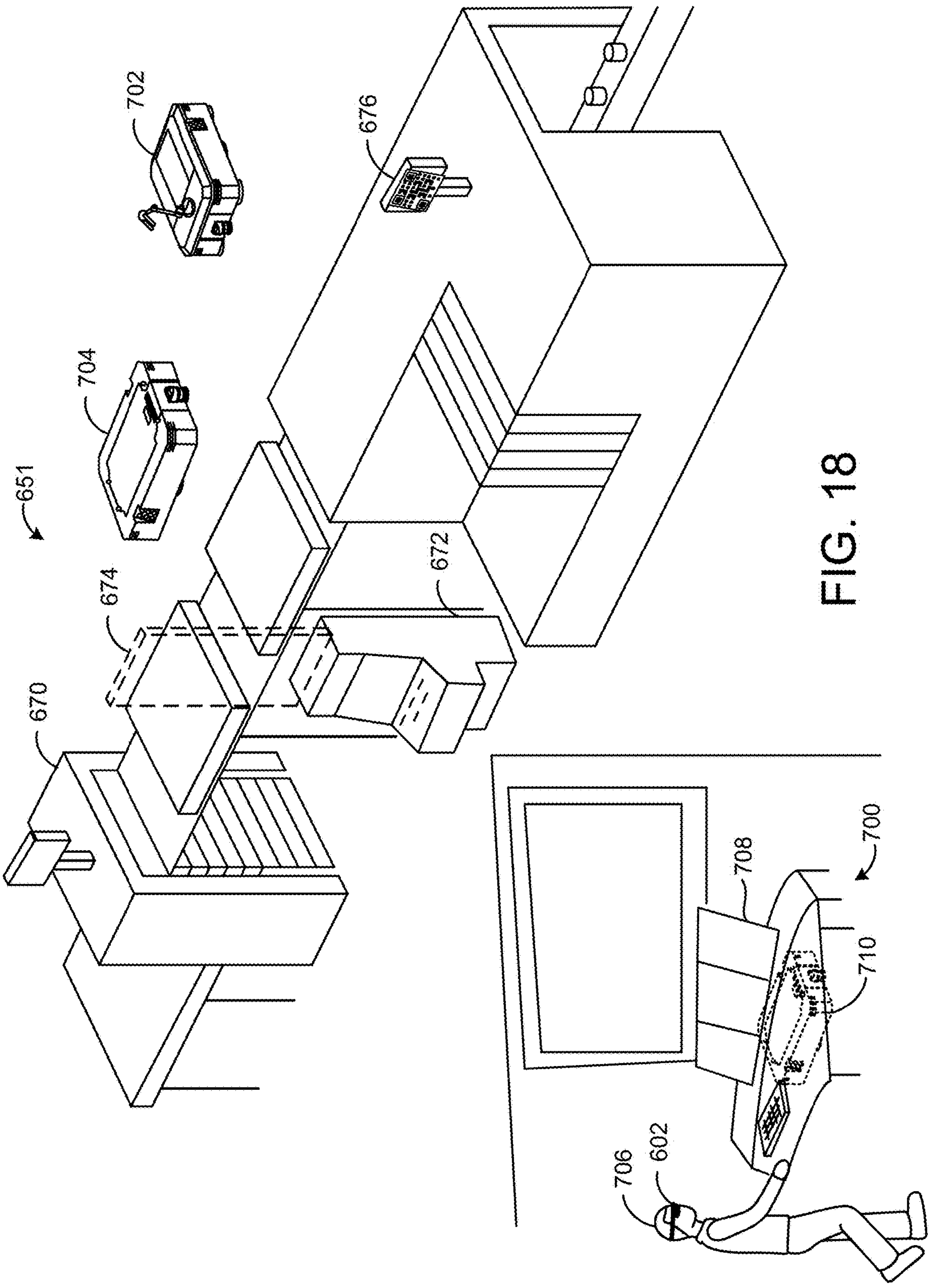
FIG. 18 is an illustrative view of an automation system with a fixed location avatar of a mobile system in an extended reality environment, according to some embodiments.
Figure 19:
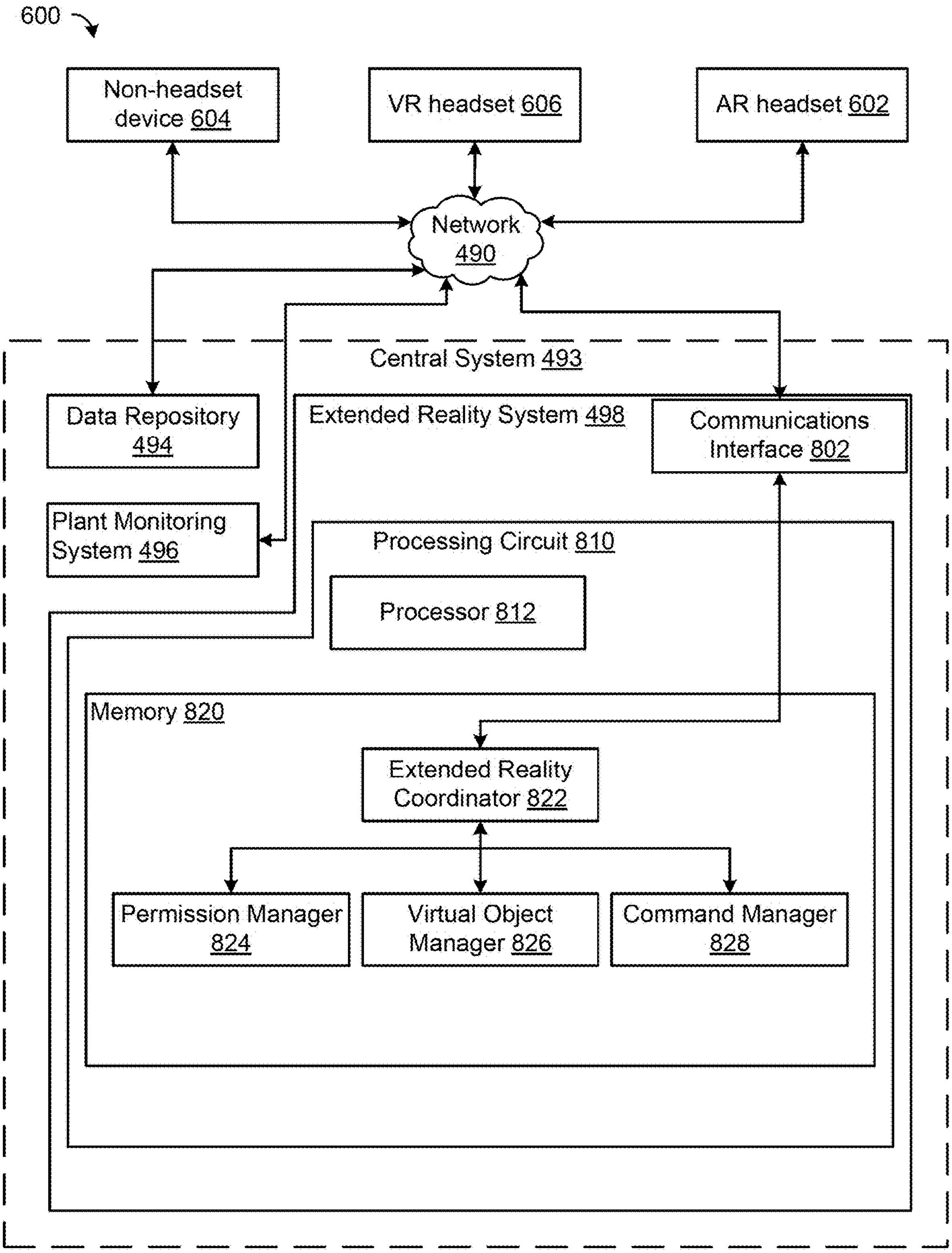
FIG. 19 is a block diagram of a central system for managing an extended reality environment, according to some embodiments.

FIGS. 17 and 18 generally show extended reality environments with human machine interfaces that provide efficiencies in the monitoring and maintaining of automation systems, according to some embodiments. FIG. 19 describes a system that can be used to create the extended reality environments including the human machine interfaces for automation systems and mobile robots, according to some embodiments. FIGS. 20-23 describe a flow of operations that a system (e.g., the system of FIG. 19) may follow to create the extended reality environment, according to some embodiments.

With reference to FIG. 17, automations systems (e.g., automation system 670) may be large, making it difficult to observe the entire automation system from any single location (e.g., the location of the control panel). Advantageously, the present disclosure provides systems and methods for creating a virtual control panel at any location. Having a virtual control panel at any location may allow an operator to view various portions of the automation system while adjusting parameters, starting the system, stopping the system or any other activity where viewing the system while adjusting the controls is advantageous, leading to overall operating efficiencies by preventing the need for operators to walk back and forth between the control panel and an observation location or rely on video playback of a fault.

FIG. 17 shows an XR environment 651, according to some embodiments. In some embodiments, XR environment 651 includes real-world objects including: automation system 670, control panel 672, and QR code 676; and virtual objects including virtual sign 674 and virtual control panel 690. The operator or viewer of the extended reality environment may be wearing AR headset 602. In some embodiments, the operator establishes an interaction with automation system 670 by accessing control panel 672. In some embodiments, the other methods for establishing an interaction with automation system 670 are also available to the operator. For example, the operator may establish an interaction by viewing QR code 676, by pointing at automation system 670, by speaking the unique identifier of automation system 670, by looking at automation system 670 and making a gesture or utterance, or any combination of thereof.

After establishing an interaction, the operator may decide that the initial portion of automation system 670 must be observed from location 691 while configuring automation system 670. In some embodiments, a virtual control panel can be requested by the operator. For example, the operator, having already established an interaction with automation system 670, may say "virtual control panel" or something similar to generate a virtual control panel. In some embodiments, other methods for requesting a virtual control panel may also be used. For example, the operator may select virtual control panel from the menu of control panel 672, the user may view virtual sign 674 and make a gesture or utterance, or any other suitable method may be used. In some embodiments, after the virtual control panel is requested, AR headset 602 may perform calculations to determine where on the at least partially transparent display of headset 602 to generate a number of images to cause the virtual control panel to appear to be located at a location. For example, the initial location of the virtual control panel may be adjacent to the real-world control panel 672.

In some embodiments, the operator may interact with virtual control panel 690 to change its location. For example, the operator may perform a pinch gesture at the location of the virtual control panel to "carry it" or the user could say "follow me" to cause virtual control panel 690 to appear at a fixed location relative to the operator's body. In other embodiments, other suitable interactions with the virtual control panel may also be used to change its location. The operator may interact with virtual control panel 690 and change its location to location 691 in order to view a specific portion of automation system 670. The operator may decide a restart is required. In some embodiments, by interacting with virtual control panel 690 the operator may cause a restart command to be sent to automation system 670. The operator may then decide to monitor another location of the automation system 670 and perform the required gestures or utterances in order to move the virtual control panel (e.g., to location 692).

In some embodiments, the last location of the virtual control panel may be saved for the next time the operator, or another operator interacts with the machine. In some embodiments, common locations that the virtual control panel have been placed are stored and when the virtual control panel is initialized it will appear anchored at one of the stored locations. It is worth noting while a virtual control panel can be presented with buttons, levers, etc. as in a real-world control panel, a virtual control panel may also provide richer interaction, for example, allowing gestures near the virtual control panel to initiate commands.

With reference to FIG. 19, extended reality enabled plant operations system 600 is shown, according to some embodiments. In some embodiments, extended reality enabled plant operations system 600 includes a number of VR headsets (e.g., headset 606), a number of AR headsets (e.g., headset 602), a number of non-headset devices (e.g., device 604), data repository 494, plant monitoring system 496, and extended reality system 498 all communicably connected by network 490. In some embodiments, extended reality system 498 may perform the majority of the operations to realize the extended reality enabled plant operations system with virtual control panel; however, in some embodiments, the operations may be distributed across any of the components, devices, or systems shown in extended reality enabled plant operations system 600 including data repository 494, plant monitoring system 496, extended reality system 498, or any of the headset or non-headset XR enabling devices (e.g., devices 602-606).

In some embodiments, extended reality system 498 includes communications interface 802 and processing circuit 810. In some embodiments, processing circuit 810 contains processor 812 and memory 820. The processors may be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.). The processors may be configured in various computer architectures, such as graphics processing units (GPUs), distributed computing architectures, cloud server architectures, client-server architectures, or various combinations thereof. One or more first processors can be implemented by a first device, such as an edge device, and one or more second processors can be implemented by a second device, such as a server or other device that is communicatively coupled with the first device and may have greater processor and/or memory resources. The memories may include one or more devices (e.g., memory units, memory devices, storage devices, etc.) for storing data and/or computer code for completing and/or facilitating the various processes described in the present disclosure. The memories may include random access memory (RAM), read-only memory (ROM), hard drive storage, temporary storage, non-volatile memory, flash memory, optical memory, or any other suitable memory for storing software objects and/or computer instructions. The memories may include database components, object code components, script components, or any other type of information structure for supporting the various activities and information structures described in the present disclosure. The memories may be communicably connected to the processors and can include computer code for executing (e.g., by the processors) one or more processes described herein.

In some embodiments, memory 820 contains various modules and/or instruction sets to facilitate the functionality of extended reality system 498. In some embodiments, memory 820 includes extended reality coordinator 822, permissions manager 824, virtual object manager 826, and command manager 828. A request to interact with an automation system may come from a device (e.g., device 602-606) and be sent over network 490 to communications interface 802. Once received by extended reality system 498 the request may be processed. In some embodiments, extended reality coordinator 822 is configured to determine the identity and role of the person using the device from which the command came. In some embodiments, extended reality coordinator may be configured to use permissions manager 824 to determine what permissions the operator making the request has and to determine if the system is checked out or is otherwise in use by another person. Extended reality coordinator 822 may use the determination of permissions to develop a list of interactions available and send it back to the device via communications device 802.

After the operator establishes an interaction with the automation system, the operator may request a virtual control panel. In some embodiments, extended reality coordinator 822 may be configured to use virtual object manager 826 to generate a virtual control panel for the operator. Generating a virtual control panel may include providing a location for the virtual control panel, providing an object (e.g., three-dimensional shape) representing the virtual control panel, and providing the callbacks or commands that will be transmitted to the automation system upon activating any of the buttons or other interactive components of the virtual control panel. For example, extended reality coordinator 822 may be configured to receive the operations the operator has permission to perform on the automation system from permission manager 824. Extended reality coordinator 822 may be configured to receive a predefined virtual control panel layout for the automation system from virtual object manager 826. For example, virtual object manager 826 may include a database of three-dimensional representations (e.g., computer aided drawings (CAD)) of the control panels for the automation systems in a plant. In some embodiments, extended reality coordinator 822 may be configured to modify the layout or colors of the control panel based on the permissions received from permission manager 824. For example, any functionality not currently available to the operator may be represented by a grey button, a button with a cover that cannot be lifted or may be omitted altogether. In some embodiments, extended reality coordinator 822 may be configured to provide the virtual control panel with a location after receiving the permissions and the three-dimensional representation.

In some embodiments, after receiving the virtual control panel and the location, XR enabled device (602-606) may be configured to produce an image of the virtual control panel. For example, the AR headset 602 may calculate the location an image should be placed on each half of the at least partially transparent display (one image for each eye) to cause the virtual control panel to appear at the provided location. The AR headset 602 may generate the images at the calculated locations on the display. And the calculations and generating of the images may be repeated so that the virtual control panel appears to remain at the provided location even as the operator changes their perspective (e.g., location or head orientation).

In some embodiments, extended reality coordinator 822 may be configured to receive requests to transmit commands to the various automations systems of the plant or location. For example, extended reality coordinator may send a command over network 490 via communications interface 802 to the plant monitoring system for execution. In some embodiments, the requests are provided by the XR enabled devices (602-606). In some embodiments, the requests are provided based on gestures performed at the location of the virtual control panel. For example, extending an index finger forward towards a button on the virtual control panel may cause the button to be activated. A name or identifier of an activated button may be sent to extended reality system 498 for processing. In some embodiments, extended reality system 498 may process the activated button by receiving the callback (e.g., operations that should be executed after interaction with a UI component) for that button from command manager 828 and executing the callback. In some embodiments, the callback includes sending a command to plant monitoring system 496 to execute a command related to the automation system (e.g., start, reset, stop, etc.).

In some embodiments, the command may only be sent to the automation system after extended reality system 498 has verified that all people, objects, and/or mobile robots are clear of the automation system (e.g., a safe distance away). In some embodiments, the command may only be sent if the virtual control panel is within a certain distance of the automation system (e.g., to ensure that the operator is able to view the system and intends to interact with that system). In some embodiments, to verify people are clear of the automation system, extended reality coordinator 822 to may be configured to receive the location of all AR headsets or other XR enabled devices. Extended reality coordinator 822 may be configured to make a determination as to if all the devices are clear of the automation system and based on that determination decide to transmit a command to plant monitoring system 496 for execution. For example, the callback for various buttons may contain a step to verify clearance.

In some embodiments, the operator may be able to change the location of the virtual control panel through various means. For example, a pinch gesture at the location of the virtual control panel may allow the operator to carry the virtual control panel to a second location. In some embodiments, AR headset 602 may recognize the pinch gesture and allow the virtual control panel to be carried. AR headset 602 may also recognize the opening of the hand gesture to set the virtual control panel at the new location. In some embodiments, the virtual control panel may take the form of a menu that appears on an operator's hand in the XR environment 651. AR headset 602 may also recognize various voice commands to relocate the virtual control panel for example, "follow me" or "move virtual control panel 10 meters to my left." In some embodiments, the AR headset may be configured to periodically update the position of the virtual control panel by sending the location and orientation to the extended reality system 498. Virtual object manager 826 may be configured to save the updated locations so that anyone viewing the XR environment 651 will see the virtual control panel at its updated location. Advantageously, the virtual control panel allows an operator to have a control panel at any convenient location for their current task. If that task is trouble shooting one part of the automation system, they may choose to move the control panel to a location near that part of the automation system. This may reduce the need for the operator to walk (or run) back and forth between the control panel and the part of the automation system, rely on video playback of the part of the automation system, or rely on a partner to press operate the control panel while the operator monitors the part of the automation system, potentially providing increased operational efficiency.

Figure 20:
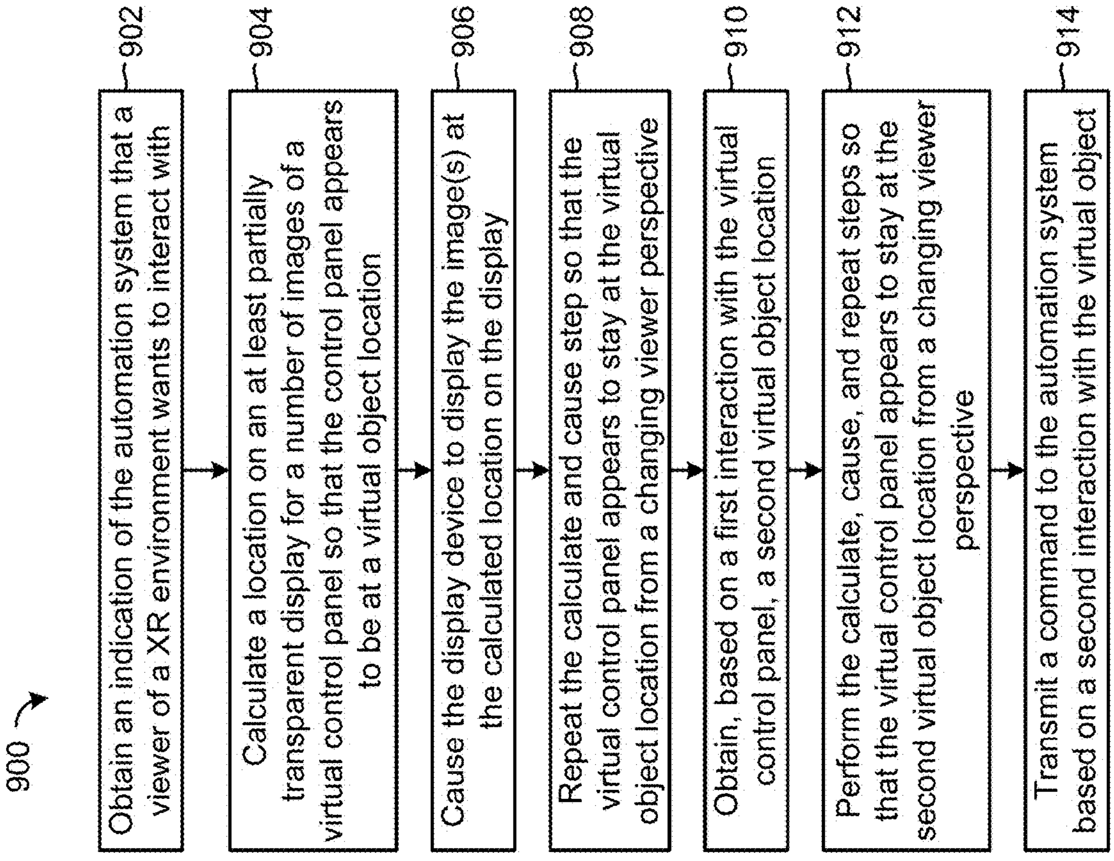
FIG. 20 is a flow diagram for display a virtual object on an at least partially transparent display so it appears to be at a virtual object location in an extended reality environment when viewed from a changing viewer perspective, according to some embodiments.
Figure 21:
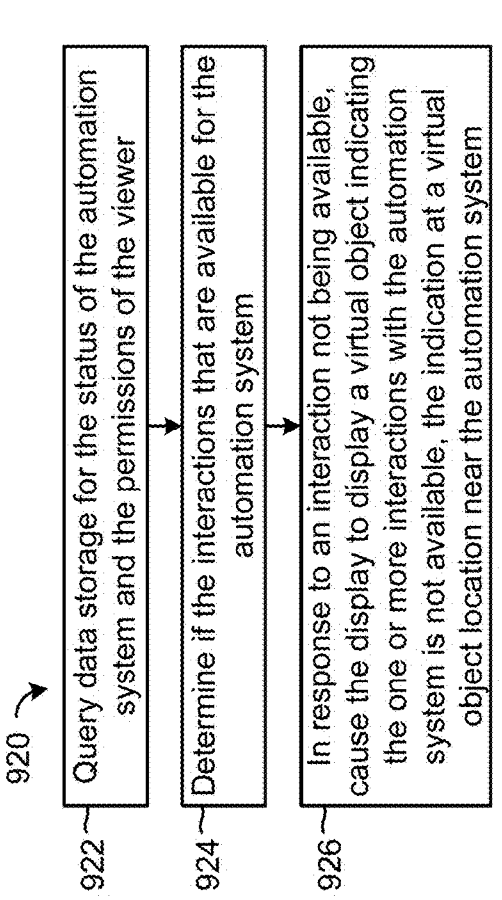
FIG. 21 is a flow diagram for indicating unavailable interactions on a virtual object in an extended reality environment, according to some embodiments.
Figure 22:
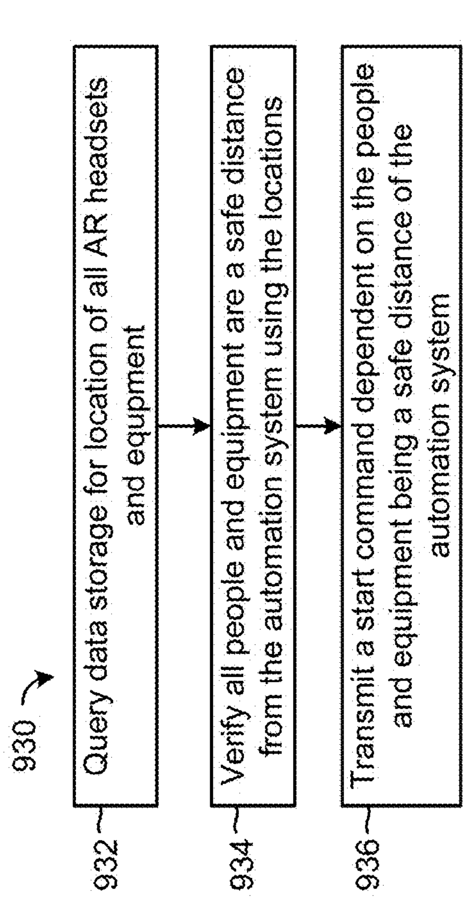
FIG. 22 is a flow diagram for starting an automation system from a virtual control panel in an extended reality environment, according to some embodiments.

FIGS. 20-22 generally show sequences of operations for creating and moving a virtual control panel, according to some embodiments. The sequences shown, for example, can be performed by XR enabled plant operations system 600. With reference to FIG. 20 sequence 900 is a sequence of operations to generate, move, and transmit a command from a virtual control panel. In some embodiments, sequence 900 includes obtaining an indication of the automation system that the viewer of an XR environment 651 wants to interact with. A request to interact with an automation system may come from any device and be sent over the network to the extended reality system (e.g., extended reality system 498). In some embodiments, the operator establishes an interaction with the automation system by accessing the real-world control panel. In some embodiments, the other methods for establishing an interaction with the automation system are also available to the operator. For example, the operator may establish an interaction by viewing a QR code, by pointing at the automation system, by speaking the unique identifier of the automation system, by looking at the automation system and making a gesture or utterance, or any combination of thereof. In some embodiments, sequence 900 may include step 904 to calculate a location on an at least partially transparent display for a number of images of a virtual control panel (e.g., one for each eye) so that the virtual control panel appears to be at a virtual object location. For example, the AR headset 602 may perform the calculations after receiving the location and three-dimensional representation of the virtual control panel from the extended reality system 498. In some embodiments, sequence 900 may include step 906 to cause the display to display the images at the calculated location. In some embodiments, steps 904 and 906 are repeated (per step 908) as the viewer of the XR environment 651 changes their perspective (e.g., location or head orientation) such that the virtual control panel appears to stay at the virtual object location from a changing viewer perspective.

In some embodiments, sequence 900 includes obtaining a second virtual object location based on a first interaction with the virtual control panel in step 910. For example, a pinch gesture at the location of the virtual control panel may allow the operator to carry the virtual control panel to second location and/or various voice commands may be recognized to relocate the virtual control panel for example, “follow me” or “move virtual control panel 10 meters to my left.” In some embodiments, steps 904-908 are repeated in step 912 using the second virtual object location. In some embodiments, sequence 900 includes transmitting a command to the automation system based on a second interaction with the virtual object in step 914. For example, the extended reality system 498 may send a command over a network to the plant monitoring system for execution. In some embodiments, the requests are provided based on gestures performed at the location of the virtual control panel. For example, extending an index finger forward towards a button on the virtual control panel may cause the button to be activated. The activated button may be processed by a callback (e.g., operations that should be executed after interaction with a UI component) for that button.

With reference to FIG. 21, in some embodiments, sequence 900 may additionally include sequence 920 to indicate the available interaction of an automation system to the viewer of the XR environment 651. In some embodiments, sequence 920 includes querying data storage for the status of the automation system and the permissions of the viewer. For example, the identity and role of the person using the device from which the command came may be determined and used to determine the permissions the operator making the request has, if the system is checked out or is otherwise in use by another person. In some embodiments, sequence 920 may include using the status of the automation system and the permissions of the viewer to determine the set of interactions that are available for the automation system in step 924. In some embodiments, sequence 920 may include causing the display to display a virtual object indicating one or more interactions with the automation system is not available in step 926. For example, any functionality not currently available to the operator may be represented by a grey button or a button with a cover that cannot be lifted.

With reference to FIG. 22, in some embodiments, sequence 900 may additionally include sequence 930 to determine if a command (e.g., start, stop, reset, etc.) can be sent to the automation system for execution. In some embodiments, sequence 930 includes querying data storage for the location of all AR headsets, other XR enabled devices, and/or other mobile systems present at the plant location in step 932. In some embodiments, sequence 930 includes verifying all people and equipment are a safe distance from the automation system using the location data in step 934. In some embodiments, sequence 930 includes step 936 to transmit the command if the people and equipment are a safe distance from the automation system. In some embodiments, other criteria may additionally be used to determine if a command can be sent. The criteria may depend on the command; for example, a start command may require the operator to be at least a first distance from the automation system and at most a second distance from the automation system, whereas a stop command may, for example, be issued from any location.

FIG. 18 shows an XR environment 651, according to some embodiments. In some embodiments, XR environment 651 includes a floor environment and an observation area 700. In some embodiments, XR environment 651 includes real-world objects including: automation system 670, control panel 672, QR code 676, AMRs 702 and 704, and monitors 708; and virtual objects including virtual sign 674 and three-dimensional avatar 710 of an AMR. A viewer (e.g., operator 706) of the extended reality environment may be wearing AR headset 602. In some embodiments, the operator establishes an interaction with a mobile system (e.g., AMR 704) by selecting the AMR from a menu presented on a monitor (e.g., monitor 708). In some embodiments, the other methods for establishing an interaction with a mobile system are also available to the operator. For example, the operator may establish an interaction by pointing at the mobile system, by speaking the unique identifier of the mobile system, by looking at the mobile system and making a gesture or utterance, or any combination of thereof.

After establishing an interaction, an avatar (e.g., avatar 710) of the mobile system may be generated such that it appears in a fixed volume within the XR environment 651. For example, an avatar may be presented from the perspective of a virtual camera at a fixed location relative to a point on the mobile system (e.g., the camera moves along with the mobile system). Thus, the avatar may show all the operations of the mobile system (e.g., rotations, extensions of its load bearing surface, etc.), but remain in the fixed volume. In some embodiments, the operator may perform gestures at the location of the avatar in order to move it to another location. In some embodiments, the avatar may indicate the status of available interactions of the mobile system. For example, the colors of the avatar may be hued red to indicate a fault, or the saturation of the colors of the avatar may be decreased to indicate that the mobile system is checked out or otherwise being configured or used by another operator. In some embodiments, buttons or a control panel may appear near the avatar in the XR environment 651. The buttons may indicate functionality that is available to the operator. For example, a que task virtual button could appear near the avatar. By performing a pressing gesture (e.g., extending the index finger forward) a menu on a virtual display in the XR environment 651 could be created allowing the operating to add a task to this the que of the selected mobile system.

With reference to FIG. 19, extended reality system 498 may be configured to establish an interaction with a mobile system in the same way it was described to establish an interaction with a stationary automation system in the preceding description. In some embodiments, after the operator establishes an interaction with the mobile system an avatar of the selected mobile system may be generated within a fixed volume of the XR environment 651. In some embodiments, extended reality coordinator 822 may be configured to use virtual object manager 826 to generate the avatar for the mobile system. Generating the avatar may include receiving status and permissions information related to the mobile system, providing an object (e.g., three-dimensional shape) representing the mobile system, obtaining the current state (e.g., orientation relative to a virtual camera), and providing a fixed volume within which the avatar should appear. For example, extended reality coordinator 822 may be configured to receive the operations the operator has permission to perform on the automation system from permission manager 824. Extended reality coordinator 822 may be configured to receive a predefined three-dimensional representation of the mobile system from virtual object manager 826. For example, virtual object manager 826 may include a database of three-dimensional representations (e.g., computer aided drawings (CAD)) of the mobile systems. In some embodiments, extended reality coordinator 822 may be configured to modify the layout or colors of the avatar based on the permissions received from permission manager 824. For example, the colors of the avatar may be hued red to indicate a fault or the saturation of the colors of the avatar may be decreased to indicate that the mobile system is checked out or otherwise being configured or used by another operator. In some embodiments, buttons or a control panel may appear near the avatar in the XR environment 651. The buttons may indicate functionality that is available to the operator. In some embodiments, extended reality coordinator 822 may be configured to provide the avatar with a location after receiving the permissions and the three-dimensional representation.

In some embodiments, after receiving the avatar and the location, XR enabled device (602-606) may be configured to produce an image of the virtual control panel. For example, the AR headset 602 may calculate the location an image should be placed on each half of the at least partially transparent display (one image for each eye) to cause the mobile to appear at the provided location. The AR headset 602 may generate the images at the calculated locations on the display. And the calculations and generating of the images may be repeated so that the avatar appears to remain at the provided location even as the operator changes their perspective (e.g., location or head orientation). In some embodiments, virtual object manager 826 may receive motion information from the sensors (e.g., an IMU) of mobile system either directly or through data repository 494. Virtual object manager 826 may use the received motion information to determine the orientation of the mobile system relative to a fixed camera position and send the orientation information to the extended reality coordinator 822 continually so that the avatar maintains a fluid motion as the real-world mobile system changes its orientation. In some embodiments, objects being carried by the mobile system or otherwise interacting with the mobile system may be indicated on the avatar. For example, virtual object manager 826 may include a repository of virtual representations of various objects. If an object is currently being carried by the mobile system, virtual object manager may add the virtual representation of that object to the avatar before sending the three-dimensional representation to extended reality coordinator 822.

In some embodiments, extended reality coordinator 822 may be configured to receive requests to transmit commands or configurations to the mobile systems of the plant or location. For example, extended reality coordinator may send a command over network 490 via communications interface 802 to the plant monitoring system for execution. In some embodiments, the requests are provided by the XR enabled devices (602-606). In some embodiments, the requests are provided based on gestures performed at the location of the avatar or any controls added near the avatar. For example, extending an index finger forward towards a button near the avatar may cause the button to be activated. A name or identifier of an activated button may be sent to extended reality system 498 for processing. In some embodiments, extended reality system 498 may process the activated button by receiving the callback (e.g., operations that should be executed after interaction with a UI component) for that button from command manager 828 and executing the callback. In some embodiments, the callback includes sending a command to plant monitoring system 496 to execute a command related to the mobile system. For example, the command may be to add a task to the que of the mobile system.

In some embodiments, the operator may be able to change fixed volume of the avatar of the mobile system or where the avatar appears. For example, a pinch gesture at the location of the avatar may allow the operator to carry the avatar to second location. In some embodiments, AR headset 602 may recognize the pinch gesture allow the avatar to be carried. AR headset 602 may also recognize the opening of the hand gesture to set the avatar at the new location. AR headset 602 may also recognize various voice commands to relocate the avatar, for example, “follow me” or “move virtual control panel 10 meters to my left.” In some embodiments, the AR headset may be configured to periodically update the position of the avatar by sending the location and orientation to extended reality system 498. Virtual object manager 826 may be configured to save the updated locations so that anyone viewing the XR environment 651 will see the avatar at its updated location. Advantageously, the avatar allows an operator to view a representation of the mobile system even when the system is far away or when its view is obscured by other equipment within the plant. The avatar also may allow the operator to have a visual representation of the mobile system during configuration or scheduling of that system while it is operational. This may not be possible with a traditional fixed location HMI; if the system is operational, it may be moving and the onboard control panel would not be accessible or if the control panel is in a fixed location, the mobile system may be out of sight during the configuration.

Figure 23:
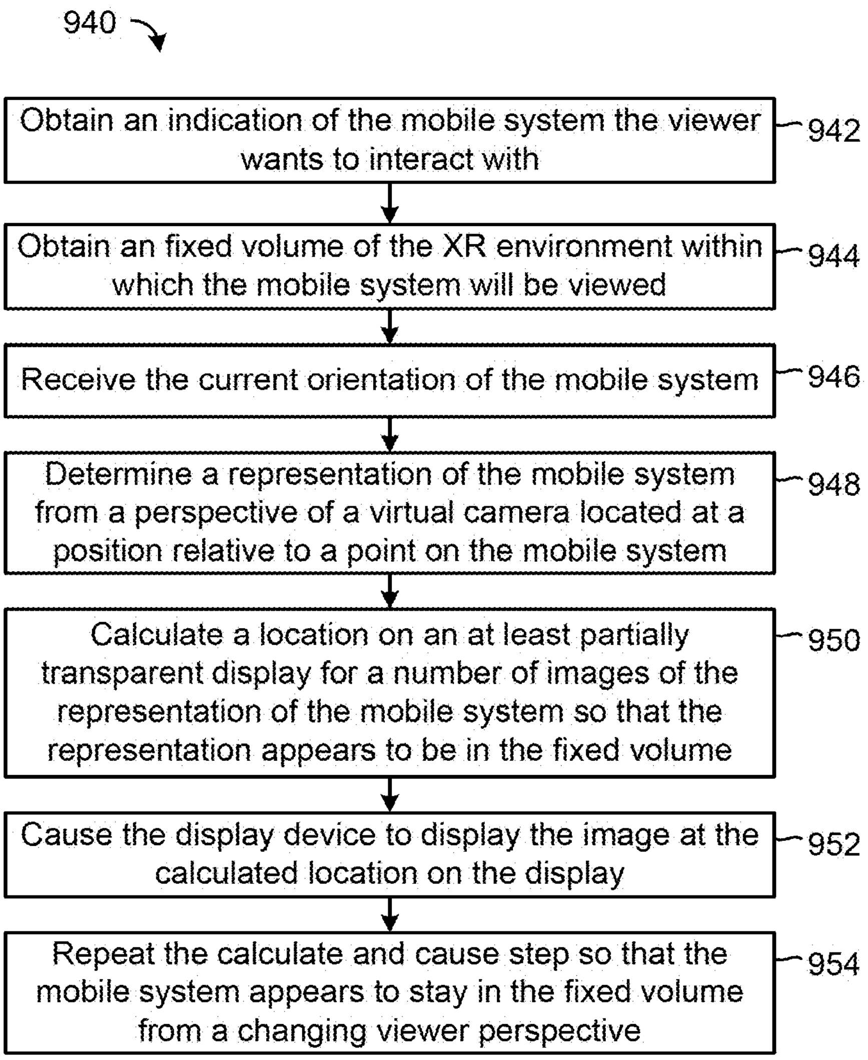
FIG. 23 is a flow diagram for viewing an avatar of a mobile system within a fixed volume of an extended reality environment, according to some embodiments.

With reference to FIG. 23, sequence of operations 940 provides an approach to generate the appearance of a three-dimensional avatar of a mobile system according to some embodiments. The sequence 940, for example, can be performed by XR enabled plant operations system 600. In some embodiments, sequence 940 includes obtaining an indication of the mobile system with which the operator wants to interact in step 942. A request to interact with a mobile system may come from any device and be sent over the network to the extended reality system (e.g., extended reality system 498498). In some embodiments, the operator establishes an interaction with the mobile system by accessing the real-world control panel. In some embodiments, the other methods for establishing an interaction with the mobile system are also available to the operator. For example, the operator may establish an interaction by viewing a QR code, by pointing at the mobile system, by speaking the unique identifier of the mobile system, by looking at the mobile system and making a gesture or utterance, or any combination of thereof. In some embodiments, sequence 940 includes obtaining a fixed volume of the XR environment 651 within which the mobile system will be viewed in step 944. For example, the fixed volume may always be a cube of a specific width on the operator's desk. In some embodiments, sequence 940 includes receiving the current orientation of the mobile system in step 946. For example, the orientation may be determined from the onboard sensors of the mobile system (e.g., an IMU). In some embodiments, sequence 940 may include determining a representation of the mobile system from a perspective of a virtual camera located at a position relative to a point on the mobile system in step 948. For example, the extended reality system 498 may have a repository of virtual representations of the mobile system. The representations may be modified based on the orientation of the mobile system relative to a fixed virtual camera perspective (e.g., as an AMR turns, etc.) that moves with the mobile system or based on motion of a component of the mobile system (e.g., the mobile system such as an AMR may extend its loading platform) before being transmitted to the extended reality headset and ultimately seen by the viewer. In some embodiments, the representation may include additional representations of objects that the mobile system is interacting with. For example, if the mobile system is carrying a package, the representation of the mobile system may contain a virtual object representing that package. The virtual object could be any suitable shape including a generic box of approximately the correct size (potentially with an indication of what the box represents) or a detailed three-dimensional representation of the object or package.

In some embodiments, sequence 940 includes calculating a location on an at least partially transparent display for a number of images of the representation of the mobile system so that the representation appears to be in the fixed volume in step 950. For example, if the display device is an AR headset, the calculations will be performed for each half of the at least partially transparent display (e.g., one image for each eye). In some embodiments, sequency 940 includes causing the display device to display the number of images at the calculated location on the display in step 952. In some embodiments, sequence 940 includes repeating steps 946 through 952 to cause a periodically updated representation of the mobile system to appear at the fixed volume from a changing viewer perspective. For example, as the system sends new status or orientation data to the data repository, the data may be used to generate new representations of the mobile system; and as the viewer changes their perspective, the calculations may be performed to determine new locations on the at least partially transparent display so that the virtual representation of the mobile system appears to remain in the fixed volume. In some embodiments, the steps may be repeated often enough so that the update is perceived by the eye as fluid motion and the virtual representation does not appear to move from its location even if the viewer changes their perspective rapidly (e.g., 30 times per second or 60 times per second). In some embodiments, the calculation of the location on the display the images are to be displayed is repeated at a different rate than updating the representation with the latest orientation and or status. For example, steps 950 and 952 may be performed 60 times per second, but steps 946 and 948 may only be performed 2 times per second. In some embodiments, determining a representation of the mobile system may occur more often than receiving its orientation or status. For example, determining a representation of a mobile system may occur 30 times per second in order to maintain the appearance of fluid motion; however, it may not be practical to receive status updates at that frequency. In some embodiments, the extended reality system 498 may run animations of the mobile system for certain states. For example, in an "unloading" state, an animation of the loading surface of an AMR may be shown retracting rather than receiving the exact amount by which the loading surface is currently extended. In some embodiments, different degrees of an animated state may be received by the extended reality system 498. For example, the extended reality system 498 may receive that unloading is 20% complete and use that information to periodically synchronize the animation with the real-world status.

Manipulating Time and Replay of Events in Extended Reality

In some applications of an automation system, it may be beneficial to view an interactive replay of the operations in order to trouble shoot and/or diagnose faults within the system. The present disclosure provides systems and methods to generate an extended reality environment with the virtual representations of the various assets of the automation system. Some aspects of an automation system progress very quickly relative to what a human can perceive. It may be advantageous for the extended reality system 498 to slow down operations so that a human can process the information. Other aspects of an automation system may progress very slowly and it would not be economical for an operator to view the entirety of the replay. It may be advantageous to speed up time to allow the operator to scan for potential faulty behavior or to jump to times at which the system flagged potentially anomalous behavior.

Figure 24:
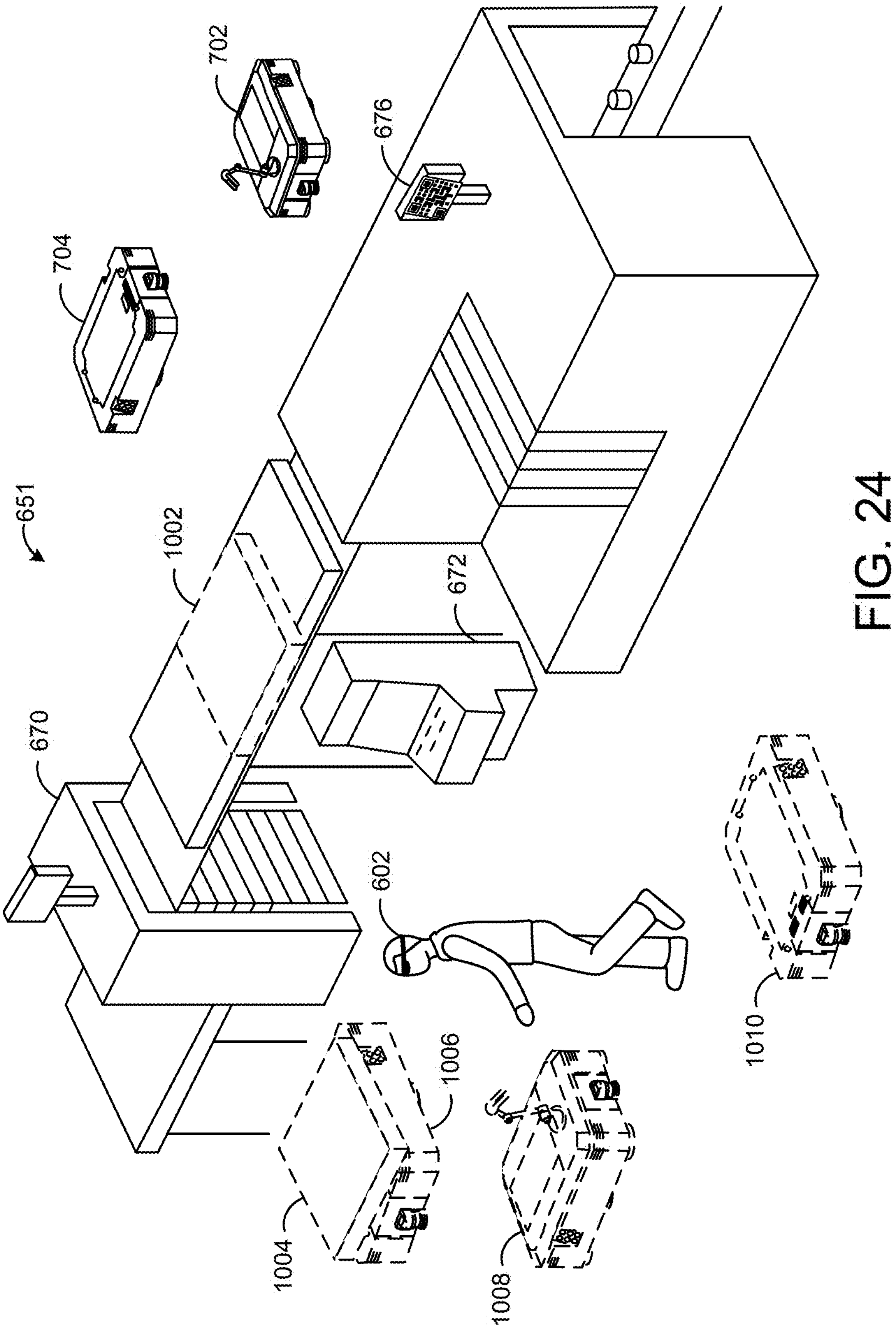
FIG. 24 is an illustrative view of a replay of an automation system in an extended reality environment, according to some embodiments.

FIG. 24 shows XR environment 651 according to some embodiments. In some embodiments, XR environment 651 contains real-world items (e.g., automation system 670, control panel 672, AMR 702 and 704) and virtual objects (e.g., virtual package 1002 and 1004, and virtual representations of AMRs 1006, 1008, and 1010. In some embodiments, an extended reality system 498 may be used to create a replay of the operations of at least a portion of the automation system. For example, the operator may be interested in why production was lower two days ago than yesterday. The operator could trigger a replay by using any suitable method for interacting with the XR environment 651 (e.g., by saying "initialize scene to two days ago at 12:15 PM"). In some embodiments, to initialize a scene, the virtual objects may be generated and a location sent to AR headset 602. AR headset 602 may generate images of the virtual objects on its at least partially transparent display dependent on the perspective of the operator. For example, only the images of virtual objects for which its location is in the field of view of the operator would be created. In some embodiments, a repository of various representations of the assets are stored and used to generate the virtual objects and their images. By storing a repository of various representations, it may be possible to generate a scene (e.g., for replay) with minimal storage of data. For example, each AMR (e.g., AMR 400) may require only its location, orientation, and state of any attachments (e.g., current extension of the load-bearing surface) to generate an XR replay of the assets. In some embodiments, the operator may use voice commands (e.g., "play scene," "stop playback," "go to time 12:19") to control the playback of the replay. At any time, the operator is able to walk around the location of the automation system to change their perspective. For example, to get a better view of an area of interest. Advantageously, a mixed reality environment is able to utilize fixed location objects that would have existed in the real-world during the time of the playback. For example, there may not be a need to produce a virtual object for processing system 670 because it still exists in the real world and its location is fixed. In some embodiments, overlays (e.g., images that cause real world objects to change color hue) may be available to help distinguish between real world objects that are part of the scene and real-world objects that were not at that location at the time of the playback scene. For example, AMRs 702 and 704 may have changed their location and are not part of the playback; they may be represented with a red overlay.

With reference to FIG. 24, an example use case may include the operator starting a scene to view automation system 670 and determine why production was lower two days ago than yesterday. The operator may start by saying "initialize scene to two days ago at 12:15 PM." The operator may then view the processing system from various angles. Virtual package 1002 representing a package may be difficult to view because of the existence of real world packages that are being processed today. The operator may ask for a red overlay on packages that did not exist at the time of the playback. The operator may start playback by saying "start playback." By viewing automation system 670 in the XR playback environment, the operator may notice that there is more space between packages on the upper conveyor. In response the operator may view the parameters of automation system 670 as configured two days ago (e.g., control panel 672, by creating a virtual control panel, or another suitable method for viewing the configuration of a processing system.

In some embodiments, the speed of the playback may be changed by the operator. Advantageously, this may allow the operator to view behaviors that occur too quickly for the operator to perceive or to skim the behavior of the assets to look for faults in the XR environment 651. For example, the AMRs represented by virtual representation 1006 and 1008 may have come into contact. The operator may initialize the scene to the correct time, move to a location near the collision, and view the two virtual representations in the XR environment 651. The operator may request a playback speed of 25% and begin playback. At this playback speed the operator may be able to notice the AMR represented by virtual representation 1008 turned just prior to the collision. The operator can now trouble shoot the AMR to see why it turned or why the two AMRs were close enough to have the turn cause a collision.

In some embodiments, the replays can be performed in a virtual reality environment. In a virtual reality environment, it may be necessary to generate a virtual representation of the real-world objects that have a fixed location as well (e.g., automation system 670). Playback of a mixed reality system may be advantageous in some applications because there is no confusion between objects that existed at the time of the simulation and those that did not (e.g., those that did not exist simply would not be rendered in a virtual reality environment). In some embodiments, playback may be performed on a non-headset device (e.g., a tablet). The playback may be performed similar to virtual reality (e.g., all objects of interest have a virtual representation) or similar to augmented or mixed reality (e.g., fixed location objects may be generated by an image from a camera on the device.

Figure 25:
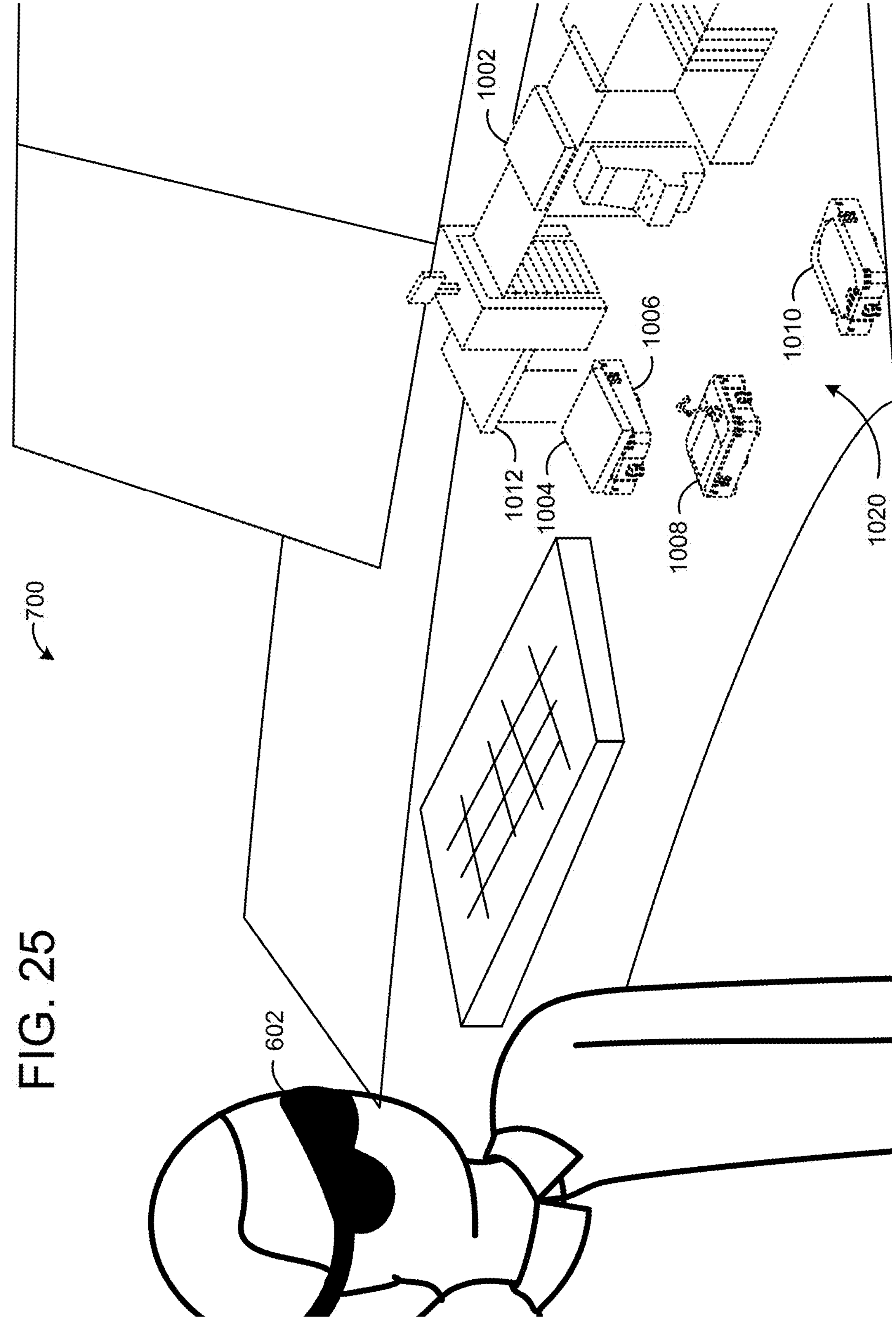
FIG. 25 is an illustrative view of a scaled replay of an automation system in an extended reality environment, according to some embodiments.

With reference to FIG. 25, in some embodiments of the present disclosure the operator may be able to create a three-dimensional rendering of the scene in a smaller fixed volume (e.g., a location on a desk). This may provide the operator the advantages of a three-dimensional view and the ability to see a large field of view of the plant at once. The operator may initialize a scene by saying "initialize scene to two days ago at 12:15 PM at location A." The XR environment 651 may be generated to include all the virtual objects of the scene (e.g., virtual package 1002 and 1004, virtual representations of AMRs 1006, 1008, and 1010, and virtual representation of the processing system 1012 at location A (e.g., location 1020). In some embodiments, the scene may be generated at a remote location (e.g., observation area 700). In some embodiments, the miniaturized representation of the plant operations system may allow any of the playback features already discussed (e.g., play, stop, slow playback speed, speed up playback, jump to time, etc.). In addition, in some embodiments, the operator may be able to zoom in, rotate, or translate the scene. The additional features may be accessed via gestures (e.g., making a grab gesture at a location in the scene with both hands and then pulling the hands apart to zoom), voice commands, or any other suitable method. In some embodiments, the portions of the playback environment outside of a predefined boundary after rotation, zooming, or translating, may be truncated (e.g., not displayed).

Figure 26:
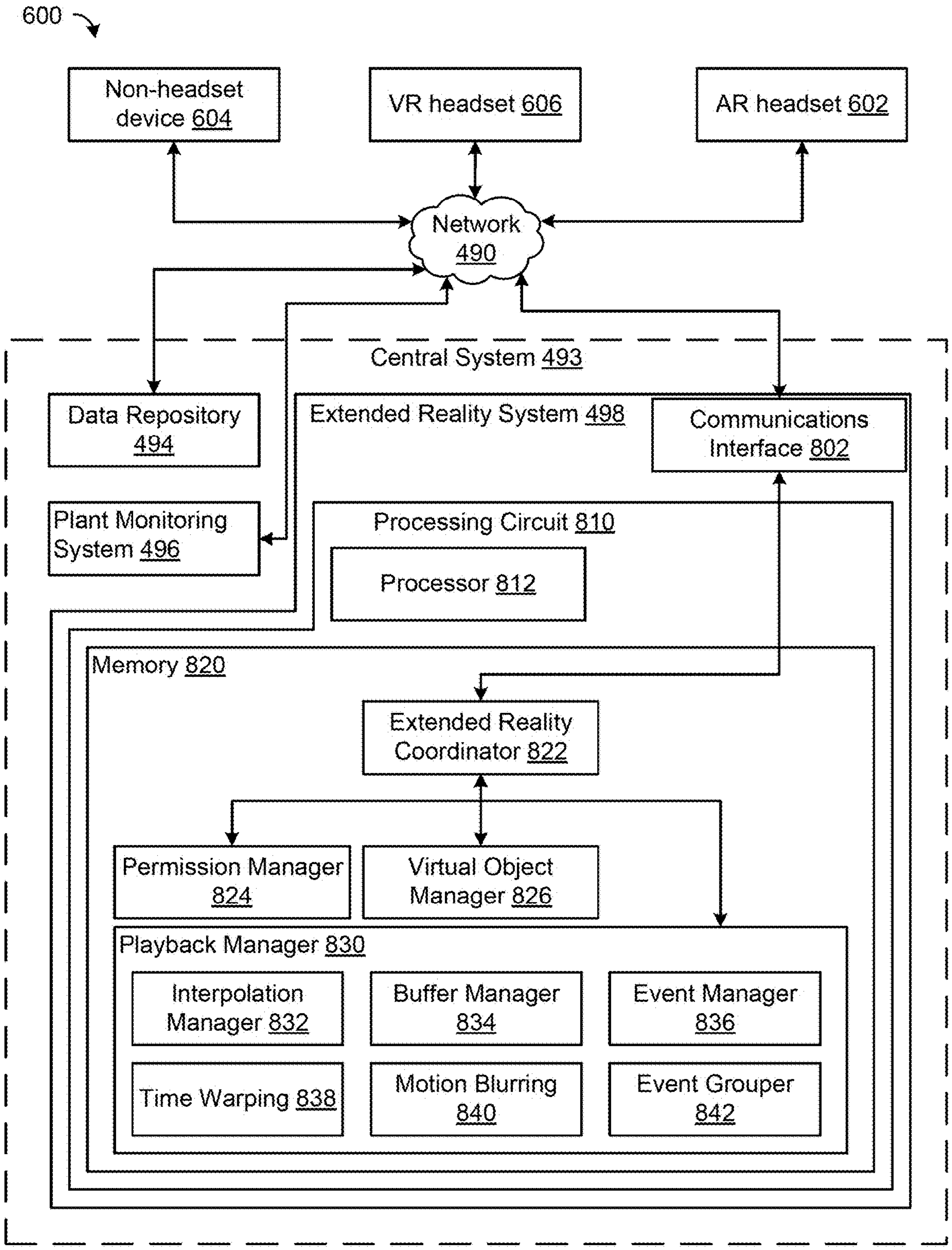
FIG. 26 is a block diagram of a central system configured to generate replays of an automation system in an extended reality environment, according to some embodiments.

With reference to FIG. 26, extended reality enabled plant operations system 600 is shown, according to some embodiments. In some embodiments, extended reality enabled plant operations system 600 includes a number of VR headsets (e.g., headset 606), a number of AR headsets (e.g., headset 602), a number of non-headset devices (e.g., device 604), data repository 494, plant monitoring system 496, and extended reality system 498 all communicably connected by network 490. In some embodiments, extended reality system 498 may perform the majority of the operations to realize the extended reality enabled plant operations system with replaying events and manipulating time; however, in some embodiments, the operations may be distributed across any of the systems shown in extended reality enabled plant operations system 600 including data repository 494, plant monitoring system 496, extended reality system 498, or any of the headset or non-headset XR enabling devices (e.g., devices 602-606).

In some embodiments, extended reality system 498 includes communications interface 802 and processing circuit 810. In some embodiments, processing circuit 810 contains processor 812 and memory 820. The processors may be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.). The processors may be configured in various computer architectures, such as graphics processing units (GPUs), distributed computing architectures, cloud server architectures, client-server architectures, or various combinations thereof. One or more first processors can be implemented by a first device, such as an edge device, and one or more second processors can be implemented by a second device, such as a server or other device that is communicatively coupled with the first device and may have greater processor and/or memory resources. The memories may include one or more devices (e.g., memory units, memory devices, storage devices, etc.) for storing data and/or computer code for completing and/or facilitating the various processes described in the present disclosure. The memories may include random access memory (RAM), read-only memory (ROM), hard drive storage, temporary storage, non-volatile memory, flash memory, optical memory, or any other suitable memory for storing software objects and/or computer instructions. The memories may include database components, object code components, script components, or any other type of information structure for supporting the various activities and information structures described in the present disclosure. The memories may be communicably connected to the processors and can include computer code for executing (e.g., by the processors) one or more processes described herein.

In some embodiments, memory 820 contains various modules and/or instruction sets to facilitate the functionality of extended reality system 498. In some embodiments, memory 820 includes extended reality coordinator 822, permissions manager 824, virtual object manager 826, and playback manager 830. In some embodiments, memory 820 may also contain modules and/or instruction sets to facility the features or operations discussed in other sections of the present disclosure, but not needed for the discussion of time manipulation or event replays. In some embodiments, extended reality system is responsible for generating a playback in a default coordinate system, (e.g., the coordinate system of the actual plant containing the automation system) and AR headset 602 or other device is responsible for scaling the objects to fit in the volume of the XR environment 651. For example, the AR headset could perform no scaling and the virtual objects of the playback would appear within an XR environment 651 that includes the entire plant or the AR headset could scale the system such that an XR environment 651 of the entire plant exists within a fixed volume on a desk or table. In some embodiments, these operations are split across the various devices and processors in a different manner.

In some embodiments, a playback session is initialized by providing a voice command similar to "initialize a playback to 12:45 PM." Such a command may be sent from a device (e.g., device 602-606) over network 490 to communications interface 802. Extended reality coordinator 822 may be configured to process the command by using the permissions manager 824 to first determine if the operator using the device the command came from has permissions to view the requested playback. For example, permissions manager may include a mapping between devices and the operator currently using the devices, between an operator and their roles, and between roles and permissions and use these mappings to determine if the device from which the request came should be granted permission to view the playback.

In some embodiments, after permission of viewing the playback is granted, extended reality coordinator 822 may be configured to use virtual object manager 826 and data from the data repository 494 in order to generate a playback of the equipment. To initialize a scene extended reality coordinator 822 may be configured to obtain data related to the location, orientation, and status of any of the assets or any components thereof that are to be included in the playback from the data repository at the requested time. Extended reality coordinator 822 may also be configured to receive virtual representations of the assets or components thereof from virtual object manager 826. The combination of the location, orientation, and status with the virtual representations may allow extended reality coordinator 822 or the requesting device (e.g., device 602-606) to cause a number of images to be generated on the display of the requesting device so that the virtual representations of the assets appear at the location with the correct orientation. In some embodiments, if data repository 494 or the XR enabled plant operations system 600 in its entirety does not have a sample for at least one of the location, orientation, or status at the time requested, extended reality coordinator 822 may be configured to use interpolation manager 832 of playback manager 830 in order to determine an initial location, orientation, or status based on samples of the same closest to the requested time.

In some embodiments, after a scene is initiated, extended reality coordinator 822 may be configured to use playback manager 830 to generate a sequence of locations, orientations, and status or an equivalent set that when updated at an appropriate rate (e.g., 30 times per second) the virtual objects and/or virtual representations of automation system assets appear to be in continuous motion. There may be different sample rates available within each device data is stored and it is the responsibility of XR enabled plant operations system 600 to increase the sample rate to a rate that would appear to be continuous motion when viewed on a display device. For example, XR enabled plant operations system 600 may store location, orientation, and status data at least every 10 seconds, but may increase the storage rate if assets are moving quickly and/or an event is logged (e.g., interaction with another asset, etc.) and the display device may require samples every 1/30 seconds.

Virtual representation data may refer to the location, orientation, and status of the asset. Virtual representation data may include all the data required to create the virtual representation of the asset in the XR environment 651. A frame may refer to a static three-dimensional representation of the assets included in a playback. A frame, for example, may be the combination of a models of the assets (e.g., their three-dimensional representation) and the virtual representation data of the assets. To create the illusion of smooth motion the frame may need to be updated a certain number of times per second (e.g., 30 times per second). The images created on a display device to view an XR environment 651 may be updated based on the frame update and based on an update to the user's perspective.

In some embodiments, extended reality coordinator 822 may be configured to query the data required for the virtual representation data of the assets within a playback request. The data may be stored at various times either periodically or aperiodically (e.g., intermittently, at irregular intervals, etc.). Extended reality coordinator 822 may be configured to cause interpolation manager 832 to generate periodic virtual representation data at a first rate. Extended reality coordinator 822 may be configured to combine models of the assets stored in virtual object manager 826 and the periodic virtual representation data from interpolation manager 832 to generate periodic frames. These frames may be communicated to the display device (e.g., device 602-606). The display device may perform further interpolation on the periodic frames so that the images are updated at a rate that is perceived by a human as continuous motion. For example, the data included in the virtual representation data may be stored aperiodically, but on average every 2 seconds, interpolation manager 832 may generate data that is periodic and has a sample every 200 milliseconds, and the display device may ultimately update the images 60 times per second. In some embodiments, the responsibility of interpolation may be distributed across the devices in a different manner. For example, the interpolation manager 832 may generate samples that are often enough that interpolation at the display device is not required, or all the interpolation may be performed in the display device.

Interpolation manager 832 may be configured to use various interpolation techniques to generate the periodic virtual representation data. In some embodiments, interpolation manager 832 may be configured with instructions to perform linear interpolation. To perform linear interpolation, new sample times are created for each variable of the virtual representation data at the required periodicity values for those sample times are then filled in using the stored data both proceeding and following each new sample time using linear interpolation. In some embodiments, interpolation manager 832 may be configured with instructions to perform spline interpolation. Spline interpolation may generate the periodic sample times similar to linear interpolation, but fill in values using a set of polynomials (e.g., cubic terms) that pass through the stored data points and form a function that is continuous with continuous first and second derivatives. Spline interpolation may be done for each variable independently or sets of variables may be grouped into a multi-dimensional space and interpolation may be performed using a parameterization that maps a value of a parameter to each point in the multi-dimensional space. Grouping spatial variables may be important to obtain natural motion paths after interpolation, but any number of variables can be grouped together. In some embodiments, a dynamic systems model of the asset may be used to perform the interpolation. Given some subset of the data the best estimate of the virtual representation data at a given time can be determined using the subset of data and the dynamic system model. If the dynamic system model is used, it may be required to store the inputs to the dynamic system model for use by interpolation manager 832. In some embodiments, interpolation manager 832 may use a first technique for generating the periodic virtual representation data and the device may use a second interpolation technique for generating the image on the display device at a rate that is perceived by a human as continuous motion.

In some embodiments, buffer manager 834 may be configured with instructions to store future frames or periodic virtual representation data to be sent to the display device. If the interpolation manager cannot generate the periodic virtual representation data at least as fast as the display device would use it during playback, data may be stored in the buffer manager and sent to the display device when there is enough information to execute an amount of the playback. For example, buffer manager may be configured with instructions to monitor the calculations of interpolation manager 832 and determine an estimated time the calculations required to execute an amount of playback (e.g., one minute) will be completed. Buffer manager 834 may store data calculated using interpolation manager 832 until buffer manager determines the amount of time remaining for the calculations is equal to the amount of playback and then communicates to extended reality coordinator 822 to begin the playback on the display device. In some embodiments, use of buffer manager 834 guarantees a certain amount of continuous playback at the required framerate.

In some embodiments, event manager 836 may be configured with instructions to store or receive the time of events of interest that occurred within the automation system or to assets of the automation system. For example, event manager 836 may be used to obtain each loading and unloading that an AMR performed from data repository 494. In some embodiments, event manager 836 may be configured with instructions to generate an index of each of the times of interest. For example, event manager 836 may be used to develop a timeline for an asset or groups of assets, the timeline may be superimposed on a map or floorplan of the site. The timeline may be used by an operator to choose different times of playback. For example, choosing an event may start playback an amount of time prior to the time of the event so that the operator can see the sequence leading up to the event of interest. In some embodiments, the amount of time may depend on the type of event or other factors that may be indicative of how much time leading up to the event would be of interest. In some embodiments, plant monitoring system 496 identifies times of interest for the assets and communicates those times of interest to event manager 836. For example, plant monitoring system 496 may send the times of any detected fault to event manager 836.

In some embodiments, similar events can be grouped. Playback manager 830 may be configured to include event grouper 842. Event grouper may be configured to cause interpolation manager 832 to create periodic virtual representation data for an asset that is shifted in time. In this way virtual representations for an asset during similar events can be added to the same frame by virtual object manager 826. The virtual representation may even be the same asset at different times but performing the same or similar task. For example, event grouper 842 may create a group of events where an AMR is carrying a package from one location to another. The virtual representation data of the assets could be shifted in time so that a number of virtual representations of assets appear in the same frame. During playback an operator can then compare the motion of the number of assets to determine which is performing the best. The operator may be able to change configurations of the assets performing less well to the same configuration as the better performing assets. Event grouper may also be configured to cause event manager 836 to determine a time in the playback of each event where the assets are synchronized (e.g., by finding maximum correlation of virtual representation data). The time may be used by interpolation manager 832 to shift the virtual representation data, to better facilitate the comparison.

In some embodiments, the operator may be able to remove a virtual representation of an asset from the playback. This may, for example, be done manually through a configuration menu or automatically based on the assets involved in the events stored by event manager 836 and potentially grouped by event grouper 842.

In some embodiments, event manager 836 may be configured to cause playback of a historical event to synchronize with the live operations of a similar event. Event manager 836 may receive recent virtual representation data (e.g., last 5 minutes) and historical virtual representation data from times proximate the event of interest from data repository 494. Event manager may take the recent virtual representation data and virtual representation data from times proximate the event and perform a correlation between time shifted versions of the two data sets. The time shift of maximum correlation may be used to synchronize the historical data by causing playback manager 830 to playback operations shifted from real time by the time shift of maximum correlation.

In some embodiments, playback manager 830 includes time warping 838. Time warping 838 may be configured with instructions to cause changes in the playback speed. Time warping 838 may be used to cause the interpolation manager to create additional samples so that motion of the virtual representation of the assets appears continuous even at slower playback speeds. For example, time warping may generate a number that is the rate at which time progresses relative to real time (e.g., 0.25 represents a playback slowed to 0.25 times real-speed and 4 represents represent 4 times faster than real speed). In some embodiments, time warping 838 is used to provide a playback speed to the extended reality coordinator 822 and to interpolation manager 832. The playback speed may be communicated to one of the display devices to affect the speed at which time progresses during the playback of operations. Interpolation manager may use the playback speed to create more samples of the virtual representation data (e.g., if playback speed is 0.25 and interpolation manager 832 typically generates 10 samples per second, it may generate 40 samples per second for the time period the playback speed is 0.25), or interpolation manager 832 may create less samples of the virtual representation data if the playback speed is greater than one. In some embodiments, time warping 838 is configured to cause the determination of a playback speed based on the speed at which objects are changing position. For example, time warping 838 may obtain samples of asset location data, calculate a speed, and determine a playback speed based on that calculation. The playback speed may be faster when an asset of interest is not in motion or moving slowly and fast when the asset of interest is moving quickly. For example, playback of a motion arm may be 2 times normal speed when it is at rest (e.g., waiting for the next object), but 0.1 times real speed when it is moving. In some embodiments, the operator may provide the playback speed or override the suggested playback speed.

In some embodiments, playback manager contains motion blurring 840. Motion blurring 840 may be used to cause the virtual representations of assets on a number of previous frames to remain in a current frame. Overlaying previous frames on the current frame may have a blurring effect that advantageously allows the operator to see the extent of motion of various assets or components thereof. For example, use of motion blurring 840 may allow the operator to see the extent of the swing of a robot arm as it changes positions, or the paths of several AMRs as they navigate the site. In some embodiments, the virtual representations of assets from previous frames may fade with time. For example, the opacity of the previous virtual representations may decay following an exponential decay function with a time constant of a certain number of frames or a certain amount of time.

In some embodiments, playback manager 830 may be configured cause the playback to appear within a defined fixed volume. For example, the assets of the automation system may be scaled to fit in the volume. The playback generated by playback manager 830 may be of a mobile system as seen from a virtual camera that follows along with the mobile system. In some embodiments, the playback generated by playback manager 830 may be of a portion of a manufacturing plant, building, other location of the automation system. The portion may be scaled to appear within the defined fixed volume so that an operator or other user viewing the extended reality environment may view the replay of events and/or objects within the portion (e.g., space) of the manufacturing plant, building, or the whole manufacturing plant, building, etc.

Figure 27:
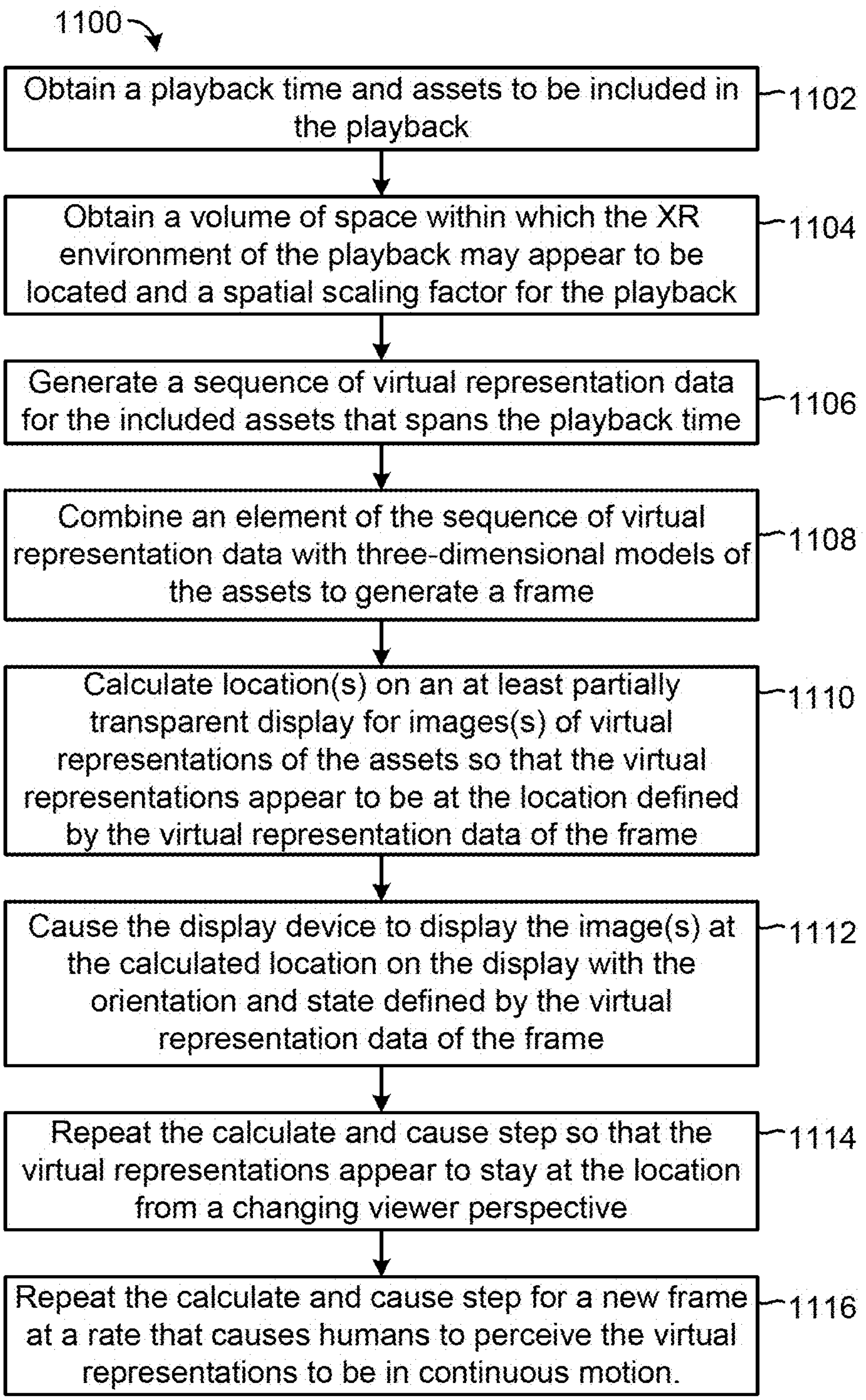
FIG. 27 is a flow diagram for playing back the operations of an automation system in an extended reality environment, according to some embodiments.
Figure 28:
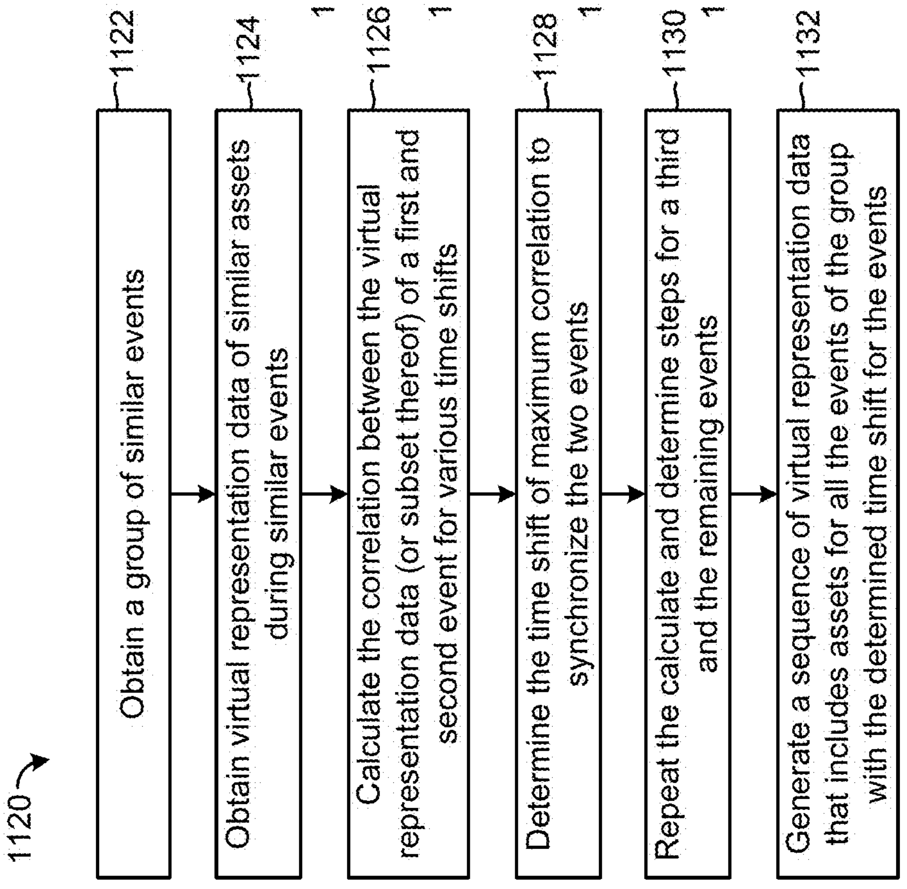
FIG. 28 is a flow diagram for generating a synchronized playback of operations of an automation system in an extended reality environment, according to some embodiments.
Figure 29:
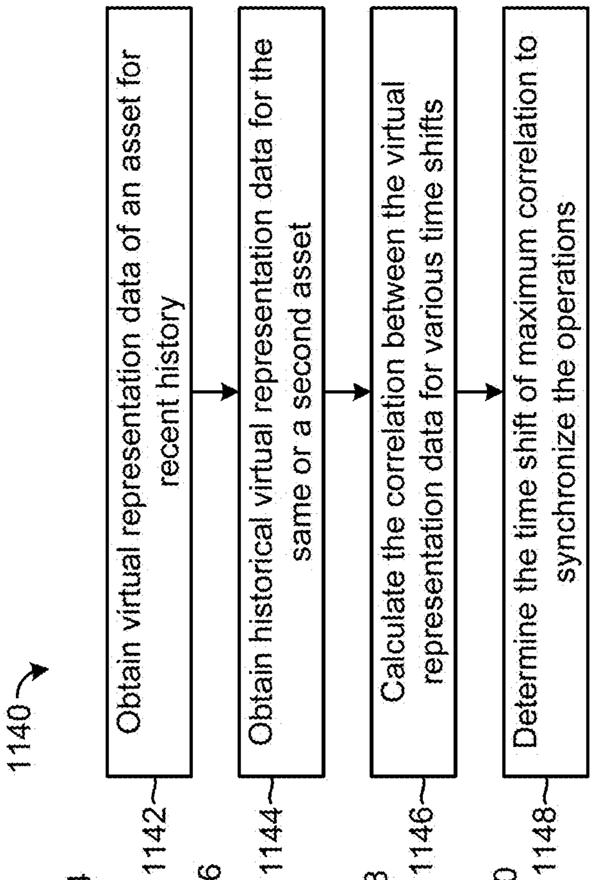
FIG. 29 is a flow diagram for synchronizing playback of operations of an automation system in an extended reality environment, according to some embodiments.

FIGS. 27-29, generally show sequences of operations to cause a playback of events in an extended reality environment, according to some embodiments. The sequences shown, for example, can be performed by XR enabled plant operations system 600. FIG. 27 shows a sequence to perform the general playback in an XR environment, according to some embodiments. It is noted that the order of many of the steps can be changed while still performing playback in an XR environment, order of the steps should not be interpreted as limiting. FIG. 28 and FIG. 29 show additional sequences that may be added to the sequence of FIG. 27 to add additional functionality. While the sequence described by FIG. 27 is written for an embodiment related to an AR headset with an at least partially transparent display, it is contemplated that the sequence of steps could also be used to produce a replay in an XR environment in a VR headset, a device with a display and camera, or any other device capable of creating an AR environment.

FIG. 27 shows sequence of operations 1100, which may be used to produce a playback of operations in an XR environment, according to some embodiments. In some embodiments, sequence 1100 may include obtaining a playback time and assets to be included in the playback in step 1102. Obtaining may refer to receiving the playback time from another device over a communication device. For example, from a user interaction with a menu on separate computer device, table, AR/VR headset, etc.; from a user voice command from an AR/VR headset; or by various gestures recognized by the AR/VR headset. Obtaining may also refer to a default time or asset loaded from the instruction set (e.g., code). In some embodiments, sequence 1100 includes obtaining a volume of space within which the XR environment of the playback may appear to be located and a spatial scaling factor in step 1104. The volume of space may refer to any real-world volume. For example, the entire site of the automation system, a room housing the automation system, a small volume on a desk, etc. The scaling factor may refer to a factor that scales the virtual representation of an object from its real-world size. For example, if the operator has chosen to represent an entire room within a small cubic volume on their desk, the scaling factor may be the length of a side of the cubic volume divided by the largest dimension of the room (e.g., length, width, or height). In some embodiments, the volume may be the whole site and the scaling factor may be one; thus, leading to an immersive life size playback of the historic operations within the XR environment. In some embodiments, it may also be necessary for the operator to provide the real-world space that the operator will view; however, it may be possible to obtain this information by inspecting the extent of the motion of the asset over the time period of the playback or some other technique capable of determining the space that should be included as part of the playback, or the play back will include the entire site by default.

In some embodiments, sequence 1100 includes generating a sequence of virtual representation data for the included assets that spans the playback time in step 1106. Generating a sequence of virtual representation data may require that data for the assets be obtained from a data repository for the correct time span. Generating the sequence of virtual representations may also require that interpolation be performed on the virtual representation data if the data is not stored at a sufficient sampling rate in the data repository. It is contemplated that for a human to perceive motion as continuous, it may be necessary to have relatively large number of frames per second, although lower frame rates may be used at the sacrifice of playback quality (especially, if object speed is slow). In some embodiments, sequence 1100 includes combining an element of the sequence of virtual representation data with a three-dimensional model of the asset, for at least one asset, to generate the frame in step 1108. The combination of the virtual representation data and the three-dimensional model should allow the rendering of a three-dimensional representation of the asset with the location, orientation, and status contained in the virtual representation data.

In some embodiments, sequence 1100 includes calculating location(s) on an at least partially transparent display for images(s) of virtual representations of the assets so that the virtual representations appear to be at the location defined by the virtual representation data of the frame in step 1110. In some embodiments, there may be two images for each virtual representation of the asset to provide for a stereoscopic effect and allow the representation to appear to be anchored (e.g., embedded, inserted, integrated, etc.) in the XR environment. In some embodiments, the display may not be partially transparent, for example, in a VR headset or a handheld device with display and a camera. In some embodiments, process 1100 includes causing the display device to display the image(s) at the calculated location on the display with the orientation and state defined by the virtual representation data of the frame in step 1112. In some embodiments, steps 1110 and 1112 are repeated periodically (e.g., 30 times per second) or as the viewers perspective changes so that the virtual representations appear at the defined location from a changing viewer perspective in step 1114. In some embodiments, sequence 1100 may also include repeating steps 1110 and 1112 for a new frame of the sequence. For example, whether or not step 1114 or 1116 is performed may depend on the number of times per second the images are updated for changing viewer perspectives and how many times per second the frame is updated; if the images are updated 60 times pers second to account for changes in the viewer perspective and the frames are updated 20 times per second, then step 1116 may be performed every third time.

FIG. 28 shows sequence of operations 1120 according to some embodiments. Sequence of operations 1120 may be used to create a playback of operations that include similar events (e.g., at the same location) but at different times and potentially for different assets. The operations may all be anchored within the same XR environment for the playback. Advantageously, allowing playback to have several of the same or similar events included at the same time, may make it easy for an operator to compare the differences between the events and potentially determine a reason for a fault or other undesirable operation of an asset within the automation system. The operator may also be able to compare how assets with different configurations or parameters perform and make changes to the assets that do not perform as well.

In some embodiments, sequence 1120 includes obtaining a group of similar events in step 1122. Similar events may refer to events in which the asset is expected to perform the same task and follow approximately the same motion path (e.g., unloading a package at the same workstation). In some embodiments, sequence 1120 may include obtaining the virtual representation data of similar assets during similar events in step 1124. In some embodiments, the correlation between the virtual representation data for similar events is found for various time shifts in step 1126. The correlation may refer to the traditional statistical definition of correlation and may be found for each variable within the virtual representation data. The correlation may be generalized to account for the special grouping of the three spatial dimensions that may be part of the virtual representation data; for example, by converting the location time series (e.g., in three-dimensional space) of an asset to a single dimensional distance from some location and then applying the traditional statistical definition of correlation on the calculated distance. In some embodiments, a metric other than a correlation can be used with the intention of finding an amount of time shift for which when the time of their operations is shifted by the amount, the operations are approximately the same. The correlation or other method for finding the time shift may be performed on a time subset of the virtual representation data, with the purpose of synchronizing operations near those times. The length of time for the subset may depend on what data is contained in the virtual representation data. For example, if only location is stored, it may be required to have a longer subset of time correlated together to ensure that after the time shift is taken the two operations will be similar; however, if the virtual representation data also includes velocity (and potentially acceleration) less data may be needed as the velocity and acceleration offer some information about future locations. In some embodiments, sequence 1120 includes step 1128 to determine the time shift that causes the maximum correlation (or other metric). This time shift may be used to synchronize the two events.

In some embodiments, sequence 1120 includes repeating the finding of the maximum correlation between the first event and the other events of the group (e.g., third, fourth, etc.) in step 1130. The time shifts found in step 1130 may be used in order to synchronize the operations of the assets in each event of the group. In some embodiments, sequence 1120 includes generating a sequence of virtual representation data that includes assets for all the events of the group with the determined time shift for the events in step 1132. After sequence 1120 is performed it may be possible to begin a playback of the XR environment with all the time shifted events occurring. For example, sequence 1100 may be performed with the time shifted virtual representation data. By shifting the times of the virtual representation data, the virtual representations of the assets may appear in the playback at a coincident time and location allowing the operator to compare any divergence in the operations.

FIG. 29 shows sequence of operations 1140 according to some embodiments. Sequence of operations 1140 may be used to cause past operations of an asset to be coincident with current operations of the asset or different asset performing a similar task or operations within the XR environment. For example, the operator may wish to compare current operations of an asset with previous operations.

In some embodiments, sequence 1140 includes obtaining recent history of virtual representation data of an asset in step 1142. The recent history may provide a basis by which to find historical operations that have a similar performance and can be synchronized to the current operations. For example, the recent history may include the most recent 15 seconds of virtual representation data for the asset. Although the amount of time may be dependent on the speed at which the operations occur. In some embodiments, sequence 1140 includes obtaining historical virtual representation data for the same or a second asset in step 1144. The asset may be any asset that an operator wishes to compare current operations to (e.g., an asset known to perform well, or an asset known to perform poorly). In some embodiments, sequence 1140 includes calculating a correlation between the virtual representation data of the recent history of the asset and that of the historical operations of the same asset or a second asset in step 1146. For example, the correlation (or other metric) could be calculated as described in the discussion of sequence 1120. In some embodiments, sequence 1140 may include determining the time shift of maximum correlation in order to synchronize the two events or operations in step 1148. After the time shift is found, the historical virtual representation data may be shifted by that amount of time and a playback started (e.g., by performing sequence 1100 or a portion thereof).

In some embodiments, any time a new frame is displayed on a display device, the old frame is removed from the display. However, in some investigation scenarios performed by the operator it may be advantageous to leave a trail of the operations of an asset. For example, to see the extent of motion of an asset or component thereof similar to how a human eye perceives the motion of a fast-moving light source in a dark environment. In some embodiments, previous frames may be left on the display device to cause this trailing effect. In some embodiments, previous frames may fade away. For example, by multiplying their opacity by a factor between zero and one on each frame update thereby causing the trail of the motion to fade away exponentially (or geometrically) in the past. The permanence of the trail may depend on the factor and the frame update rate. For example, if the opacity is multiplied by a factor of 0.95 on every update, the time constant by which the trail fades would be approximately 20 frames or 1 second if the frame update rate is 20 frames per second.

Simulation of Adding Infrastructure in Extended Reality

In some embodiments of an automation system, it may be helpful to visualize how the assets of the automation will behave with added equipment and/or objects. For example, there may be a planned expansion of the plant that includes adding track and carts to an ICT system; there may be proposal to increase the AMR fleet by 10%; or plant processing may be expected to increase by 10%. In any of these situations an operator may desire to view operations of the new automation system in an extended reality (XR) environment. The XR environment could be creating using a virtual-reality (VR) head set in which the operations of all devices are simulated; using an AR headset in which a portion of the operations may be simulated and another portion of the operations may be executed by real equipment; or on non-headset devices either fully simulated or partially simulated. It may also be helpful to view the results of a planned reduction in assets or infrastructure, for example, decreasing an AMR fleet by 10%.

Figure 30:
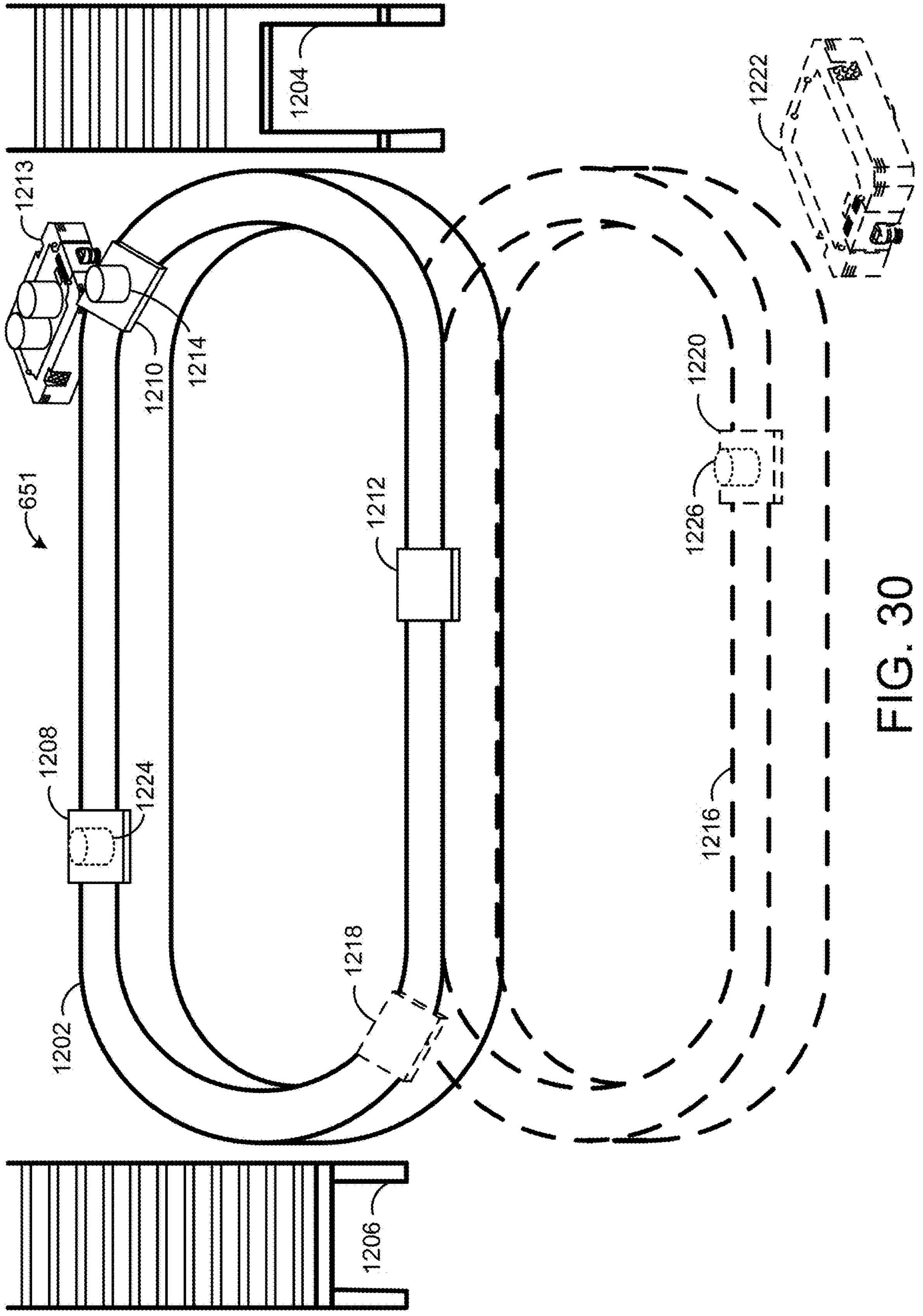
FIG. 30 is an illustrative view of a simulation including a real portion and a virtualized portion in an extended reality environment, according to some embodiments.

FIG. 30 shows an XR environment 651 according to some embodiments. In some embodiments, XR environment 651 includes an ICT system configured to move canisters from one side of the plant to another and AMRs configured to bring canisters to a loading bay. The operator may be considering adding additional ICT track and carts to move some canisters to second processing location. The operator may additionally be considering adding AMRs to increase production capacity. In some embodiments, XR environment 651 includes real-world objects and assets including ICT track 1202, loading station 1204, unloading station 1206, ICT carts 1208, 1210, and 1212, AMR 1213, and various canisters (e.g., canister 1214); and XR environment 651 includes virtual objects including additional track 1216, additional carts 1218 and 1220, additional AMR 1222, and additional canisters 1224 and 1226.

In some embodiments, XR environment 651 may be used to view a simulation of an automation system with the addition of assets or objects that need to be processed. An immersive three-dimensional environment may be advantageous as it provides the operator with the ability to inspect operations from various locations, observe clearances of the new assets within the real-world environment, and determine if the additional assets will provide the expected improvements to the operations of the automation system. With reference to FIG. 30 the operator has developed a simulation within the XR environment 651 to observe plant operations with the installation of the new assets, equipment, and objects according to some embodiments. The operator may have developed the simulation from a computer workstation (e.g., using a traditional palette), or by interacting with virtual objects within XR environment 651. For example, the XR environment 651 may provide a "system expansion" mode. In the system expansion mode, a palette may be present in a certain area of the operator's field of view. The palette may contain various assets, equipment, etc. that could be added to the existing plant (e.g., additional track, additional carts, etc.). The operator may manipulate them into position using various hand gestures and or voice commands as described in any of the sections of the present disclosure and then execute an XR environment simulation. For example, the operator may have the virtual objects including additional track 1216, additional carts 1218 and 1220, additional AMR 1222, and additional canisters 1224 and 1226 to XR environment 651 to simulate a new automation system design.

In some embodiments, a system reduction mode can be entered. In system reduction mode the operator may be presented with a listing of equipment of the automation system or the user may select the physical objects in the XR environment 651 to remove that equipment. Equipment selected for removal may be indicated with an overlay, for example, a virtual object that is superimposed on the physical object and causes it to be shaded red. Simulations of equipment with deleted assets may be performed similarly to those with additional assets.

During an execution, the simulator may simulate the motion of all the assets of the XR environment 651 (real-world and virtual). In some embodiments, all assets of the simulation may be represented by virtual objects in the XR environment 651. This may be of particular use in the case of a VR environment where the real-world objects cannot be directly seen or in a MR environment where the current operations of the system cannot be disrupted. In some embodiments, a portion of the assets of the simulation may be represented by the real-world objects (e.g., in an MR environment). Representing a portion of the assets of the simulation may be of particular use to verify operations and the simulation simultaneously as real-world feedback and be obtained from the objects. XR environment 651, for example, may be operating such that all the virtual objects (indicated with dotted lines) are added to XR environment 651 to represent simulated objects for which no real-world object is available, and real-world objects including ICT cart 1208, 1210, and 1212, AMR 1213, and the canisters are receiving their operations from the simulation to control their behavior as if they are part of the simulated environment.

Figure 31:
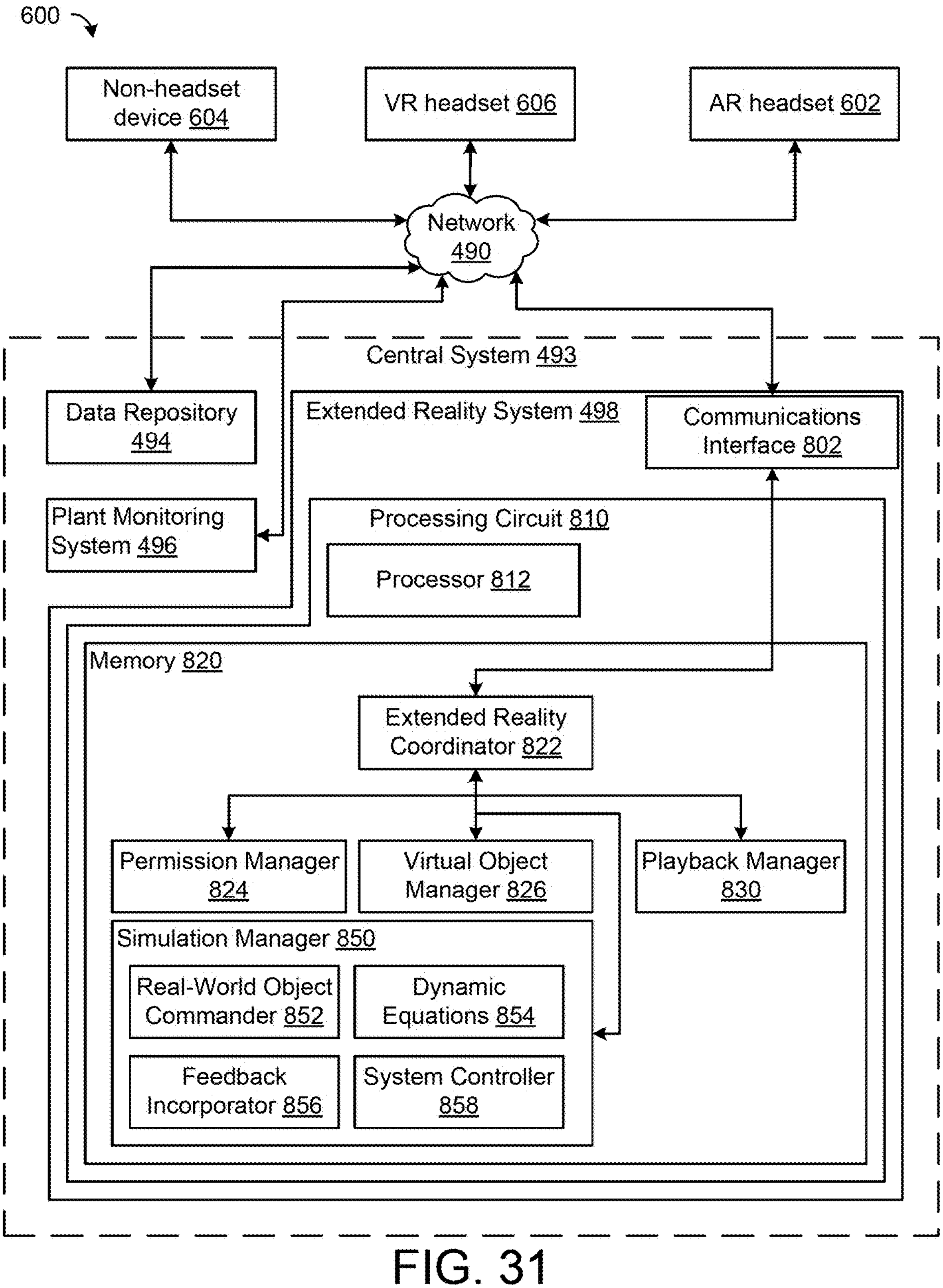
FIG. 31 is a block diagram of a central system configured to generate simulations including a real portion and a virtualized portion of an automation system in an extended reality environment, according to some embodiments.

With reference to FIG. 31, extended reality enabled plant operations system 600 is shown, according to some embodiments. In some embodiments, XR enabled plant operations system 600 includes a number of VR headsets (e.g., headset 606), a number of AR headsets (e.g., headset 602), a number of non-headset devices (e.g., device 604), data repository 494, plant monitoring system 496, and extended reality system 498 all communicably connected by network 490. In some embodiments, extended reality system 498 may perform the majority of the operations to realize the extended reality enabled plant operations system with simulated additional infrastructure in an XR environment 651; however, in some embodiments, the operations may be distributed across any of the systems shown in XR enabled plant operations system 600 including data repository 494, plant monitoring system 496, extended reality system 498, or any of the headset or non-headset XR enabling devices (e.g., devices 602-606).

In some embodiments, extended reality system 498 includes communications interface 802 and processing circuit 810. In some embodiments, processing circuit 810 contains processor 812 and memory 820. The processors may be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.). The processors may be configured in various computer architectures, such as graphics processing units (GPUs), distributed computing architectures, cloud server architectures, client-server architectures, or various combinations thereof. One or more first processors can be implemented by a first device, such as an edge device, and one or more second processors can be implemented by a second device, such as a server or other device that is communicatively coupled with the first device and may have greater processor and/or memory resources. The memories may include one or more devices (e.g., memory units, memory devices, storage devices, etc.) for storing data and/or computer code for completing and/or facilitating the various processes described in the present disclosure. The memories may include random access memory (RAM), read-only memory (ROM), hard drive storage, temporary storage, non-volatile memory, flash memory, optical memory, or any other suitable memory for storing software objects and/or computer instructions. The memories may include database components, object code components, script components, or any other type of information structure for supporting the various activities and information structures described in the present disclosure. The memories may be communicably connected to the processors and can include computer code for executing (e.g., by the processors) one or more processes described herein.

In some embodiments, memory 820 contains various modules and/or instruction sets to facilitate the functionality of extended reality system 498. In some embodiments, memory 820 includes extended reality coordinator 822, permissions manager 824, virtual object manager 826, playback manager 830, and simulation manager 850. The functionality of extended reality coordinator 822, permissions manager 824, virtual object manager 826, playback manager 830 has been described in previous sections and will be discussed in this section only to the extent that is necessary to facilitate the discussion of the simulation of added infrastructure within an extended reality system.

In some embodiments, the operator initializes a simulation through a menu on a computer workstation or any of the XR enabled devices (e.g., devices 602-606), or through the use of voice commands. In some embodiments, the request for a simulation is communicated over network 490 to extended reality system 498 through communications interface 802. Extended reality coordinator 822 may be configured to, upon receipt, cause the processing of the simulation request. Extended reality coordinator 822 may be configured to process the command by using the permissions manager 824 to first determine if the operator using the device the command came from has permissions to create and view a simulation. For example, permissions manager may include a mapping between devices and the operator currently using the devices, between an operator and their roles, and between roles and permissions and use these mappings to determine if the device from which the request came should be granted permission to view the playback.

In some embodiments, extended reality coordinator 822 may be configured to cause the communication of the simulation data to simulation manager 850. Simulation data may include all the real-world and additional assets that will be part of the simulation. Simulation data may also include the task or tasks that will be part of the simulation. Simulation manager 850 may be configured to use system controller 858 to cause the execution of the control logic for the assets that are part of the simulation. The control logic executed may be similar to the control logic that is stored in the real-world assets of that time. For example, the system controller may calculate the mode or state of each asset in the simulation and determine the input to any actuators of the simulated assets. In some embodiments, dynamic equations 854 are configured to cause the calculation of the states of the simulated assets using the inputs calculated by system controller 858. A state may refer to location, velocity, acceleration, mode, etc. of the asset. In general, a state may refer to a physical quantity of the asset (or its model) that is combined with the input to calculate the value of the states at a sample time into the future. For example, dynamic equations 854 may use equations of the form:

$$x_{k+1} = f(x_k, u_k),$$

$$y_k = h(x_k, u_k),$$

where k is the sample index and may be used to represent a time t=kT. The equations describe a model for which the current states x and the current inputs u can be used to calculate the state one sample period in the future. Additionally, the equations describe a model for which the current output y, can be calculated from the states and the input. The equations above describe a time invariant system (f and h are not parameterized in time). In some embodiments, dynamic equations 854 may use a time-varying system. In some embodiments, the functionality the system controller and the dynamic equations can be combined. For example, the control logic of system controller 858 may have states (e.g., a PID integrator or a mode of state machine) and the dynamic system states and the control logic states and the respective update equations can be combined into a single model, $$\begin{bmatrix} x_{c,k+1} \\ x_{s,k+1} \end{bmatrix} = F\left(\begin{bmatrix} x_{c,k+1} \\ x_{s,k+1} \end{bmatrix}, u_k\right),$$

$$y_k = H\left(\begin{bmatrix} x_{c,k+1} \\ x_{s,k+1} \end{bmatrix}, u_k\right),$$

where the subscript c is used to indicate the control logic states and s is used to indicate the system states. The capital F and H for the update and output functions are used to indicate that the control and system equations are combined. In some embodiments, the control logic may also have its own outputs and/or inputs.

In some embodiments, the system controller 858 may include a simplified version of the assets control logic, the simplified control logic may generally cause the assets to behave as expected but may have greater approximation error. In some embodiments, dynamic equations 854 may include a simplified version of the asset's dynamic system, the simplified dynamics may generally cause the assets to behave as expected but may have greater approximation error. In some embodiments, the simplified control logic and/or dynamic system logic may be used first, followed by a higher fidelity simulation. Advantageously, this may allow the operator to scan through many proposed designs, before spending the time on a high-fidelity simulation on some of the better proposals.

In some embodiments, simulation manager 850 may be configured to cause the repeated calculation of the control logic in system controller 858 and the dynamic equations 854. The calculations may be repeated a number of times so that a period of time into the future has been simulated.

In some embodiments, all the assets of the simulation will be presented in the XR environment 651. Simulation manager 850 may be configured to generate virtual representation data from the states of the assets from dynamic equations 854 and system controller 858. The virtual representation data may be communicated to playback manager 830 in a similar format to the virtual representation data received by playback manager from the data repository. Accordingly, playback manager 830 may be configured to cause the playback of a simulation similar to how it is configured to cause a playback of historical data.

In some embodiments, a number of the assets of the simulation will be embodied by physical equipment during playback. Simulation manager 850 may be configured to determine the simulated assets that will be embodied by real-world assets and the simulated assets that will be embodied by their virtual representation in the XR environment 651. Simulation manager 850 may be configured to generate virtual representation data for the assets embodied by their virtual representation during the simulation. The virtual representation data may be communicated to playback manager 830 in a similar format to the virtual representation data received by playback manager 830 from the data repository. Accordingly, playback manager 830 may be configured to cause the playback of the virtual representations during a simulation similar to how it is configured to cause a playback of historical data. In some embodiments, the simulation manager may include real-world object commander 852 and feedback incorporator 856 in order to coordinate the real-world assets embodying a simulated asset with the rest of the simulation.

In some embodiments, real-world object commander 852 may be configured to send commands to the real-world assets embodying a simulated asset to cause the asset to behave as the asset in the simulation. Real-world object commander 852 may be configured to send the actuator commands directly to the asset (e.g., run a motor at this speed) or real-world object commander 852 may be configured to send supervisory level commands to the asset (e.g., perform this task or move to this location). In some embodiments, commands are sent to the plant monitoring system rather than directly to the asset. The type of command and where the commands are sent may depend on the configuration of the asset. For example, some assets may not accept commands from network 490 and may need to be routed via plant monitoring system 496 onto the network of the asset; or, as another example, the asset may not accept a direct command to its drive system but rather require commands to be sent in the form of setpoints.

In some embodiments, feedback incorporator 856 may be configured to receive data from the real-world assets embodying an asset of the simulation. The data may include measurements of the states or outputs of the real-world assets. The data may originate from either data repository 494 or plant monitoring system 496. After a time, the simulation may fall out of sync with the real-world assets that are embodying the simulated assets and it may be necessary to synchronize the assets. For example, synchronization may be lost because the physical characteristics of any part of the real-world may be different than the parameters used in the simulation; the models used by the simulation may be a simplification of the true dynamics of the system; or the commands may need to be simplified in order to be accepted by the asset. To ensure that the operation of the real-world assets is smooth, it may be necessary to incorporate feedback often. In some embodiments, all the states required by the simulation may be measured and received by feedback incorporator 856. The simulation may be directly updated with the new values before continuing. In some embodiments, the measurements may be subjected to noise obscuring the true value of the measured state and it may be advantageous to use an estimation technique (e.g., Kalman filter) to determine an estimate of the state rather than just accepting the measured value with the noise. In some embodiments, it may not be practical to measure all system states and feedback incorporator 856 may include functionality to estimate the unmeasured states from those that are measured. For example, feedback incorporator could use an observer or a Kalman filter to estimate the state. In some embodiments, the update and/or measurement equations may be nonlinear, and a nonlinear estimation technique may be used (e.g., an extended Kalman filter, unscented filter, particle filter, etc.).

In some embodiments, the general sequence of operations includes: simulation manager 850 simulating a period of time using dynamic equations 854 and system controller 858; simulation manager 850 sending results of the simulation for that period of time to playback manager 830 to cause virtual representations of the simulated assets to appear on a XR enabled display device (e.g., devices 602-608) and to plant monitoring system 496 or the assets to cause a number of assets to embody the behavior of a number of assets of the simulation; and to receive feedback and use feedback incorporator 856 to synchronize simulated assets to the real-world assets embodying the behavior of simulated assets.

Figure 32:
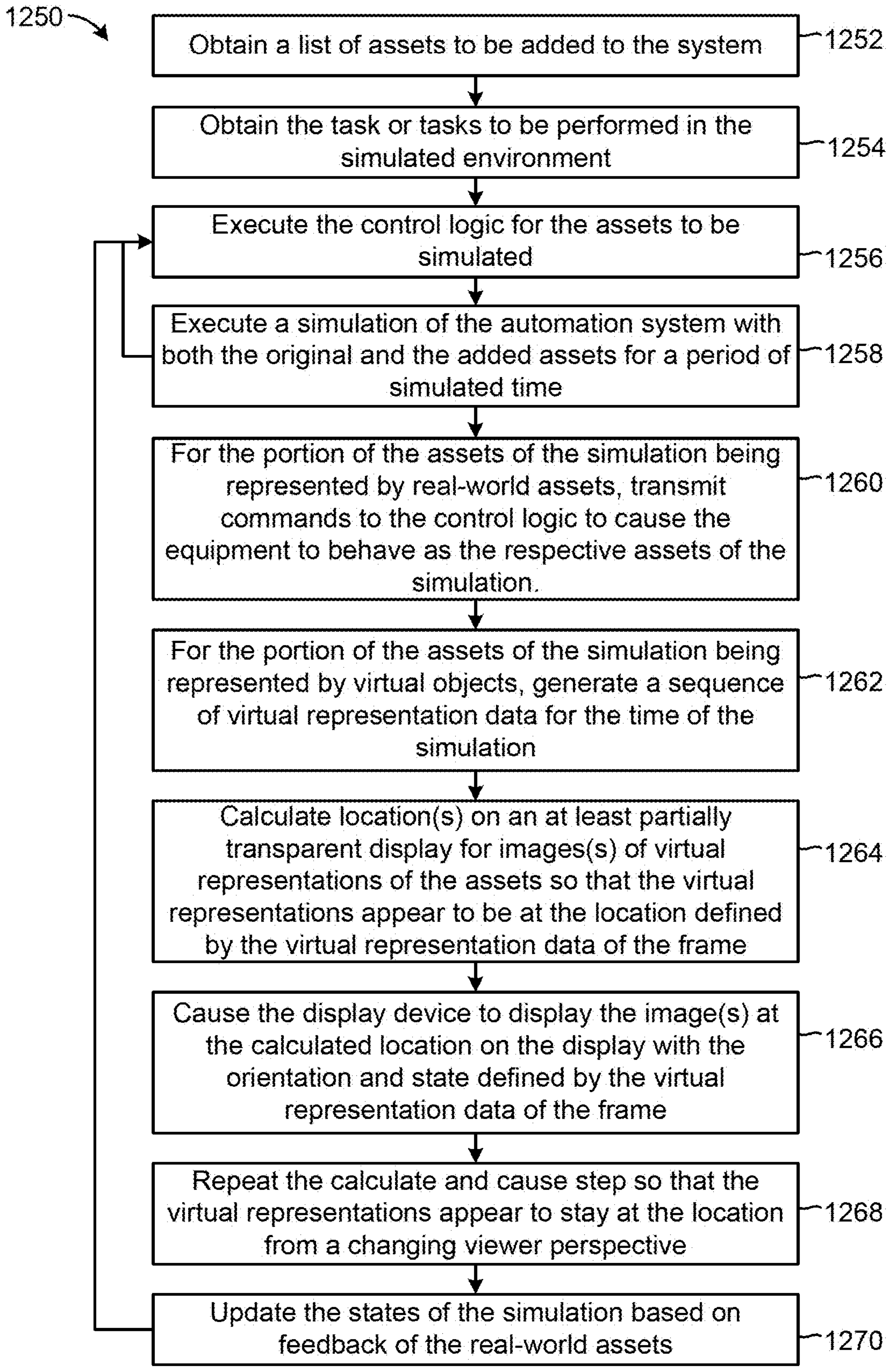
FIG. 32 is a flow diagram for displaying simulations including a real portion and a virtualized portion of an automation system in an extended reality environment, according to some embodiments.
Figure 33:
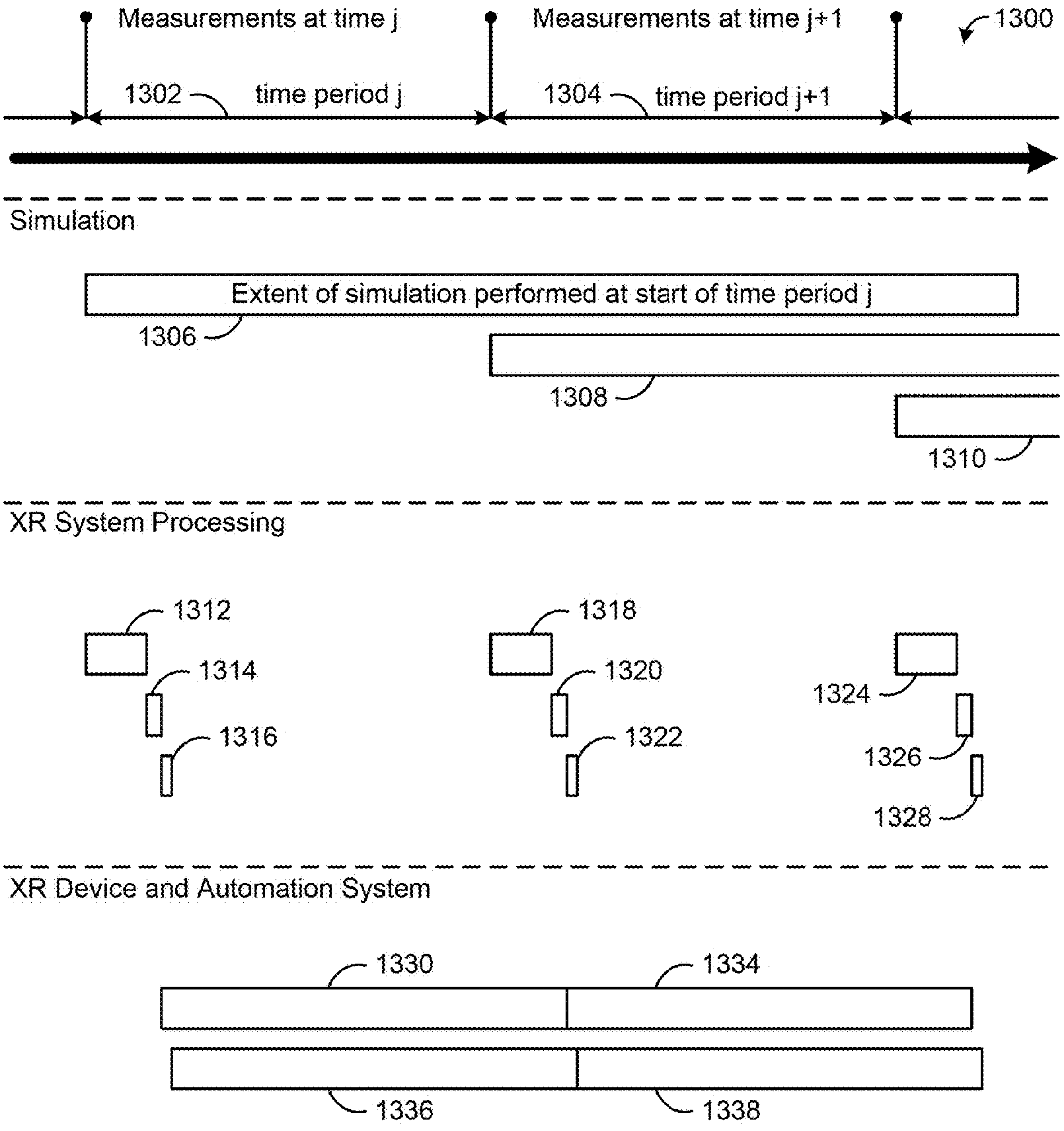
FIG. 33 is a swim lane diagram showing the operations to display a simulation of an automation system including a real portion and a virtualized portion of an automation system in an extended reality environment, according to some embodiments.

FIGS. 32 and 33 will be used to describe a sequence of operations that can be used to perform a simulation within an XR environment (e.g., within XR environment 651 by XR enabled plant operations system 600). FIG. 32 is a sequence of operations that can be used to perform a simulation within an XR environment 651, according to some embodiments. FIG. 33 provides a timeline of the operations shown in FIG. 32 according to some embodiments.

FIG. 32 shows sequence of operations 1250 for performing a simulation with added assets within an XR environment, according to some embodiments. In some embodiments, sequence 1250 includes obtaining a list of assets that are to be added to the automation system in step 1252. For example, the proposed additions to the automation system may include, but are not limited to additional ICT track, additional ICT carts, additional AMRs, or additional objects to be processed by the automation system. In some embodiments, sequence 1250 includes obtaining the task or tasks that should be performed in the simulated environment in step 1254. The tasks may include performing typical day-to-day operation of the plant or a particular task that uses only a portion of the whole site automation system.

In some embodiments, sequence of operations 1250 includes executing the control logic for the assets in the simulation in step 1256 and executing a simulation of the automation system with the original and the additional assets for a period of time in step 1258. In some embodiments, steps 1256 and 1258 may be combined. For example, executing the control logic and the simulation may include repeated executions of the equation, $$\begin{bmatrix} x_{c,k+1} \\ x_{s,k+1} \end{bmatrix} = F\left(\begin{bmatrix} x_{c,k+1} \\ x_{s,k+1} \end{bmatrix}, u_k\right),$$

$$y_k = H\left(\begin{bmatrix} x_{c,k+1} \\ x_{s,k+1} \end{bmatrix}, u_k\right),$$

where k is the sample index and may be used to represent a time t=kT. The equations describe a model for which the current states x, the current inputs u can be used to calculate the state one sample period in the future, and the subscribe c is used to indicate the control logic states and s is used to indicate the system states. The period of time may be any period of time that is long enough to perform the calculations and transmit the results to the XR enabled device and/or the asset (or plant monitoring system) and short enough so that the simulation does not get significantly out of synchronization with any real-world assets embodying an asset of the simulation.

In some embodiments, sequence 1250 includes transmitting commands to the control logic (including the plant monitoring system) to cause the real-world assets to behave as the respective assets of the simulation in step 1260. The type of commands and where the commands are sent may depend on the configuration of the asset. For example, some assets may not accept commands from the network of the extended reality coordinator and may need to be routed onto the network of the asset; or, as another example, the asset may not accept a direct command to its drive system but rather require commands to be sent in the form of setpoints. Commands may be sent to a number of real-world assets that are embodying the behavior of a simulated asset. In some embodiments, sequence 1250 includes generating a sequence of virtual representation data for the simulated assets that will not be embodied by a real-world asset in step 1262. The virtual representation data may be used by subsequent steps to cause a virtual representation of the simulated asset to appear on an XR enabled display.

A playback of simulated assets may be performed similarly to a playback of historical operations of real-world assets. In some embodiments, sequence 1250 includes calculating location(s) on an at least partially transparent display for images(s) of virtual representations of the assets so that the virtual representations appear to be at the location defined by the virtual representation data of the frame in step 1264. In some embodiments, there may be two images for each virtual representation of the asset to provide for a stereoscopic effect and allow the representation to appear to be anchored (e.g., embedded, inserted, integrated, etc.) in the XR environment. In some embodiments, the display may not be partially transparent, as in a VR headset or a handheld device with display and camera. In some embodiments, sequence 1250 includes causing the display device to display the image(s) at the calculated location on the display with the orientation and state defined by the virtual representation data of the frame in step 1266. In some embodiments, steps 1264 and 1266 are repeated periodically (e.g., 30 times per second) or as the viewers perspective changes so that the virtual representations appear at the defined location from a changing viewer perspective in step 1268. In some embodiments, sequence 1250 may also include repeating steps 1264 and 1266 for a new frame of the sequence of frames generated from the virtual representation data from step 1262.

In some embodiments, sequence 1250 includes updating the states of the simulation based on feedback of the real-world assets in step 1270. The feedback may include measurements of the states or outputs of the real-world assets. To ensure that the operation of the real-world assets is smooth, it may be necessary to incorporate feedback often. In some embodiments, all the states required by the simulation may be measured and used as feedback. The simulation may be directly updated with the new values from the feedback before continuing. In some embodiments, the measurements may be subjected to noise obscuring the true value of the measured state and it may be advantageous to use an estimation technique (e.g., Kalman filter) to determine an estimate of the state rather than just accepting the measured value with the noise. In some embodiments, it may not be practical to measure all system states the available feedback may be used to estimate the unmeasured states from those that are measured. For example, an observer or a Kalman filter could be used to estimate the state. In some embodiments, the update and/or measurement equations may be nonlinear, and a nonlinear estimation technique may be used (e.g., an extended Kalman filter, unscented filter, particle filter, etc.).

With reference to FIG. 33, a timeline 1300 for operations to cause a simulation to be performed in an XR environment is shown, according to some embodiments. In some embodiments, there are two sample periods that drive operations within the simulation: a synchronization sampling period and a simulation sampling period. The synchronization sampling period may refer to the period between successive times feedback is incorporated to synchronize the simulation with the real-world assets that may be embodying part of that simulation. The index of synchronization time periods is shown as j in timeline 1300. In some embodiments, the beginning of each synchronization time period (e.g., 1302 and 1304) may be marked by the sample time of measurements received by the simulation system as shown in timeline 1300. The simulation sampling period may refer to the time difference between index k and index k+1; for example, of the states of the previously presented update equation. The simulation time period is not shown in timeline 1300, but may be significantly shorter than the synchronization time period to generate enough virtual representation data as needed to cause the simulated assets represented by virtual objects appear to be in continuous motion.

In some embodiments, at the start of each synchronization time period, a simulation for a time period is performed. The time period may start at the beginning of the synchronization time period and may at some point in the future typically be far enough in the future to cover the synchronization time period as well as the time required to do the calculations of the next synchronization time period. In some embodiments, the extent of the simulation may be significantly longer. For example, it may be desired to perform a simulation that spans many simulation time periods in case that a measurement is dropped in communication, or some other temporary problem occurs that hinders the simulation for the next synchronization time period. For example, the extent of a simulation performed at the start of synchronization time period j, j+1, and j+2 are shown by bars 1306, 1308, and 1310, respectively.

In some embodiments, extended reality system 498 processing is performed at the beginning of each synchronization time period. extended reality system 498 processing may refer to performing the calculations of the simulation for that time period, processing the simulation into commands for the real-world assets and/or virtual representation data for the XR enabled device, and transmitting those commands and/or virtual representation data or a derived frame thereof. For example, the simulation may be performed first and the time required to perform the simulation represented by bars 1312, 1318, and 1324 for synchronization time period j, j+1, and j+2, respectively; the processing for of the simulation into frames and the transmitting of said frames may be performed next and the time required to perform the simulation represented by bars 1314, 1320, and 1326 for synchronization time period j, j+1, and j+2, respectively; and the time required to determine and transmit the commands to the assets represented by bars 1316, 1322, and 1328 for synchronization time period j, j+1, and j+2, respectively.

In some embodiments, the transmitted information is received by either an XR enabled device, the automation system controlling the assets, or both. For example, the frames generated during synchronization time period j, transmitted during the time represented by bar 1314, and received by the XR enabled device may be used to generate a virtual representation of the asset during the time period represented by bar 1330. The same for time period j+1 may be represented by bar 1334. The commands generated during synchronization time period j, transmitted during the time represented by bar 1316, and received by the automation system may be used to cause the real-world assets to embody the behavior of the simulated assets during the time period represented by bar 1336. The same for time period j+1 may be represented by bar 1338.

Simulation of Changes to a System

In some embodiments of an automation system, it may be helpful to visualize an automation system that will respond to various parameter changes. For example, the operator may view the equipment as moving too slowly and set out to change control parameters that may speed the motion of the system. The operator could first simulate the parameter changes in an XR environment with a virtual automation system simulating the new parameters and the real-world automation system with the current parameters. The virtual automation system may be anchored (e.g., embedded, inserted, integrated, etc.) in the XR environment at the same location as the real-world automation system so that the operator can easily recognize the differences in operation.

Figure 34:
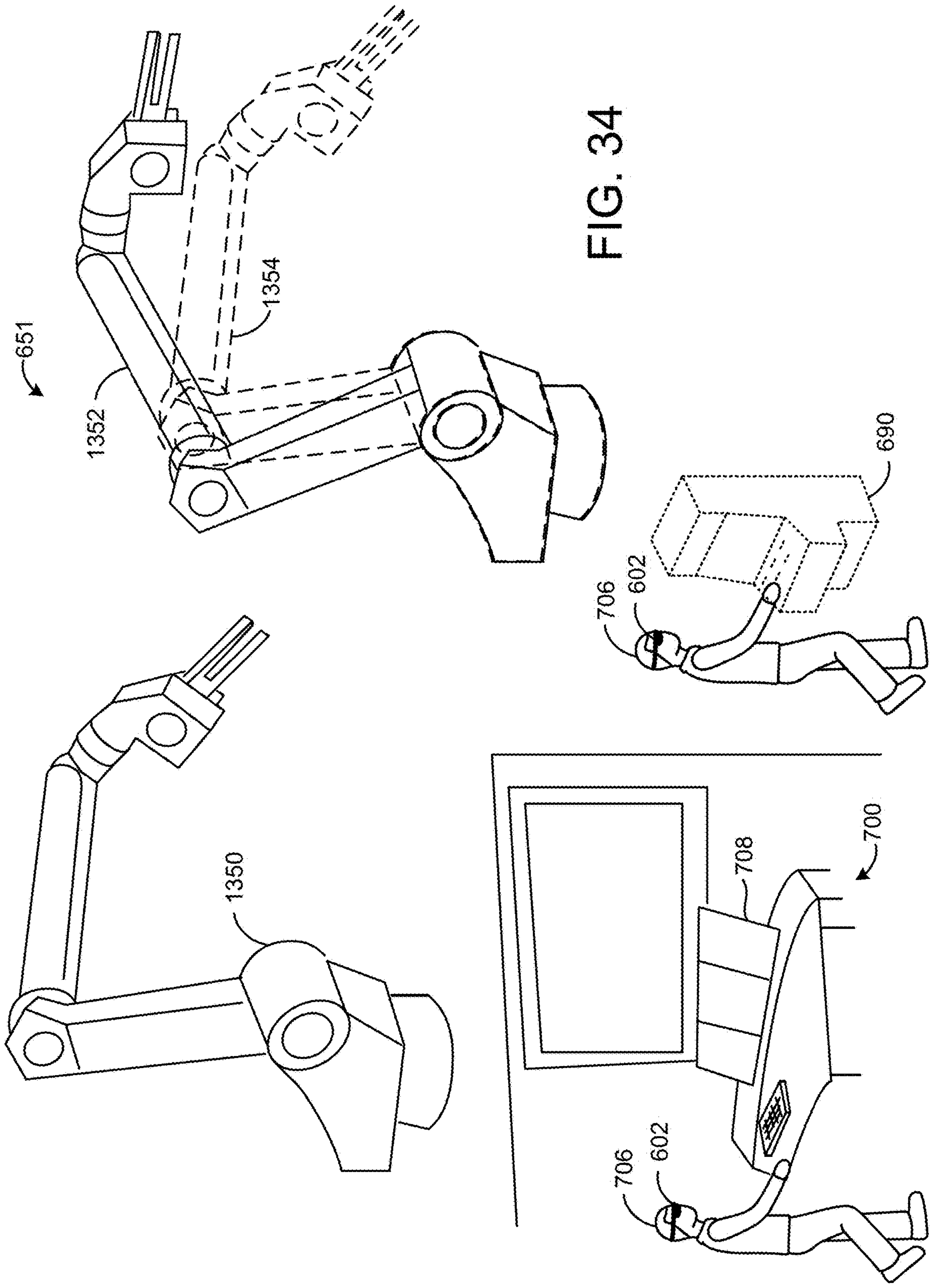
FIG. 34 is an illustrative view of configuring an automation system in an extended reality environment, according to some embodiments.

FIG. 34 shows XR environment 651 being viewed by operator 706 wearing AR headset 602, according to some embodiments. The operator is shown to be working to improve the performance of robot arms 1350 and 1352 and currently adjusting the parameters of robot arm 1352. In some embodiments, the operator may change parameters from an observation area 700 using a menu on monitor 708 of a workstation. In some embodiments, the operator may have requested a virtual control panel to be generated (e.g., virtual control panel 690) and is working from a location nearer to the robot arm to have a better view. In some embodiments, the operator may begin a simulation of the robot in the XR environment 651. The simulation may cause the virtual robot arm 1354 to represent the robot arm of the simulation. The virtual robot arm may not synchronize with the actual robot arm either because the timing of the start of a motion of the real-world robot arm may not align with the start of motion of the virtual robot arm of the simulation; or the virtual robot arm may not synchronize with the actual robot arm because the parameters and/or the model form used in the dynamic model of the robot arm do not provide an accurate simulation. In some embodiments, extended reality system may automatically synchronize the virtual and the real-world robot arm. Synchronization may be performed by calculating correlations between time-shifted versions of the virtual operations and the true operations to synchronize the behavior in time.

System identification (e.g., calculating new parameters for the dynamic model of the robot arm) may be performed to synchronize the behavior of the robot arm related to the model. In some embodiments, the quality of the time synchronization may affect the system identification and the quality of the model parameter fit may affect the ability to perform time synchronization and an iterative approach between the two may be performed. In some embodiments, the operator may change the physical parameters of the simulated robot arm to cause the simulation to match real-world operation. In some embodiments, the behavior of the virtual automation system (e.g., virtual robot arm 1354) is governed by a set of physical model parameters and control parameters. The physical parameters may refer to parameters that describe the relationship between inputs to the actuators of the automation system and the observed behavior (e.g., motion). For example, the physical parameters can represent various physical characteristics of the automation system such as a size, mass, or geometry of a portion of the automation system (e.g., a member of a robot arm), electrical characteristics (e.g., resistance, capacitance, inductance, etc.) of the automation system, mechanical characteristics (e.g., spring coefficients, elasticity, viscous damping, etc.), and/or any other physical characteristic that will affect the behavior of the automation system Control parameters may refer to the parameters that change how the inputs to the actuators are generated. For example, a control parameter may refer to a tuning parameter of a PID controller within the automation system and/or any other parameter of a control algorithm that can be used to change the behavior of the automation system.

In some embodiments, the operator may change the control parameters of the simulated automation system. As the control parameters are changed, the simulation driving virtual robot arm 1354 may diverge from the real-world operations. Because the virtual representation of the automation system (e.g., robot arm) is anchored in the same volume of space in the XR environment 651 as the real-world automation system, it may be easy for the operator to compare behavior between the new parameters represented by the virtual automation system and the current parameters operating the real-world automation system. The operator may continue to adjust the parameters until the behavior of the virtual automation system is as desired. In some embodiments, the operator can transfer the control parameters from the simulation (e.g., virtual automation system) to the real-world device. Advantageously, after the control parameters have been transferred from the simulation to the real-world automation system, the behavior of the systems should again appear to synchronize. If the behavior does not synchronize, the operator may again perform the process of adjusting the physical parameters with the control parameters being constant at their new values, to cause the automation system to synchronize; and then adjust the control parameters of the simulation until the virtual representation has the desired behavior. The operator may choose to again move the control parameters to the real-world device. Viewing the XR environment 651 may provide this iterative process to both find model parameters that are a good representation of the real-world device in the region of operations currently being performed and finding control parameters that cause the automation system's behavior to exhibit desired characteristics (e.g., speed, smoothness of motion, etc.).

In some embodiments, an optimization routine may be available to choose the control parameters according to an objective function (e.g., speed, motion accuracy, minimize overshoot, etc.) subject to some constraints (e.g., avoiding some area of space during the motion). In some embodiments, the control parameters from one robot arm may be transferred to the control parameters of another robot arm as part of the comparison process.

Figure 35:
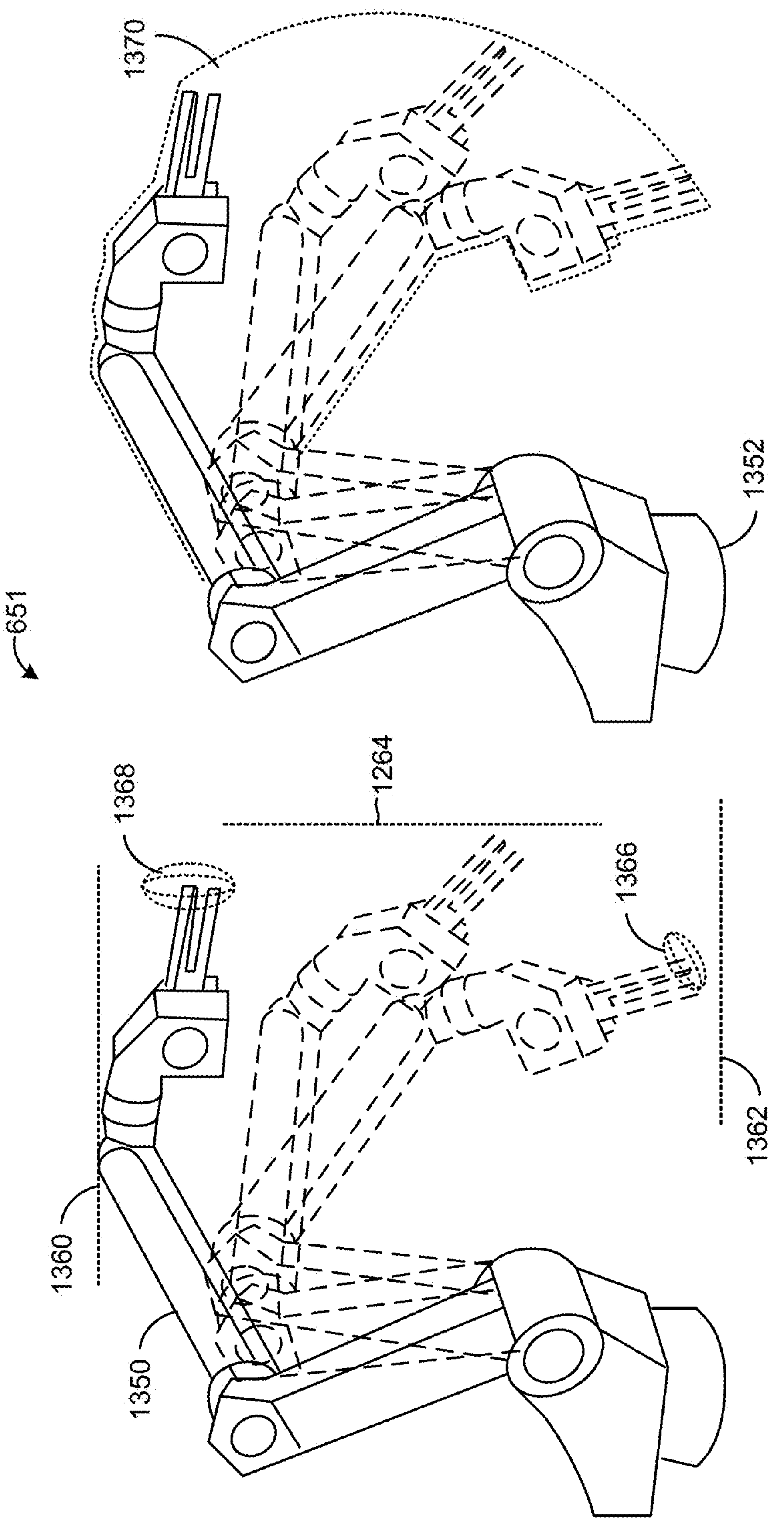
FIG. 35 is another illustrative view of configuring an automation system showing virtual objects representing motion statistics in an extended reality environment, according to some embodiments.

With reference to FIG. 35, some embodiments of the present disclosure may cause various statistics of the behavior or status of the automation system to be calculated, embodied by virtual objects in the XR environment 651, and displayed on an XR enabled device (e.g., AR headset 602). FIG. 35 shows two robot arms for which statistics are being calculated and displayed as virtual objects in an XR environment 651, according to some embodiments. XR environment 651 may include two robot arms (e.g., 1350 and 1352). Virtual objects may be drawn within XR environment 651 to show various statistics of the behavior of the robot arm motion. For example, lines 1360 and 1362 show the maximum and minimum range of vertical motion for the robot arm and 1264 represents the maximum horizontal range of motion. In some embodiments, such statistics may also be presented as planes in the three-dimensional space. In some embodiments, other statistics, such as the 95th percentile of the range of motion for each cycle of the robot arm may be shown. XR environment 651 may also include ellipsoids to represent an uncertainty in the terminal location of the robot arm at each cycle. For example, ellipsoids 1366 and 1368 may represent the covariance matrix of the terminal location of the robot arm at the bottom of its motion path and at the top of its motion path, respectively. For example, the terminal location of each cycle of the robot arm may be stored in three-dimensional coordinates, the mean and covariance matrix may be calculated, and the ellipsoid may represent the locus of points for which the Mahalanobis distance is a specific number (e.g., 2).

In some embodiments, XR environment 651 may include a volume or area showing the extent of motion of a portion of the automation system (e.g., volume 1370). For example, the extent of motion may include all portions of space that could be occupied by the automation system and may be used to view safety clearances.

Figure 36:
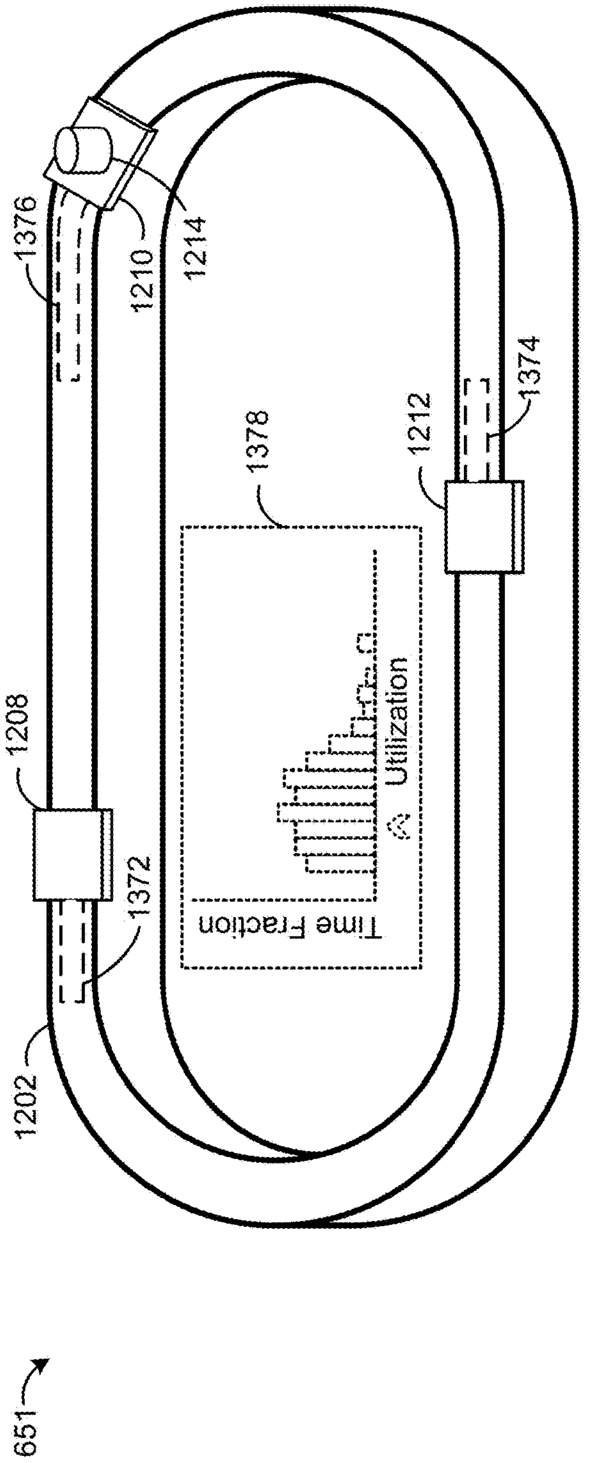
FIG. 36 is an illustrative view of an independent cart technology system showing virtual objects representing motion statistics in an extended reality environment, according to some embodiments.

With reference to FIG. 36, some embodiments of XR environment 651 may include an ICT system. The ICT system may include ICT track 1202 and ICT carts 1208, 1210, and 1212. The carts may be transporting canisters (e.g., canister 1214). XR environment 651 may include various virtual objects embodying statistics of the ICT system. For example, areas 1372-1376 may represent the minimum safe stopping distance of the ICT carts or a virtual sign (e.g., sign 1378) may be created that shows a histogram of the utilization of the ICT carts on the track along with its current utilization.

Figure 37:
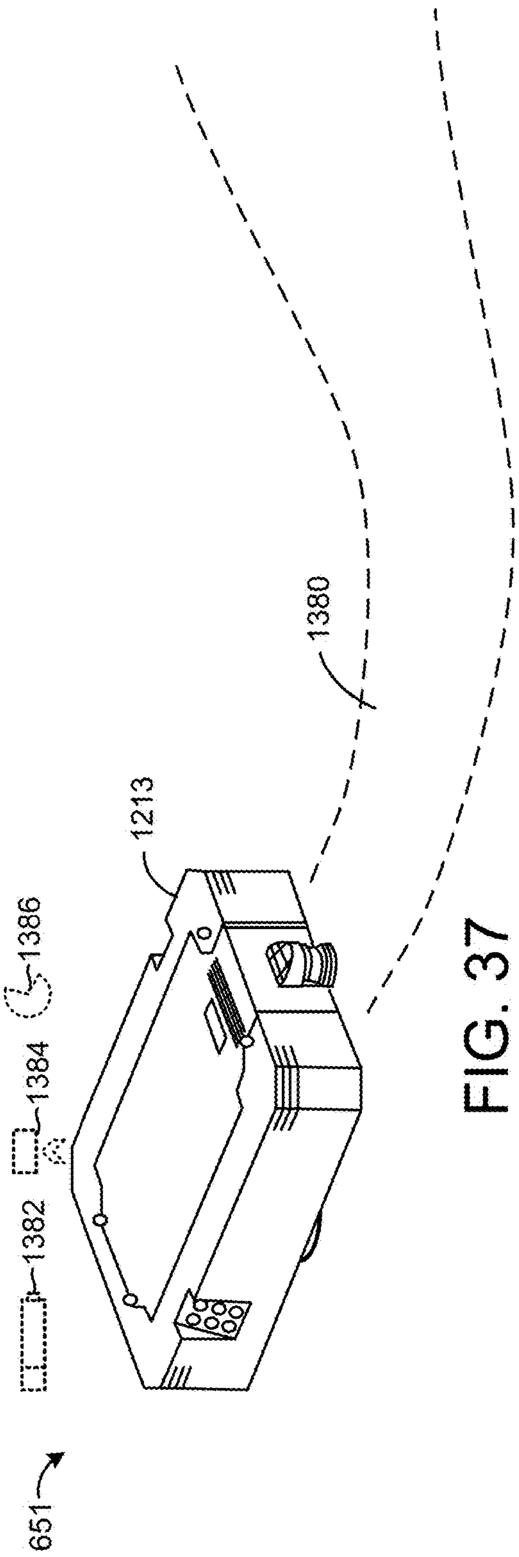
FIG. 37 is an illustrative view of an autonomous mobile robot system showing virtual objects representing conditions, statistics, and motion predictions in an extended reality environment, according to some embodiments.

With reference to FIG. 37, some embodiments of XR environment 651 may include an AMR (e.g., AMR 1213). XR environment 651 may include various virtual objects embodying statistics or statuses of the AMR. For example, battery status indicator 1382 may represent about 25% battery life, task indicator 1384 may indicate the AMR is going to load a package, and utilization indicator 1386 may represent a 60% utilization rate. The expected path the AMR will follow to its next destination may also be represented with an area, line or volume within the XR environment 651 (e.g., area 1380). The area may fade or diverge the further it is from the AMR indicating uncertainty in the path.

The statistics and statuses that can be embodied by virtual objects may include, but are not limited to: maximum extent of motion, overshoot of a terminal destination, precision of motion, minimum stopping distance, utilization, battery life, current task, fault status, performance scores, degradation of components, expected trajectories, or time to complete task.

Figure 38:
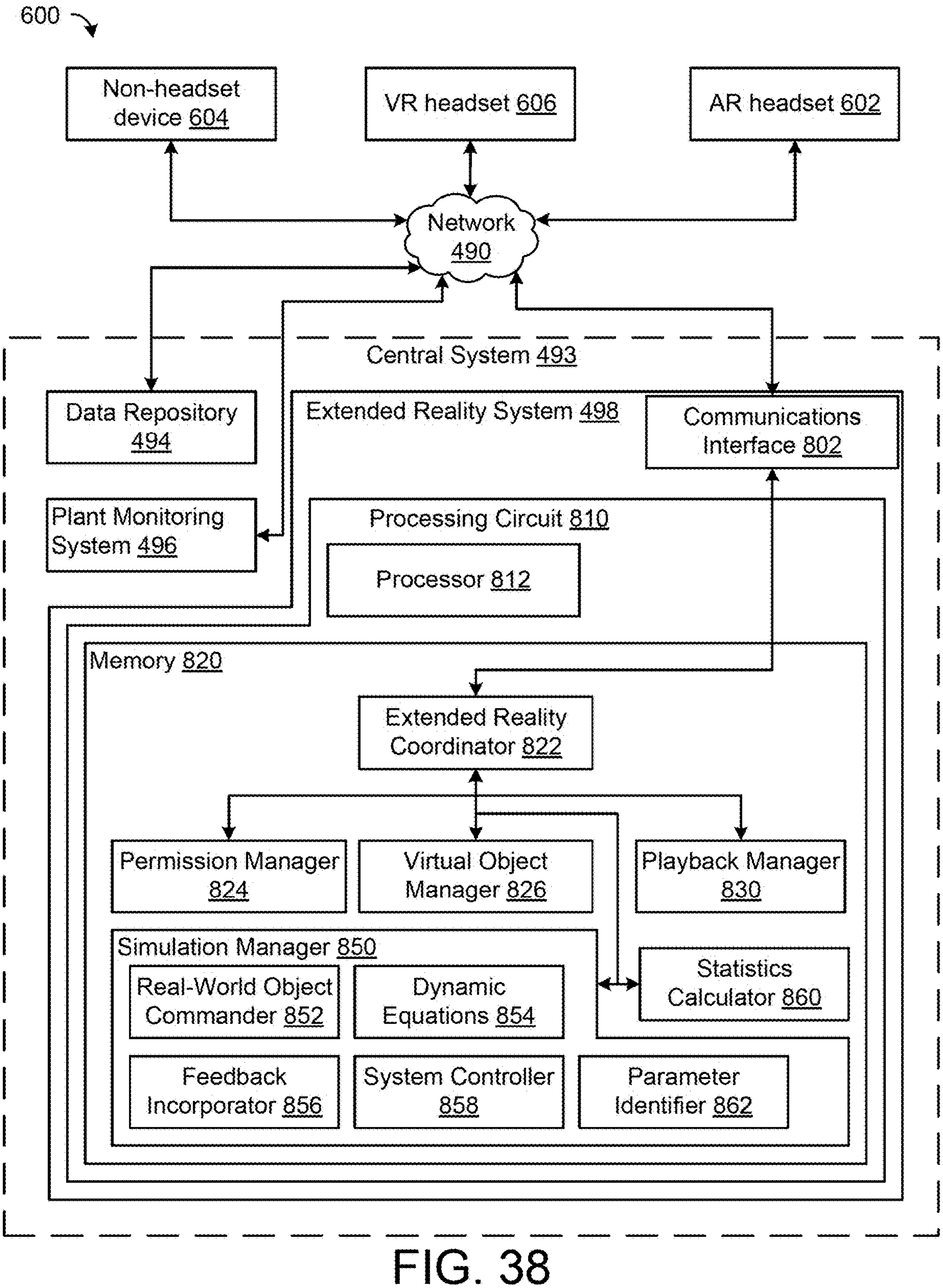
FIG. 38 is a block diagram of a central system configured to enhance commissioning and monitoring with extended reality, according to some embodiments.

With reference to FIG. 38, extended reality enabled plant operations system 600 is shown, according to some embodiments. In some embodiments, XR enabled plant operations system 600 includes a number of VR headsets (e.g., headset 606), a number of AR headsets (e.g., headset 602), a number of non-headset devices (e.g., device 604), data repository 494, plant monitoring system 496, and extended reality system 498 all communicably connected by network 490. In some embodiments, extended reality system 498 may perform the majority of the operations to realize the extended reality enabled plant operations system with simulating a change to an automation system; however, in some embodiments, the operations may be distributed across any of the systems shown in XR enabled plant operations system 600 including data repository 494, plant monitoring system 496, extended reality system 498, or any of the headset or non-headset XR enabling devices (e.g., devices 602-606).

In some embodiments, extended reality system 498 includes communications interface 802 and processing circuit 810. In some embodiments, processing circuit 810 contains processor 812 and memory 820. The processors may be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.). The processors may be configured in various computer architectures, such as graphics processing units (GPUs), distributed computing architectures, cloud server architectures, client-server architectures, or various combinations thereof. One or more first processors can be implemented by a first device, such as an edge device, and one or more second processors can be implemented by a second device, such as a server or other device that is communicatively coupled with the first device and may have greater processor and/or memory resources. The memories may include one or more devices (e.g., memory units, memory devices, storage devices, etc.) for storing data and/or computer code for completing and/or facilitating the various processes described in the present disclosure. The memories may include random access memory (RAM), read-only memory (ROM), hard drive storage, temporary storage, non-volatile memory, flash memory, optical memory, or any other suitable memory for storing software objects and/or computer instructions. The memories may include database components, object code components, script components, or any other type of information structure for supporting the various activities and information structures described in the present disclosure. The memories may be communicably connected to the processors and can include computer code for executing (e.g., by the processors) one or more processes described herein.

In some embodiments, memory 820 contains various modules and/or instruction sets to facilitate the functionality of extended reality system 498. In some embodiments, memory 820 includes extended reality coordinator 822, permissions manager 824, virtual object manager 826, playback manager 830, simulation manager 850, and statistics calculator 860. In some embodiments, memory 820 may also contain modules and/or instruction sets to facilitate the features or operations discussed in other sections of the present disclosure, but not needed for the discussion of simulating changes to an automation system. In some embodiments, XR enabled plant operations system 600 is responsible for generating a simulation of a control system and displaying it in such a way that a virtual representation of the system is anchored in the same volume in the XR reality system. For example, a simulation of the automation system could be performed and displayed such that it appears in the same volume of space in the XR environment 651 as the real-world automation system for easy comparison.

In some embodiments, a simulation session is initialized by providing a voice command similar to "begin simulation of robot arm 3." Such a command may be sent from a device (e.g., device 602-606) over network 490 to communications interface 802. Extended reality coordinator 822 may be configured to process the command by using the permissions manager 824 to first determine if the operator using the device the command came from has permissions to view the requested simulation. For example, permissions manager may include a mapping between devices and the operator currently using the devices, between an operator and their roles, and between roles and permissions and use these mappings to determine if the device from which the request came should be granted permission to view the playback. In some embodiments, the simulation request may be initiated from a menu on a display at a workstation or another device.

In some embodiments, after permission of viewing the simulation is granted, extended reality coordinator 822 may cause simulation manager to generate virtual representation data of the automation system capable of being turned into frames using playback manager 830. In some embodiments, simulation manager 850 will cause information regarding the simulation to be obtained from data repository 494 and/or plant monitoring system 496. Information may include the current tasks that the automation system is performing so that it is possible to simulate the automation system in such a way that it is synchronized with the real-world automation system. Information about the simulation may also include the control parameters currently being used by the automation system and/or any physical properties of the automation system (e.g., mass, etc.). Simulation manager 850 may be configured to use system controller 858 to cause the execution of the control logic for the assets that are part of the simulation. The control logic executed may be similar to the control logic that is stored in the real-world assets of that time. For example, the system controller may calculate the mode or state of each asset in the simulation and determine the input to any actuators of the simulated assets. In some embodiments, dynamic equations 854 are configured to cause the calculation of the states of the simulated assets using the inputs calculated by system controller 858. A state may refer to location, velocity, acceleration, mode, etc. of the asset. In general, a state may refer to a physical quantity of the asset (or its model) that is combined with the input to calculate (e.g., with the model) the value of the state at a sample time into the future. For example, dynamic equations 854 may use equations of the form:

$$x_{k+1} = f(x_k, u_k),$$

$$y_k = h(x_k, u_k),$$

where k is the sample index and may be used to represent a time t=kT. The equations describe a model for which the current states x and the current inputs u can be used to calculate the state one sample period in the future. Additionally, the equations describe a model for which the current output y, can be calculated from the states and the input. The equations above describe a time invariant system (f and h are not parameterized in time). In some embodiments, dynamic equations 854 may use a time-varying system. In some embodiments, the functionality of the system controller and the dynamic equations can be combined. For example, the control logic of system controller 858 may have states (e.g., a PID integrator or a mode of state machine) and the dynamic system states, the control logic states, and the respective update equations can be combined into a single model, $$\begin{bmatrix} x_{c,k+1} \\ x_{s,k+1} \end{bmatrix} = F\left(\begin{bmatrix} x_{c,k+1} \\ x_{s,k+1} \end{bmatrix}, u_k\right),$$

$$y_k = H\left(\begin{bmatrix} x_{c,k+1} \\ x_{s,k+1} \end{bmatrix}, u_k\right),$$

where the subscript c is used to indicate the control logic states and s is used to indicate the system states. The capital F and H for the update and output functions is used to indicate that the control and system equations are combined. In some embodiments, the control logic may also have its own outputs and/or inputs.

In some embodiments, the update function F and the output function H are characterized by several parameters. For example, the parameters may include both physical parameters and control parameters. The control parameters may refer to any parameters that are used to characterize the functions that determine the inputs to the actuators (e.g., motors) of the automation system. For example, control parameters may refer to tuning parameters of a PID controller or thresholds in the state transitions of a state machine. Control parameters may typically be changed from a menu or other display of an automation system. The physical parameters may refer to any parameters that are used to characterize how inputs to actuators affect the behavior of the system (e.g., how the inputs to actuators cause the system states to update). For example, physical parameter may refer to the mass of a component of an automation system and/or properties of a spring and damper system. In some embodiments, the physical parameter may not have an analogous physical property in the real-world. For example, black-box modeling (e.g., generic state-space model or a neural network) may be used for the update equations.

In some embodiments, simulation manager 850 may be configured to cause the repeated calculation of the control logic in system controller 858 and the dynamic equations 854. The calculations may be repeated a number of times so that a period of time into the future has been simulated.

In some embodiments, the assets of the simulation will be presented in the XR environment 651. Simulation manager 850 may be configured to generate virtual representation data from the states of the assets from dynamic equations 854 and system controller 858. The virtual representation data may be communicated to playback manager 830 in a similar format to the virtual representation data received by playback manager from the data repository. Accordingly, playback manager 830 may be configured to cause the playback of a simulation similar to how it is configured to cause a playback of historical data.

Simulation manager 850 may be configured to generate virtual representation data of the assets during the simulation. The virtual representation data may be communicated to playback manager 830 in a similar format to the virtual representation data received by playback manager from the data repository. Accordingly, playback manager 830 may be configured to cause the playback of the virtual representations during a simulation similar to how it is configured to cause a playback of historical data. In some embodiments, simulation manager may include real-world object commander 852 and feedback incorporator 856 in order to coordinate the real-world assets embodying a simulated asset with the rest of the simulation.

In some embodiments, event manager 836 may be configured to cause playback of a historical event to synchronize with the live operations of a similar event. Event manager 836 may receive recent virtual representation data (e.g., last 5 minutes) and historical virtual representation data from times proximate the event of interest from data repository 494. Event manager 836 may take the recent virtual representation data and virtual representation data from times proximate the event and perform a correlation between time shifted versions of the two data sets. The time shift of maximum correlation may be used to synchronize the historical data by causing playback manager 830 to playback operations shifted from real time by the time shift of maximum correlation.

The level of synchronization between the virtual representation of the asset and the real-world asset may not be acceptable after shifting the simulation in time. For example, the parameters of the dynamic equations used to perform the simulation may not be a good representation of the real-world automation system. Even if the control parameters of the simulation match the control parameters of the real-world system, it may be necessary to generate updates to the physical parameters of the simulation. For example, degradation may have caused the physical parameters to deviate from the original specifications. In some embodiments, an operator may make changes to the parameters to increase the level of synchronization. In some embodiments, simulation manager 850 may use parameter identifier 862 to calculate new physical parameters that better fit the current operations of the automation system. Parameter identifier may obtain measurement data from various sources (e.g., data repository 494, plant monitoring system 496, or cameras on any of the XR enabled devices 602-606) and adjust the physical parameters or a subset thereof to cause the simulation to behave more closely to the real-world automation system. In some embodiments, parameter identifier 862 may use an optimization routine or other systematic algorithm to determine the parameters that provide good synchronization between the virtual representation of the asset and the real-world asset. For example, a parameter identifier may generate an objective function including the squared error of the measurements of the dynamic system over a period of time:

$$J(\varphi) = \sum_{t \epsilon P} \ell(y_m - y_s(\varphi))$$

where $\varphi$ represents the physical parameters or a subset of physical parameters that may be modified, P is the time period, $y_m$ is the measured output, $y_s(\varphi)$ is the simulated output explicitly showing its dependency on the physical parameters, and $\ell$ is some function of the error that is lowest at zero error (e.g., the 2-norm). An algorithm may be used to minimize the objective function with respect to the physical parameters or subset thereof.

In some embodiments, the operator may make changes to the control parameters to view the simulation of a new set of control parameters with the current operations of the automation system in the XR environment 651. For example, to improve operations of the automation system. In some embodiments, the control parameters of a different automation system may be copied into the simulation. This may be advantageous if another, similar automation system is performing better than the one currently being simulated. In some embodiments, the operator may make changes to the physical properties of the simulation (even after synchronization is performed). Changing the physical properties of the simulation may be useful if the physical system can be easily modified (e.g., adding mass, pressurizing a damper, etc.). Advantageously, the operator is able to easily see the changes in behavior compared to current operations as the virtual representation of the simulation and the real-world automation system appear to occupy the same volume of the XR environment 651 for easy comparison.

In some embodiments, playback manager 830 may be used to cause the playback of both the simulated operations and the real-world operations and may be slowed down so transitory differences between the two operations can be perceived more clearly. For example, if the operator is viewing a repetitive motion (e.g., a robot arm performing a picking operation) the simulation may be viewed with the actual operations in real time in the XR environment 651; however, every number of cycles (e.g., every $10^{th}$ cycle) a playback of the actual operations in the XR environment 651 along with the playback of the simulation and time could be slowed for this playback. Advantageously, performing a slow-motion playback in the XR environment after a number of real time playbacks of the simulation anchored with the real-world automation system would allow the operator to view general characteristics of the motion in real time, and some of the fine transitory details (e.g., overshoot) in a slow-motion playback.

In some embodiments, statistics calculator 860 is used to generate virtual representation of various statuses or statistics the automation system or operations thereof. Statistics calculator 860 may receive motion data from creating various lines, curves, areas, or volumes that represent the extent of motion of an automation system (e.g., as shown in FIG. 35 and indicated in the related discussion). These virtual objects may be communicated to any of the XR enabled devices (e.g., device 602-606) to be displayed. Virtual objects representing the extent of motion of various devices may be displayed at any time but may be of particular advantage when modifying parameters of the automation system. The virtual objects may quickly and visually show violations of constraints that are occurring.

In some embodiments, statistics calculator 860 may calculate statistics related to limitations to the motion of an automation system. For example, statistics calculator 860 may calculate the minimum safe stopping distance of an ICT cart, generate a virtual object (e.g., an area in front of the cart), and cause it to be communicated to an XR enabled device. The calculation of the safe stopping distance may depend on the height, weight, or general configuration of the load of the ICT. In some embodiments, statistics calculator may calculate the current utilization of the ICT system. Current utilization along with a histogram of the utilization over a past period of time may be calculated, a virtual sign may be generated with the utilization information, and virtual object manager 826 may calculate a location such in the virtual environment such that the sign appears proximate to the ICT system in the XR environment 651.

In some embodiments, statistics calculator 860 may receive the expected path or set of potential paths for an AMR. Statistics calculator 860 may calculate a mean path and standard deviation of the paths, generate an area that is representative of the path and its uncertainty and communicate the area to an XR enabled device. In some embodiments, statistics calculator 860 may be configured to perform a clustering analysis on the paths that are received and calculate an area that represents each cluster of paths. This may be advantageous if there is an obstacle and paths bifurcate in either direction around the obstacle. Statistics calculator 860 may be configured to generate other virtual objects for a given AMR that represent other statuses and/or statistics of the AMR (e.g., battery life remaining, task, percent utilization, etc.). Statistics calculator 860 may be configured to communicate the virtual objects to the virtual object manager 826. Virtual object manager 826, may be configured to calculate a location for the virtual objects so that they appear to move with the AMR in the XR environment 651.

Figure 39:
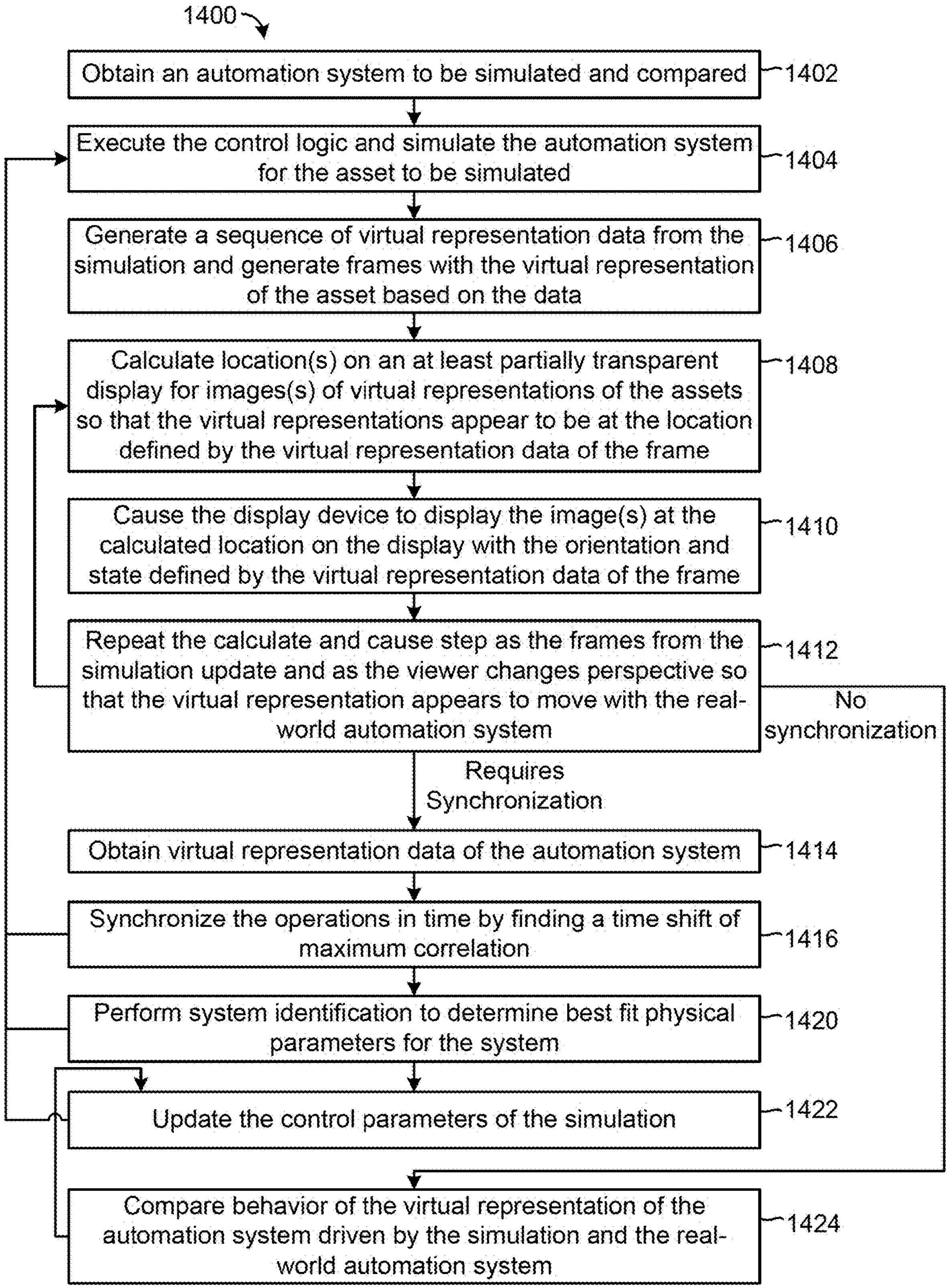
FIG. 39 is a flow diagram for comparing simulations with real-world operations of an automation system in an extended reality environment, according to some embodiments.

FIG. 39 shows sequence of operations 1400 for generating a simulation and creating an XR environment (e.g., XR environment 651 by XR enabled plant operations system 600)) with a virtual representation of the asset being simulated for comparison with the real-world asset, according to some embodiments. In some embodiments, sequence 1400 includes obtaining an automation system to be simulated and compared in step 1402. The asset could be any asset for which a visual comparison of the resulting behavior after changes to control parameters are made against the real-world asset with the original parameters would be advantageous. For example, after updating the parameters of a robot arm to make it operate faster. Sequence 1400 may include executing the control logic and simulating the automation system for the asset in step 1404. The control logic may be executed by having a version of the actual control logic in the simulation environment, using a simplified version of the control logic, or any of the methods previously discussed. The simulation may be performed by using the inputs calculated by the control logic as inputs to a dynamic systems model of the automation system. For example, a state-space system could be used as previously discussed.

In some embodiments, sequence 1400 includes step 1406 to generate a sequence of virtual representation data from the simulation and to generate frames with the virtual representation of the asset based on the virtual representation data in step 1406. In some embodiments, for each frame generated with the simulated assets steps 1408, 1410, and 1412 may be performed. These steps have been described previously in other sequences and include calculating the locations on the display of the XR enabled device (e.g., an AR headset) for images of the virtual representations of the assets so that the virtual representations appear to be at the location defined by the virtual representation data of the frame; causing the display to display the images at those locations on the display; and repeating the calculations and the update of the display at a rate fast enough that the virtual representations appear at the location defined by the frame as the viewer changes their perspective and fast enough that the virtual representation of the asset appears to be in continuous motion. In some embodiments, the location is updated based on the viewer perspective at a rate different than the frame is updated.

In some embodiments, sequence 1400 includes obtaining recent history of the virtual representation data of the automation system or asset thereof in step 1414 and synchronizing the operations in time by finding a time shift for which the correlation between the time shifted simulation data and the recent history of the data is similar in step 1416. The synchronization process may be performed as described in previous sections (e.g., as described in the section of the present disclosure on replay of events). After this step, playback of the simulation in the XR environment may be updated in order to cause the simulation and the real-world asset to be synchronized. In some embodiments, sequence 1400 includes performing a system identification procedure to determine the physical parameters of the dynamic system model that best fits the operations seen in the real-world system in step 1420. It may be possible to manually update parameters to increase synchronization between the real-world asset and the virtual representation of the asset from the simulation; however, an automated process may save time and if the asset must be out of service during the adjustment procedure, the automated process may limit the loss of production capacity during maintenance. Performing system identification may include generating an objective function related to the error between outputs of the simulation and measurements of the real-world asset as described previously and trying to minimize that error. After this step, playback of the simulation in the XR environment may be updated and it may be desired to synchronize the simulation in time with the real-world asset again due to the changes in the physical properties. In some embodiments, the time shift and the new physical properties may be identified together in one optimization problem.

In some embodiments, after steps 1402-1420 of sequence 1400 is performed, an operator may be able to view the virtual representation of the asset driven by the simulation and the respective real-world asset in the XR environment. The virtual representation and the real-world asset may appear to move together, occupying the same volume of space. If synchronization is good, changes in the operations of the virtual representation of the simulated asset due to changes in the control parameters may be indicative of changes in the operations of the real-world asset if the same control parameters were applied to the real-world asset. Advantageously, allowing the operator the test changes to the parameters in simulation and compare them directly to current operation in the XR environment prior to executing the parameters changes on the live system. In some embodiments, sequence 1400 includes updating the control parameters of the simulation in step 1422. In some embodiments, the physical parameters may also be updated. After the parameters of the simulation are updated, the simulation may be updated with the new parameters by performing steps and the virtual representation of the asset updated by performing steps 1402-1412. After the control parameters are updated, steps 1414-1420 may no longer follow the generation of the virtual representation in the XR environment as the desire is to compare the differences in the behavior because of the changes in the control parameters.

In some embodiments, during the execution of sequence 1400 various other sequences may also be performed to further enhance information viewed in the XR environment. For example, certain operations that are to be compared may occur too quickly to be perceived by the human eye. To allow the operator to view these differences in the XR environment the playback of the simulation and the respective real operation may be slowed. The sequences described in the section about creating a replay of historical operations may be used to generate a playback of recent operational data and anchored in the same XR environment as the virtual representations of the simulated assets. Playback of the recent operational data and the simulation may be slowed as previously described. For example, if the operator is viewing a repetitive motion (e.g., a robot arm performing a picking operation) the simulation may be viewed with the actual operations in real time in the XR environment; however, every number of cycles (e.g., every $10^{th}$ cycle) a playback of the actual operations in the XR environment along with the playback of the simulation and time could be slowed for this playback. Advantageously, performing a slow-motion playback in the XR environment after a number of real time playbacks of the simulation anchored with the real-world automation system would allow the operator to view general characteristics of the motion in real time, and some of the fine transitory details (e.g., overshoot) in a slow-motion playback. In some embodiments, virtual object representations of statistics of the behavior of the equipment may be generated and included in the XR environment. These virtual objects may add further visual cues as to how the changes in the control parameters may affect the operations of the automation system. For example, an ellipsoid could be used to visually indicate the uncertainty of the terminal location of a point on a robot arm. As control parameters are changed in the simulation of the automation system the ellipsoid may increase or decrease in size representing looser or tighter control, respectively.

Optimization of Automation Systems with Extended Reality

In some embodiments, an automation system may be driven by a control system or optimization system that is subject to several constraints. The constraints may not be visible in the real-world; however, for configuration and/or the general awareness of the operator it may be advantageous to see constraints within an XR environment. For example, autonomous mobile robots (AMR) may be subject to "rules of the road" within an automation system environment. Lanes, stop signs, speed limits, etc. may all be configured within the control system that drives the operations of an AMR, but are not visible in the real-world. In some embodiments, virtual object embodying certain constraints may be generated in their respective location so that an operator can visualize the environment as if they are navigating as the AMR.

Figure 40:
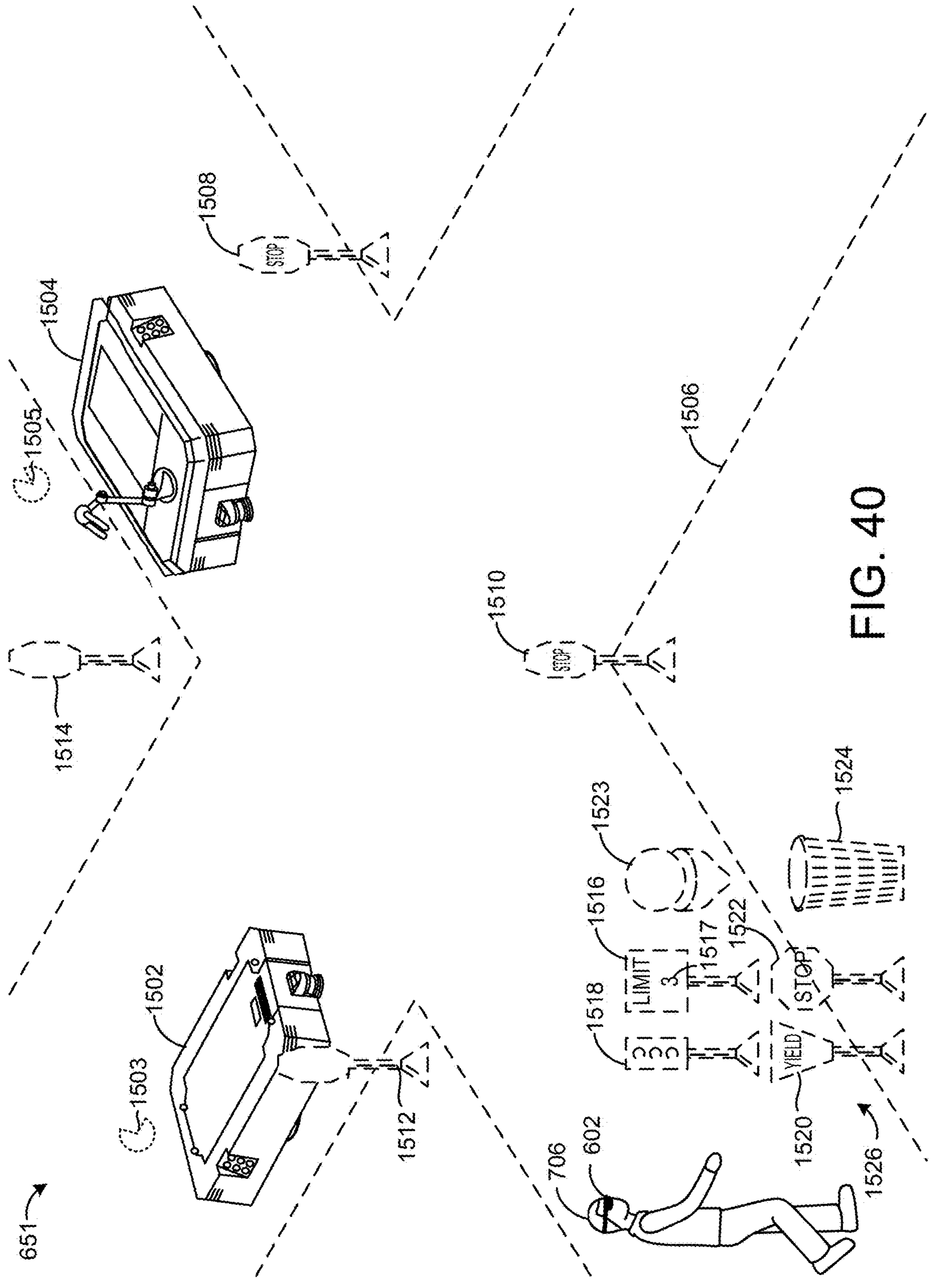
FIG. 40 is an illustrative view of creating motion rules for autonomous mobile robots in an extended reality environment, according to some embodiments.

FIG. 40 shows XR environment 651 according to some embodiments. In some embodiments, XR environment 651 contains AMRs (e.g., AMR 1502 and 1504) that must follow various rules of the road that may be configured via their remote guidance system as part of the overall plant monitoring system. XR environment 651 may contain real-world objects including AMR 1502, AMR 1504, and operator 706 wearing AR headset 602. AR headsets may allow for viewing virtual objects by displaying images on an at least partially transparent display such that when viewed through the head set the images appear to be a specific location anchored (e.g., embedded, inserted, integrated, etc.) in the real-world from a changing viewer perspective. Accordingly, AR headsets are advantageous as they allow to view real-world objects through the at least partially transparent display with the virtual objects. However, systems and methods described as using AR headsets may also include embodiments using headsets or other devices with an opaque display where a camera or other source of information may be used to recreate the real-world objects on the display. In some embodiments, XR environment 651 may include various virtual objects representing rules of the road including road boundary 1506 and virtual stop signs 1508-1514. Road boundary 1506 may represent lanes within which the AMRs must travel the plant. Virtual stop signs 1508-1514 may be used to represent that the intersection shown in XR environment 651 is a four-way stop. The virtual objects embodying the constraints of the AMR behavior are not limited to signs as one would typically encounter on the road. Other representations may be used; for example, virtual object may appear as if painted on the ground or could hover in the XR environment 651. The virtual objects do not need to take on the shape of road signs, though such indications may be advantageous due to near universal understanding within a particular region. Road boundary 1506 and virtual stop signs 1508-1514 may not be visible in the real-world, but greatly affect AMR behavior; thus, seeing the signs while trying to observe AMR behavior and optimize their configuration may be important.

In some embodiments, the operator may be able to configure the AMR behavior by interacting with the objects of the XR environment 651. For example, operator 706 may be converting the four-way stop to the equivalent of a light controlled intersection (e.g., at some times one direction is allowed to proceed and at other times another direction is allowed to proceed). The operator may request a rule palette at location 1526 (e.g., through a menu, voice activation, etc.). When the palette is requested, various virtual objects representing constraints or other terms in an optimization or control problem may appear within the virtual environment. For example, traffic light 1518, speed limit sign 1516, yield sign 1520, stop sign 1522, and way point 1523. Trash can 1524 may also be part of the palette to allow for the operator to delete constraints. To configure the rules of the road operator 706 may interact with the virtual objects in XR environment 651. For example, operator 706 may walk to virtual stop sign 1510, make a grab gesture near the location of the virtual stop sign 1510, move it to the virtual trash bin 1524 and release to delete the stop sign. To avoid problematic operations of the AMR during the configuration process, the operations may not be affected by any change until the operator releases the configuration indicating that the changes are complete, and any validation of the configuration has been performed by the plant monitoring system. The operator may repeat his steps for each of the remain stop signs. In some embodiments, the palette may follow the operator to increase efficiency. The operator can also interact with the virtual objects of the palette to configure the rules of XR environment 651. For example, making a grab gesture near traffic light 1518 may duplicate the virtual object and allow the operator to carry it to its intended location. In some embodiments, the terms of the optimization problem embodied by a virtual object may have configurable parameters (e.g., the speed limit 1517). The operator may, for example, configure parameters of the terms using voice commands or menu options when they interact with the virtual object.

In some embodiments, the operator may initialize a simulation of the automation system after they have configured it, but prior to accepting the new configuration. The simulation may be presented in the XR environment 651 as described in the section on simulation of changes to a system, or only the results of the simulation may be presented. For example, global AMR utilization may be presented to the operator via the headset or any other display device and/or the individual utilizations of each AMR may be presented with statistic indicators as discussed in the section on simulation of changes to a system. The statistic indicators may indicate they are related to the simulation (e.g., change color, change brightness, overlay two indicators, etc.).

Figure 41:
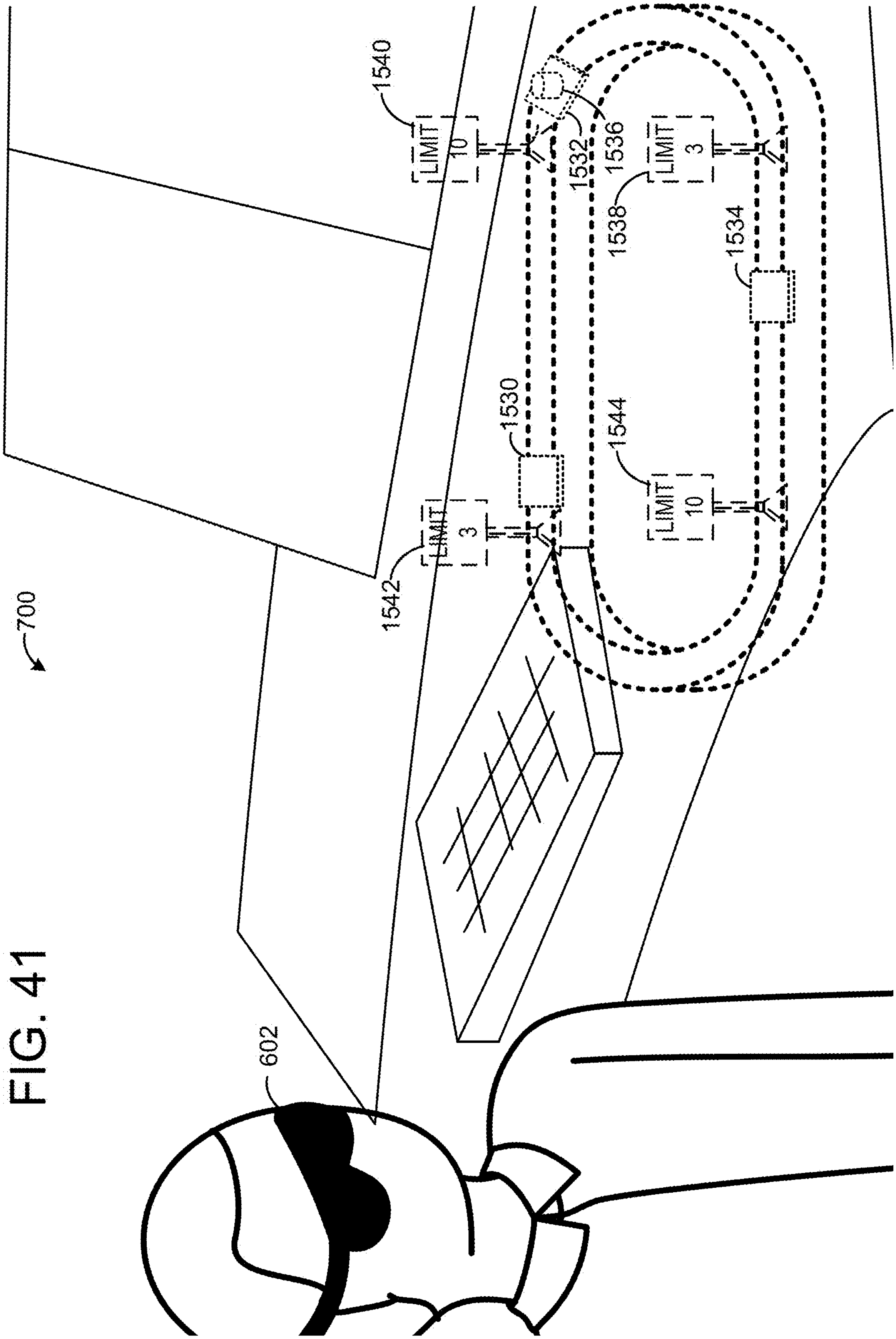
FIG. 41 is an illustrative view of creating motion rules for an independent cart technology system in an extended reality environment, according to some embodiments.

With reference to FIG. 41, the automation system for which the control or optimization system is to be configured may be shrunk in size in the XR environment 651, according to some embodiments. Advantageously, the smaller automation system may give the operator a global view of the operations and allow them to configure the optimization system using virtual objects without the need of moving to the desired location to place them. It is possible to change the size of any automation system including ICT systems and a whole plant utilizing AMRs. FIG. 41 shows a virtual ICT system that has been miniaturized in the XR environment 651 and is being viewed by an operator through AR headset 602 from observation area 700, according to some embodiments. The virtual ICT system shows virtual carts 1530-1534, one carrying a virtual canister 1536. The virtual ICT system may be representative of a live ICT system, or it may be a simulation of a potential ICT system that is being considered for this plant. The virtual ICT system may have different speed limits at different sections of the track as indicated by virtual speed limit signs 1538-1544. The operator may be viewing a simulation of the ICT track while making changes to the speed limits to see how it affects the behavior of the system.

Figure 42:
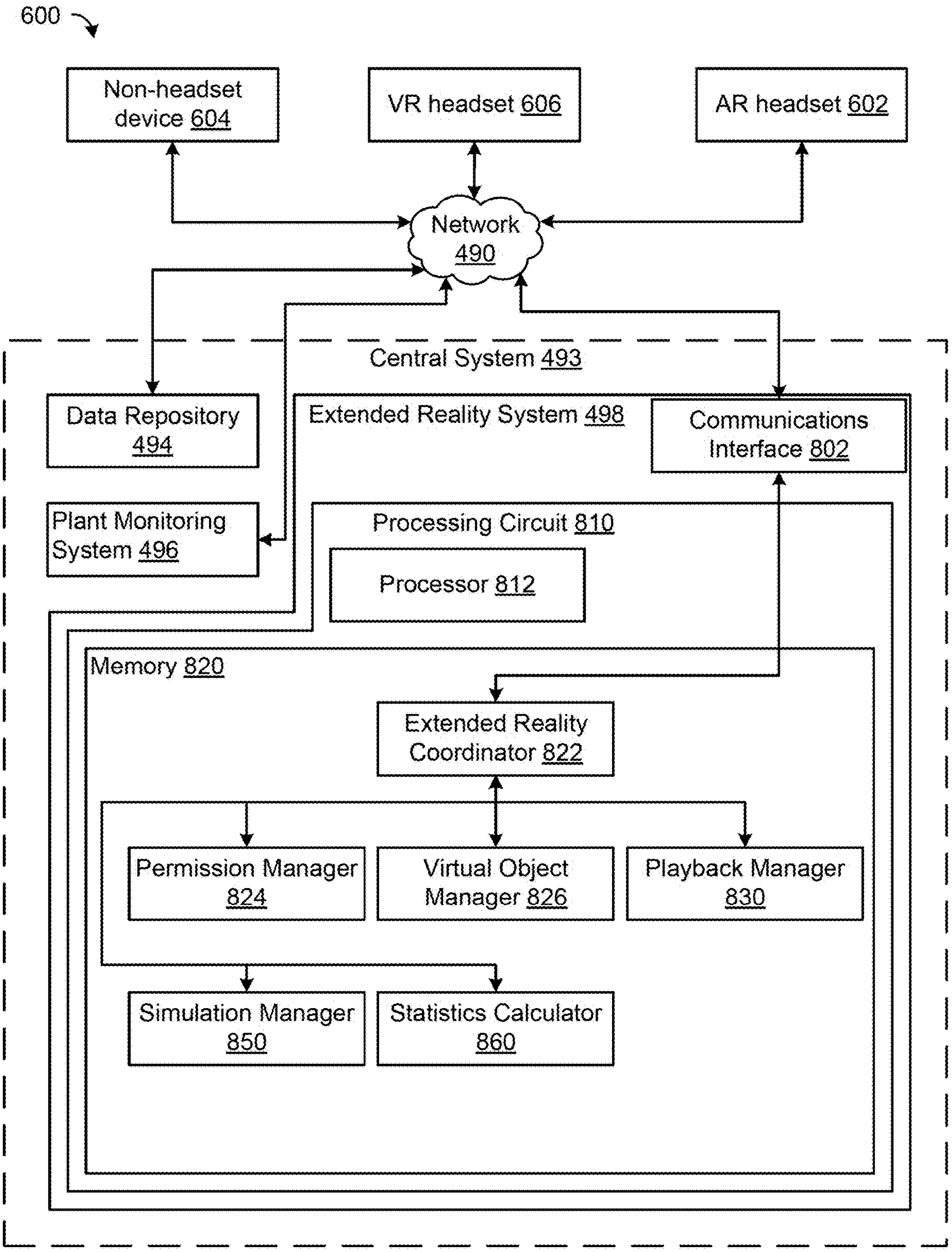
FIG. 42 is a block diagram of a central system configured to adjust and/or create a control and/or optimization system in an extended reality environment, according to some embodiments.

With reference to FIG. 42, extended reality enabled plant operations system 600 is shown, according to some embodiments. In some embodiments, XR enabled plant operations system 600 includes a number of VR headsets (e.g., headset 606), a number of AR headsets (e.g., headset 602), a number of non-headset devices (e.g., device 604), data repository 494, plant monitoring system 496, and extended reality system 498 communicably connected by network 490. In some embodiments, extended reality system 498 may perform the majority of the operations to generate the extended reality enabled plant operations system with viewing and/or configuring an optimization or control system in an XR environment 651, the operations may be distributed across any of the systems shown in XR enabled plant operations system 600 including data repository 494, plant monitoring system 496, extended reality system 498, or any of the headset or non-headset XR enabling devices (e.g., devices 602-606).

In some embodiments, extended reality system 498 includes communications interface 802 and processing circuit 810. In some embodiments, processing circuit 810 contains processor 812 and memory 820. The processors may be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.). The processors may be configured in various computer architectures, such as graphics processing units (GPUs), distributed computing architectures, cloud server architectures, client-server architectures, or various combinations thereof. One or more first processors can be implemented by a first device, such as an edge device, and one or more second processors can be implemented by a second device, such as a server or other device that is communicatively coupled with the first device and may have greater processor and/or memory resources. The memories may include one or more devices (e.g., memory units, memory devices, storage devices, etc.) for storing data and/or computer code for completing and/or facilitating the various processes described in the present disclosure. The memories may include random access memory (RAM), read-only memory (ROM), hard drive storage, temporary storage, non-volatile memory, flash memory, optical memory, or any other suitable memory for storing software objects and/or computer instructions. The memories may include database components, object code components, script components, or any other type of information structure for supporting the various activities and information structures described in the present disclosure. The memories may be communicably connected to the processors and can include computer code for executing (e.g., by the processors) one or more processes described herein.

In some embodiments, memory 820 includes various modules and/or instruction sets to facilitate the functionality of extended reality system 498. In some embodiments, memory 820 includes extended reality coordinator 822, permissions manager 824, virtual object manager 826, playback manager 830, simulation manager 850, and statistics calculator 860. In some embodiments, memory 820 may also include modules and/or instruction sets to facilitate the features or operations discussed in other sections of the present disclosure, but not needed for the discussion of monitoring and configuring control and/or optimization systems. In some embodiments, XR enabled plant operations system 600 is responsible for displaying virtual objects that represent terms within an optimization or control problem generating a simulation of a control system. For example, XR enabled plant operations system 600 may be configured to generate signs representing constraints of an optimization or control problem, XR enabled plant operations system 600 may be configured to generate a motion trajectory representing the outcome of a control or optimization problem, or display sliders indicating the relative weights of various terms in the objective function of the control or optimization system. It is contemplated that the control and/or optimization system may be a component of extended reality system 498 or may be a component of the automation system (e.g., plant monitoring system 496).

In some embodiments, initializing the XR environment 651 with optimization view can be performed via a voice command (e.g., "show constraints" or "show rules of the road" depending on the type of automation system). In some embodiments, the command to initialize the XR environment 651 can be chosen through a menu at the workstation or other computer with a traditional display device. Such a command may be sent from a device (e.g., device 602-606) over network 490 to communications interface 802. Extended reality coordinator 822 may be configured to process the command by using the permissions manager 824 to first determine if the operator using the device the command came from has permissions to view the constraints. For example, permissions manager may include a mapping between devices and the operator currently using the devices, between an operator and their roles, and between roles and permissions and use these mappings to determine if the device from which the request came should be granted permission to view the playback.

In some embodiments, extended reality coordinator 822 may be configured to determine the constraints governing behavior of the automations systems at a site with data from data repository 494 and/or plant monitoring system 496 after permission of viewing the constraints or optimization view is granted. Information related to an objective function or terms therein of the automation system may also be obtained. In some embodiments, constraint information may also be stored in a remote guidance system for AMRs of the automation system. Extended reality coordinator 822 may be configured to use information about the various constraints, terms of the objective function, or other similar calculation related to the optimization of the automation system and determine a virtual object to use to represent that constraint, term, or calculation. For example, a speed limit sign may be used to indicate areas of the automation system or plant environment for which a speed limit is in effect. In some embodiments, the constraint may be active at a location or area; extended reality coordinator 822 may be configured to determine a location for the virtual object such that the location correlates with the area of the plant environment or automation system for which the constraint is active.

In some embodiments, virtual object manager 826 is configured to provide a three-dimensional model for the virtual object that represents the constraint. Virtual object manager 826 may have a repository of three-dimensional models for various constraints that may be provided by the automation system. Any model could be used to represent any constraint; however, certain constraints or behavioral limitations may have a near universally recognized shape (within a geographic region) for a particular constraint. For example, a sign with a red octagon may indicate that any automation system or equipment thereof must stop before passing the sign. Other signs may be included in virtual object manager to represent other rules of the road within an AMR or ICT system. A weight symbol or anvil may be used to indicate part of an automation system that has a load restriction (e.g., due to increased wear). A circular line could be used to indicate a region where AMRs or ICT carts are not allowed to enter. Some indications may be transitory; for example, by brightening an area of the boundary that is currently active (e.g., hindering the motion of a device). In some embodiments, color overlays or “skins” are virtual objects provided by virtual object manager 826 that are shaped similar to a live device and are maintained at the same location of that device to appear as an overlay. For example, a colored transparent red skin may be indicative of an AMR with a load restriction or a colored transparent green skin may indicate the system is operating efficiently. Extended reality coordinator 822 may be configured to provide the virtual objects representing the constraints and other optimization related variables with a location to any of the XR enabled devices (602-606).

In some embodiments, after receiving the virtual control panel and the location, XR enabled device (602-606) may be configured to produce an image of the virtual objects representing the constraints or objectives. For example, the AR headset 602 may calculate the location an image should be placed on each half of the at least partially transparent display (one image for each eye) to cause a virtual object to appear at the provided location. The AR headset 602 may generate the images at the calculated locations on the display. And the calculations and generating of the images may be repeated so that the virtual object appears to remain at the provided location even as the operator changes their perspective (e.g., location or head orientation). In some embodiments, extended reality system 498 may be configured to maintain the location of the virtual object relative to a moving portion of the automation system (e.g., and AMR or ICT cart). Extended reality coordinator may be configured to periodically obtain the location of the portion of the automation system and update the location the virtual object should appear within the XR environment 651. In some embodiments, the extended reality system 498 may communicate the location relative to the mobile system and the XR enabled device (e.g., AR headset 602) may perform the calculations to determine the location at which the virtual object should appear.

In some embodiments, extended reality system 498 may be configured to provide the ability to configure the optimization system by interactions within the XR environment 651. The user may enter configuration mode by voice command or through a menu and permissions may be validated as previously described. In configuration mode, a palette of virtual objects representing the types of constraints available may be displayed within the XR environment 651. The palette may be selectable or automatically generated based on context (e.g., the site location or images from a camera of any of the XR enabled devices). To cause the palette to appear in the XR environment 651, extended reality coordinator 822 may be configured to receive three-dimensional models of the virtual objects in the palette from virtual object manager 826. Extended reality coordinator 822 may be configured to communicate those three-dimensional models of the virtual objects as well as a location (or location relative to the operator) to any of the XR enabled devices (e.g., devices 602-606) over network 490. The XR enabled devices may be configured to calculate a location on the display to cause the virtual object to appear in the XR environment 651 from a changing operator perspective. For example, AR headset 602 may calculate the location an image should be placed on each half of the at least partially transparent display (one image for each eye) to cause the virtual object to appear at the provided locations.

In some embodiments, virtual objects of the palette or the virtual objects representing constraints or objectives may be interacted with in order to modify the optimization problem or the control strategy governing the automation system. In some embodiments, AR headset 602 or another XR enabled device may be configured to recognize a grab gesture and/or a release gesture. For example, a virtual object may be moved from the palette by performing a grab gesture at the location of the virtual object and moving a hand to another location. The virtual object may be released at a new location by making a release gesture. In some embodiments, AR headset 602 is configured to communicate the new location to extended reality system 498. Extended reality coordinator 822 may be configured to, upon receiving a message that a virtual object from the palette has been moved, prompt the operator for any necessary parameters of the constraint, etc. represented by the virtual object. For example, if the virtual object represented a speed limit, it may send a request to the XR enabled device to obtain (e.g., device 602-606) to obtain the maximum speed or to indicate the region for which the speed limit is active. In some embodiments, Extended reality coordinator 822 may be configured to generate another virtual object to be displayed within the palette each time a virtual object is removed from the palette.

In some embodiments, extended reality coordinator 822 and/or virtual object coordinate are configured to maintain the location of each virtual object that represents a constraint of the automation system. Extended reality coordinator 822 may be configured to communicate the locations of the virtual objects representing the constraints, terms of an objective function, etc. and any parameters thereof to plant monitoring system 496 so that the constraints, etc. can be considered during control of the automation system. In some embodiments, those locations and parameters are communicated to the plant monitoring system 496 as the operator interacts with the virtual objects. In some embodiments, partially configured constraints, etc. may cause undesirable operations of the automation system. Accordingly, the locations and parameters may not be communicated to the plant monitoring system until the operator confirms configuration is complete.

In some embodiments, extended reality system 498 may be configured to allow for configuration of the optimization problem or control strategy to be performed in the XR environment 651 with a scaled down representation of the automation system. For example, an ICT system may be scaled to the size of a desktop for easy configuration using virtual objects. In some embodiments, virtual object manager 826 may be configured to provide a three-dimensional model of the automation system. Extended reality coordinator 822 may be configured to provide the three-dimensional model to any of the XR enabled devices (e.g., 602-606) with a scale factor. The XR enabled devices may be configured to calculate a location on the display to cause the virtual object to appear in the XR environment 651 from a changing operator perspective. For example, AR headset 602 may calculate the location an image should be placed on each half of the at least partially transparent display (one image for each eye) to cause the virtual object to appear at the provided locations. In some embodiments, extended reality system 498 may be configured to perform palette generation, display, and allow interaction with the virtual objects in scaled down form as in the full-size representation.

In some embodiments, extended reality system 498 may be configured to provide a simulation of automation system operations with the constraints, etc. configured by the operator within the XR environment 651. Executing a simulation within the XR environment 651 may be performed according to some embodiments described in previous sections of the present disclosure. Features available to the operator regarding simulations may also be available for simulations for which the optimization problem or control strategy was configured by manipulating virtual objects in the XR environment 651. For example, the operator may want to view a simulation from their desk rather than in the site and the automation system or portion thereof may be shrunk to fit within a fixed volume of the XR environment 651 (e.g., on a desktop).

Figure 43:
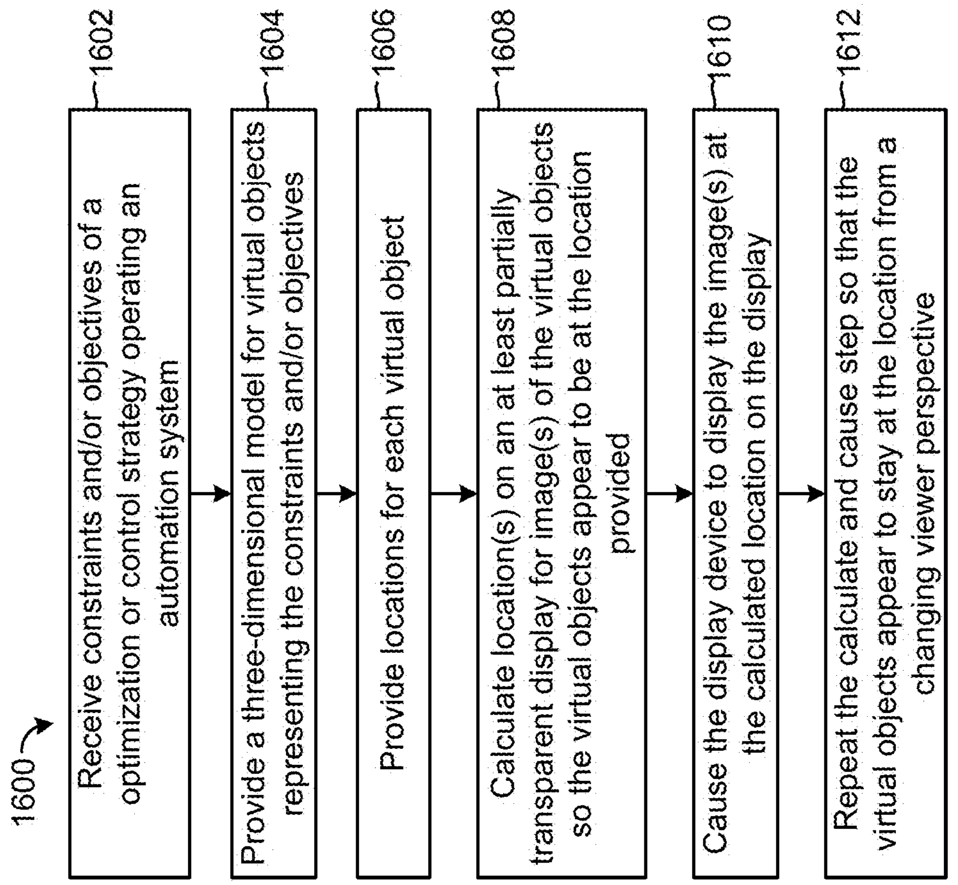
FIG. 43 is a flow diagram for adjusting and/or creating a control and/or optimization system in an extended reality environment, according to some embodiments.

FIG. 43 shows sequence of operations 1600 for generating an XR environment (e.g., XR environment 651 by XR enabled plant operations system 600)) with virtual object representations of constraints and/or objectives of a control or optimization strategy of an automation system, according to some embodiments. In some embodiments, sequence 1600 includes receiving constraints and/or objectives of an optimization or control strategy operating an automation system in step 1602. Examples of constraints and/or objectives include: a boundary indicative of a region where AMRs are not permitted may be received, an area for which a speed limit may be received, or a destination or way point of an AMR may be received. In some embodiments, sequence 1600 includes providing a three-dimensional model for virtual objects representing the constraints and/or objectives in step 1604. For example, a street sign may be provided to represent a speed limit or a requirement to stop. In some embodiments, sequence 1600 includes providing locations for each virtual object in step 1606. Some constraints may be active for a region of the automation system or the environment in which the automation system operates. The virtual object may be located in or near the region for which the constraint is active such that its location indicates or defines the region. For example, a stop sign may imply that the stop must occur prior to any mobile portion of an automation system crossing a line parallel to the face of the sign, or a speed limit sign may represent a speed limit that is active from starting at the sign and ending at the next speed limit sign (or an end of speed limit sign). In some embodiments, the region for which the constraint is active may also be included as part of the virtual object. For example, a stop sign may include a line indicative of where the stop must occur, or a speed limit sign may include an area for which the speed limit is active. In some embodiments, the region for which the constraint is active may be displayed optionally (e.g., when the virtual object is selected).

In some embodiments, sequence 1600 includes calculating locations(s) on an at least partially transparent display for image(s) of the virtual objects so that the virtual objects appear to be at the location provided, causing the display device to display the image(s) at the calculated location on the display, and repeating the calculations and display so that the virtual objects appear to stay at the location from a changing viewer perspective in steps 1608, 1610, and 1612 respectively. These steps have been previously discussed. Advantageously, displaying the virtual objects on an AR headset with an at least partially transparent display allows the operator to view the virtual objects with the real-world objects in the XR environment. However, similar steps can be performed to view the XR environment on an opaque screen with a recreation (e.g., by displaying images from a camera) of the real-world environment on the display.

Figure 44:
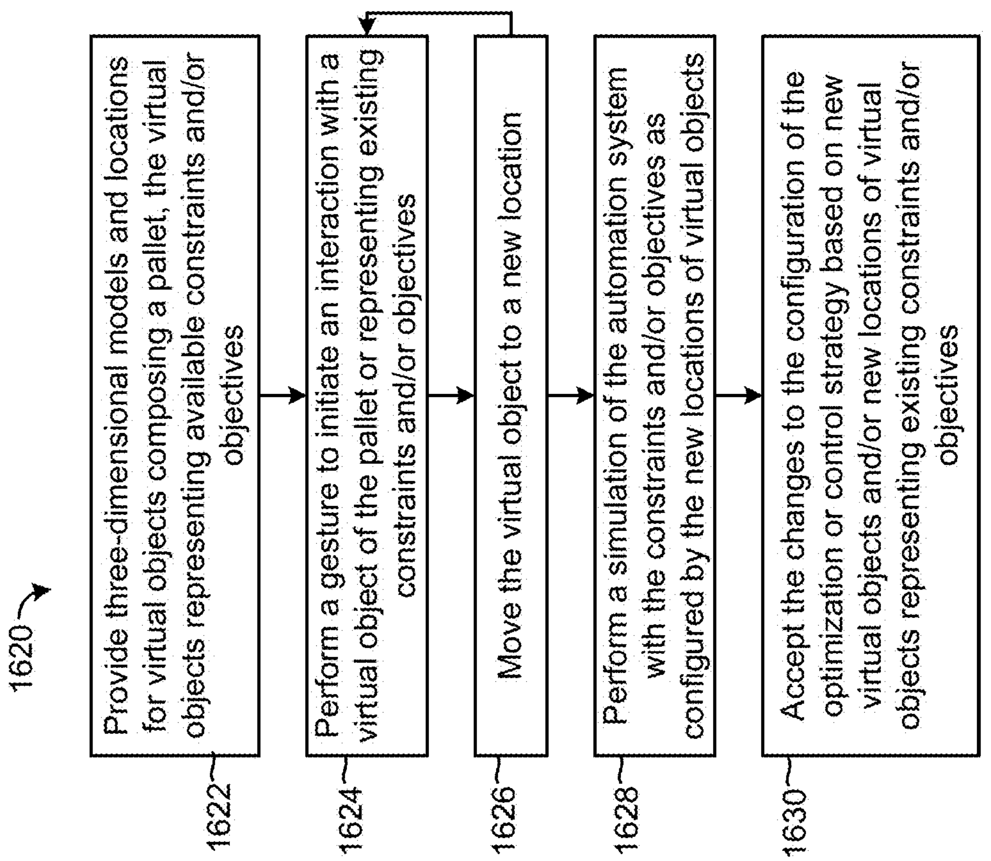
FIG. 44 is another flow diagram for adjusting and/or creating a control and/or optimization system in an extended reality environment, according to some embodiments.

FIG. 44 shows sequence of operations 1620 for configuring an optimization or control strategy controlling an automation system, according to some embodiments. In some embodiments, sequence 1620 may be used in conjunction with sequence 1600. Sequence 1620 may provide additional virtual objects that may be displayed using the portions of sequence 1600. For example, sequence 1620 may be performed prior to the steps that cause the virtual objects to be displayed in such a way that they appear to be anchored with the real-world objects of the XR environment. In some embodiments, sequence 1620 includes providing three-dimensional models and locations for virtual objects composing a palette in step 1622. The virtual objects of the palette may represent available constraints and/or objectives and provide a way for the operator to add constraints and/or objectives to the optimization or control strategy by interacting with virtual objects within the XR environment. In some embodiments, sequence 1620 includes performing a gesture to initiate an interaction with a virtual object of the palette or representing existing constraints and/or objectives in step 1624. For example, a grab gesture may be used to hold on to a virtual object. In some embodiments, sequence 1620 includes moving the virtual object to a new location in step 1626. For example, once the virtual object is held, it may be possible to "carry" the virtual object to another location. In some embodiments, the location of the virtual object is related to the region for which the constraint is active and carrying the virtual object to another location may cause the constraint or objective to be configured to be active in another region of the environment. In some embodiments, when a virtual object is removed from the palette, a step of providing parameters for the virtual object may be performed (e.g., the maximum speed for a speed limit sign or a region for a keep out boundary) and a replacement for the virtual object in the palette created. The process of interacting with the virtual objects either of the palette or those representing existing constraints may be repeated to configure the optimization or control strategy as needed.

In some embodiments, sequence 1620 includes accepting the changes to the configuration of the optimization or control strategy based on new virtual objects and/or new locations of virtual objects representing existing constraints and/or objectives in step 1630. It may not be desirable to allow each constraint and/or objective to take effect as it is configured. For example, undesirable operations may occur without the existence of another constraint. The operator may wait to complete all configurations before accepting the new configuration. Accepting the new configuration may include issuing a command (e.g., through a menu or via voice commands). In some embodiments, the operator may desire to view a simulation of the automation system with the constraints as configured through sequence 1620. Sequence 1620 may include step 1628 to perform said simulation based on the constraints and/or objectives as configured by the new locations of virtual objects. Simulations may be performed by the systems and/or using the sequences described previously in the present disclosure.

Fault Detection with Extended Reality

Figures 45, 46:
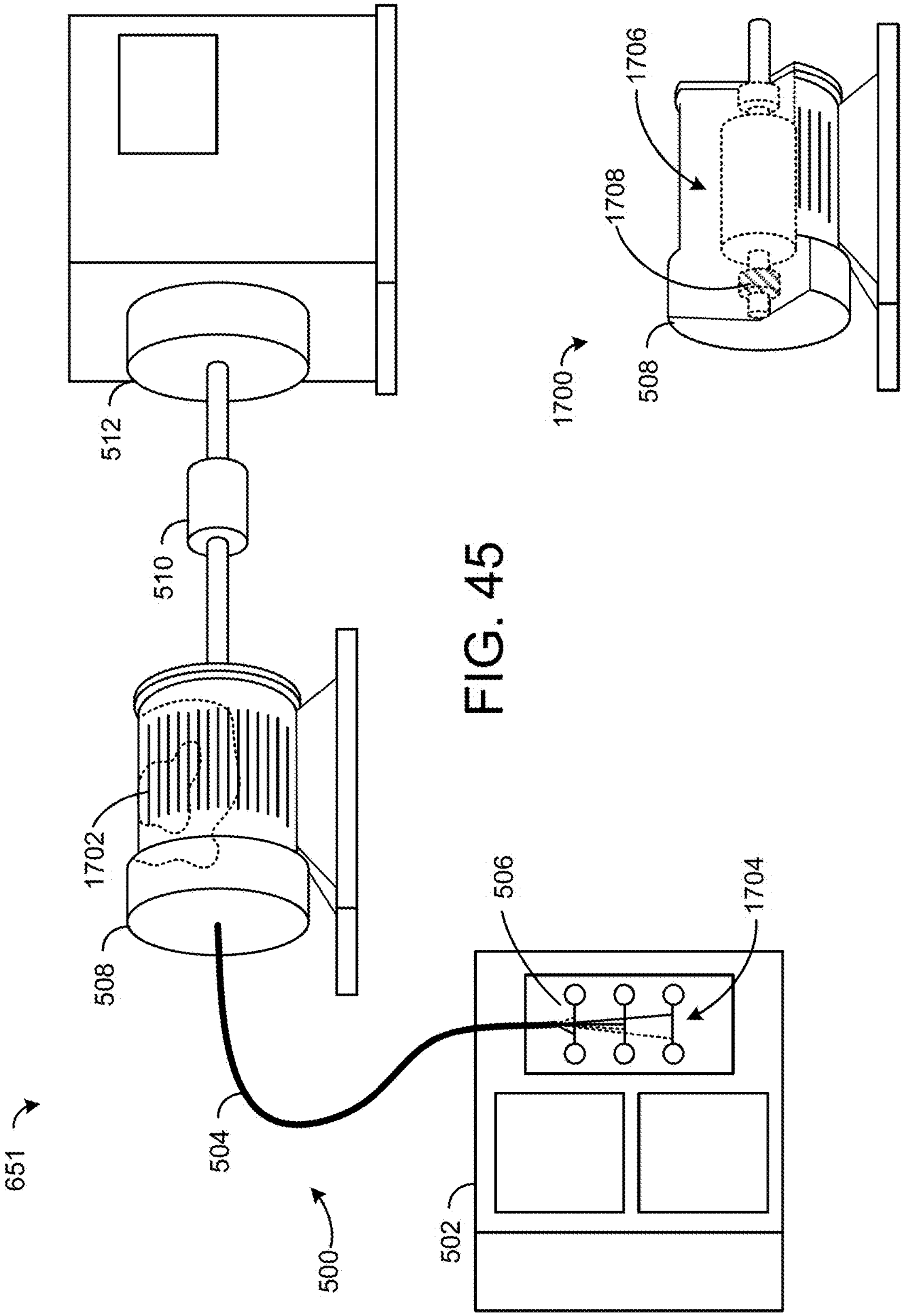
FIG. 45 is an illustrative view of a motor and motor drive system with a skin in an extended reality environment, according to some embodiments.
FIG. 46 is an illustrative view of the internal components of a motor with a skin as seen in an extended reality environment, according to some embodiments.

FIG. 45 shows XR environment 651 as being viewed by an operator wearing AR headset 602. XR environment 651 includes virtual objects and overlays amenable to visual troubleshooting and fault detection within an automation system. XR environment 651 is shown with reference to motor and drive system 500, but the virtual objects described, and the systems and methods described to generate them are applicable to other systems used in automations systems (e.g., the automations systems and AMRs described herein).

In some embodiments, a skin (e.g., a type of virtual object that is overlaid on its real-world equivalent) can be generated. The skin may provide various information related to the operational health, status, condition, etc. of the real-world object. For example, a skin may include a mapping that maps a non-visual attribute (e.g., temperature, utilization, etc.) to a visually perceivable characteristic (e.g., color, brightness, etc.) of the skin. A non-visual attribute, for example, is an attribute that is difficult to perceive visually or cannot be perceived visually. AR headset 602 may generate images of the skin on its at least partially transparent display dependent on the perspective of the operator. For example, the images of the skin may be generated such that, when viewed by an operator from a changing perspective, the skins appear to overlay the real-world object or portion thereof. The skins may be made to appear to have increased transparency with respect to other virtual objects so that the real-world object may be viewed behind the skin.

Skins may be used to convey fault information (e.g., by producing a red overlay), machine wear information, machine utilization information, machine selections, or any other information that can be communicated by highlighting an object with a color filter. Skins may also be used to convey magnitude of a property or variable of a real-world object. In some embodiments, a skin is used to represent the magnitude of a variable by way of a color scale. For example, a skin can be used to represent utilization with a color scale that shows a gradual transition from green to red; 0% utilization may be represented by green, 50% utilization may be represented by yellow, and 100% utilization may be represented by red. Properties of colors other than hue may be used to represent variations in a variable using a color scale. For example, the saturation and or lightness may be used to represent variations in the variable in addition (or instead of) the hue.

Skins may be used to perform a visual peer analysis as different colors on the same or similar type of equipment will be noticeable to an operator viewing the virtual environment. In some embodiments, skins a generated for a number of peer devices (e.g., same model number, same equipment type, or any other characteristic that can be used to filter devices). An operator can quickly and visually determine if any of the devices are different than others. In some embodiments, an extremum (e.g., minimum, maximum) of a variable (e.g., the non-visual attribute) is indicated by a virtual audio source. The sound generated by a display device may be perceived as coming from the virtual audio location of the virtual audio source. The operator may quickly find devices that are significantly different than others. In some embodiments, the virtual audio source is positioned proximate devices for which the variable is an outlier. Several virtual audio sources can be used if there is more than one outlier, for example, using different frequencies to indicate different locations of different devices.

In some embodiments, color of the skin varies along the surface of the skin, for example, to indicate the value of the variable of a function of location over the surface of the real-world object. Skins representing heatmaps of a field are useful in pinpointing a fault or other condition of automation equipment. Skin 1702 is shown to be representing the temperature of motor 508 as a function of location around the body of the motor 508. Skin 1702 may be indicative of a faulty winding overheating within motor 508, specifically a winding near the upper portion of the body where the color scale is at its highest value. Other variables may be location dependent and amenable to display using a heatmap style skin include power usage, electric and/or magnetic fields, acoustic levels, etc.

In some embodiments, the property or variable conveyed by the color scale of the skin may be a calculated variable (e.g., using a soft sensor or virtual sensor). In a virtual sensor, one or more real sensor measurements may be used to determine the value of the variable. This calculated variable can then be converted into a color via the color scale to generate the skin. For example, the power usage of various electrical components of a motor may be used to estimate the temperature of that motor as a function of location. Digital twin models of the motor and or computational fluid dynamics may be used in order to determine heat transfer around the motor and/or an estimated temperature of the various components.

In some embodiments, a simulation may be performed to determine expected values of a variable. For example, a digital twin environment can be used to perform a simulation of one variable based on sensors of another variable. Results of the simulation may be used to generate the color, etc. of a skin. The results of the simulation may also be compared to the actual values (e.g., the actual values may be subtracted from the estimated values). The results of the comparison can be used as the variable represented by the color scale of the skin. For example, a red color indicative of a large difference and thus model mismatch (e.g., resulting from an inaccurate model and/or faulty equipment).

With reference to FIG. 46, the XR environment 651 is shown with a cutaway or internal view 1706 of motor 508. The internal view 1706 can allow for the operator viewing the XR environment 651 to virtually inspect components of motor 508 and/or other devices that are internal to the device. Skins can be provided on internal components for rapid visual inspection. For example, the internal bearing shown as virtual bearing 1708 may show an overlay or skin indicative of excessive wear. In some embodiments, a skin of the device (e.g., motor 508) can be created and moved from its initial location (e.g., using gestures as described herein). In some embodiments, the viewer may be able to enlarge the skin to a size where the viewer is capable of entering the device and viewing the internal components when the AR headset recognizes that they have moved past the current location of the outer boundary of the device.

Referring again to FIG. 45, the XR environment 651 may provide trouble shooting capability. In some embodiments, the extended reality system 498 can detect and provide corrections for poorly configured components of an automation system. For example, the AR headset and associated processing capability may detect improper wiring of motor drive 502 and provide a virtual object representation of proper connections (e.g., virtual wires 1704). The AR headset may use various machine vision models (e.g., convolutional neural networks (CNNs)) to detect problematic configurations. The AR headset may then use images of proper connections to generate appropriate virtual objects that demonstrate the correct wiring within XR environment 651. The AR headset may detect improper wiring in real time as the connections are being created and provide the indication of proper wiring before the device is ever turned on, preventing costly damage to equipment and/or worker safety concerns. In some embodiments, generative AI may be used to generate the virtual objects representing the proper wiring.

Other configuration issues may be detected using the cameras of AR headset 602 and communicated to the viewer (e.g., operator) viewing the XR environment 651 by way of producing a virtual object within the XR environment 651. For example, the AR headset may detect an alignment issue with a motor shaft (e.g., using a machine vision model) and generate a virtual shaft with proper alignment or different virtual object indicative of communicating the misalignment. The AR headset 602 may be configured to detect additional configuration issues and indicate them by way of a virtual object. For example, the AR headset may detect a wrong number of carts on an ICT track, an AMR outside of its area of operations, calibration issues of sensors (e.g., through visual measurements not matching sensor data), poor parameters settings (e.g., noticing increased motion overshoot), etc.

Figure 47:
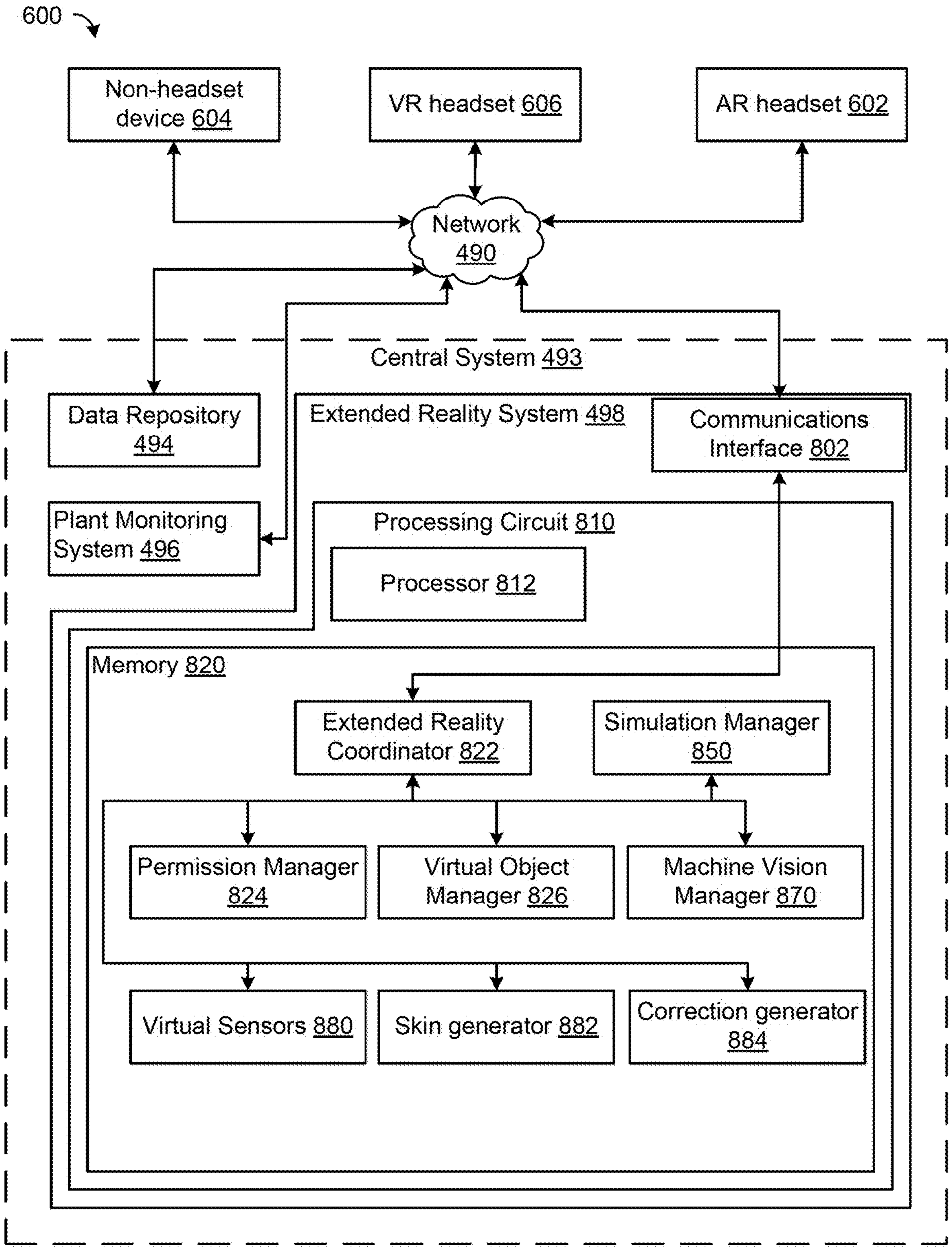
FIG. 47 is a block diagram of a central control system configured to generate skins within an extended reality environment, according to some embodiments.

With reference to FIG. 47, extended reality enabled plant operations system 600 is shown, according to some embodiments. In some embodiments, XR enabled plant operations system 600 includes a number of VR headsets (e.g., headset 606), a number of AR headsets (e.g., headset 602), a number of non-headset devices (e.g., device 604), data repository 494, plant monitoring system 496, and extended reality system 498 all communicably connected by network 490. In some embodiments, extended reality system 498 may perform the majority of the operations to realize the extended reality enabled plant operations system with viewing and/or configuring an optimization or control system in an XR environment 651, the operations may be distributed across any of the systems shown in XR enabled plant operations system 600 including data repository 494, plant monitoring system 496, extended reality system 498, or any of the headset or non-headset XR enabling devices (e.g., devices 602-606).

In some embodiments, extended reality system 498 includes communications interface 802 and processing circuit 810. In some embodiments, processing circuit 810 contains processor 812 and memory 820. The processors may be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.). The processors may be configured in various computer architectures, such as graphics processing units (GPUs), distributed computing architectures, cloud server architectures, client-server architectures, or various combinations thereof. One or more first processors can be implemented by a first device, such as an edge device, and one or more second processors can be implemented by a second device, such as a server or other device that is communicatively coupled with the first device and may have greater processor and/or memory resources. The memories may include one or more devices (e.g., memory units, memory devices, storage devices, etc.) for storing data and/or computer code for completing and/or facilitating the various processes described in the present disclosure. The memories may include random access memory (RAM), read-only memory (ROM), hard drive storage, temporary storage, non-volatile memory, flash memory, optical memory, or any other suitable memory for storing software objects and/or computer instructions. The memories may include database components, object code components, script components, or any other type of information structure for supporting the various activities and information structures described in the present disclosure. The memories may be communicably connected to the processors and can include computer code for executing (e.g., by the processors) one or more processes described herein.

In some embodiments, memory 820 includes various modules and/or instruction sets to facilitate the functionality of extended reality system 498. In some embodiments, memory 820 includes extended reality coordinator 822, permissions manager 824, virtual object manager 826, machine vision manager 870, simulation manager 850, virtual sensors 880, skin generator 882, and correction generator 884. In some embodiments, memory 820 may also include modules and/or instruction sets to facility the features or operations discussed in other sections of the present disclosure, but not needed for the discussion of fault detection using extended reality environments.

In some embodiments, initializing the XR environment 651 with a skin view can be performed via a voice command (e.g., "show runtimes using default color scale"). In some embodiments, the variables to represent via a skin can be chosen through a menu at workstation or other computer with a traditional display device. Such a command may be sent from a device (e.g., device 602-606) over network 490 to communications interface 802. Extended reality coordinator 822 may be configured to process the command by using the permissions manager 824 to first determine if the operator using the device the command came from has permissions to view the request skin. For example, permissions manager may include a mapping between devices and the operator currently using the devices, between an operator and their roles, and between roles and permissions and use these mappings to determine if the device from which the request came should be granted permission to view the playback.

In some embodiments, virtual object manager 826 is configured to provide a three-dimensional model for the skin that will overlay the real-world object. Virtual object manager 826 may have a repository of three-dimensional models for various constraints that may use skin generator 882 to determine a color for the skin. Skin generator 882 may receive a value (e.g., sensor measurement, value from simulation, virtual sensor, statuses, modes, etc.) and determine a color by comparing the value to a color scale. For example, the color scale may indicate a mapping between a range of values and respective hues for the skin. In some embodiments, the colors determined depend on a location on the skin. Skin generator 882 may provide the color and/or the tuples of color and location to the virtual object manager 826 to generate the three-dimensional model. The virtual object manager may provide the skin and a real-world location to display the skin.

In some embodiments, virtual object manager 826 is configured to cause the virtual objects representing the interior of a real-world object to be displayed on AR headset 602 such that they appear within the real-world object. Fault diagnostics may be performed visually based on the skins of the interior components. An internal component with a particular overlay may be indicative of an elevated temperature, excessive wear, etc. such that the differences can be recognized visually through AR headset 602.

In some embodiments, after receiving the skin and the location, XR enabled device (602-606) may be configured to produce an image of the skin. For example, the AR headset 602 may calculate the location an image should be placed on each half of the at least partially transparent display (one image for each eye) to cause the skin to appear at the provided location (e.g., overlaid on the equipment). The AR headset 602 may generate the images at the calculated locations on the display. And the calculations and generating of the images may be repeated so that the skins appear to remain at the provided location even as the operator changes their perspective (e.g., location or head orientation). In some embodiments, extended reality system 498 may be configured to maintain the location of the virtual object relative to a moving portion of the automation system (e.g., overlaid on an AMR or ICT cart). Extended reality coordinator may be configured to periodically obtain the location of the portion of the automation system and update the location the skin should appear within the XR environment 651. In some embodiments, the extended reality system 498 may communicate the location relative to the mobile system and the XR enabled device (e.g., AR headset 602) may perform the calculations to determine the location at which the skin should appear.

In some embodiments, simulation manager 850 and/or virtual sensors 880 provide the value used to determine the color by the skin generator 882. Simulation manager 850 may perform a simulation as described in the present application to determine a value that will be used to determine the color of the skin. The virtual sensors 880 may include calculations and/or correlations that can be used to determine a value that will be used to determine the color of the skin as a function of one or more other sensors (and/or virtual sensors). The color of the skin may be either static (e.g., calculated once and not updated) or dynamic. For example, the virtual sensor calculation can be repeated to continuously update the color of the skin based on the new virtual sensor value. As another example, the color of the skin can be continuously updated based the propagation of time in the simulation (e.g., as the value of the simulated variable changes with respect to time color of the skin also changes).

In some embodiments, machine vision manager 870 is configured to run machine vision models in order to detect faults within the XR environment 651. Various types of machine vision models can be run. For example, rule-based machine vision models may be executed. Rule-based approaches may determine an equipment type (e.g., by template matching) and/or determine an alignment issue related to the determined equipment type. Neural network-based machine vision models may also be run. For example, a CNN may be used to detect wiring inconsistencies. If a fault is detected, correction generator 884 may be used generate virtual objects that represent the fault and/or a correction to the fault. For example, an indication, skin, etc. of the fault could be located (e.g., on the at least partial transparent display of AR headset 602) so that it appears proximate to, or overlaying the real-world object.

Figure 48:
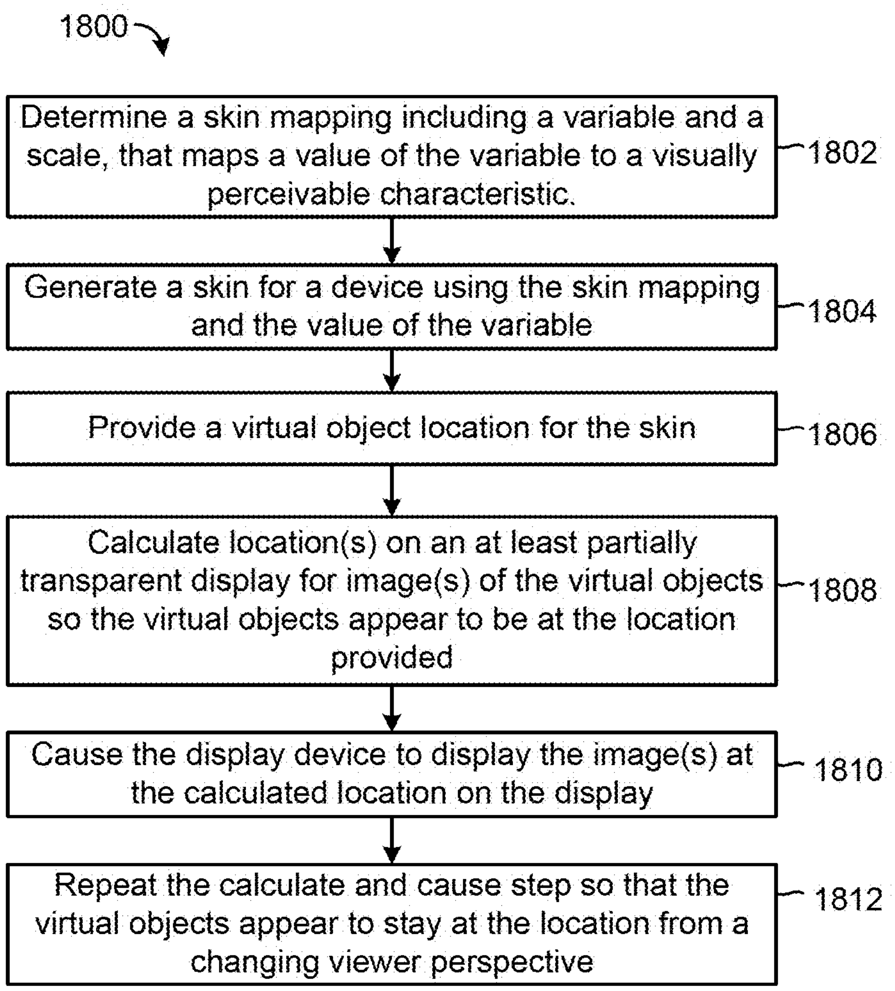
FIG. 48 is a flow diagram for generating skins within an extended reality environment, according to some embodiments.

FIG. 48 shows sequence of operations 1800 for generating an XR environment 651 with skins representing a non-visual attribute (e.g., a variable difficult to perceive visually by a human) with a visually perceivable characteristic (e.g., through a mapping), according to some embodiments. Sequence 1800, for example, can be performed by XR enabled plant operations system 600. Examples of non-visual attribute include, but are not limited to, small vibrations, temperature, magnetic field, electric field, component wear, electrical current, electrical voltage, speed, rotational speed, an age of the device or a component thereof, a status of the device or the component thereof, a health metric of the device or the component thereof, or a calculation based on several variables related to the device. The skin can include a characteristic that can be perceived visually (e.g., color, color saturation, brightness, transparency, significant shake to the skin, a deformation to the surface of the skin) according to some embodiments.

In some embodiments, sequence 1800 includes determining a skin mapping, including a variable and a scale, that maps a value of the variable to a visually perceivable characteristic. in step 1802. A color scale, for example, may map the value to a color hue and/or saturation. In some embodiments, the variable may be a function of location around the equipment and the visually perceivable characteristic may vary around the skin. For example, a color scale may be used to provide a heatmap related to the variable that is overlaid on the equipment. In some embodiments, sequence 1800 includes generating a skin for a device using the skin mapping and the value of the variable in step 1804. The value of the variable may be used with the skin mapping to determine the color (or other characteristic) for the skin and provided (e.g., to the virtual object manager 826) to be combined with a three-dimensional representation of the device. Sequence 1800 may include providing a virtual object location for the skin. The virtual object may be located in or near the region for which the constraint is active such that its location indicates or defines the region. For example, a stop sign may imply that the stop must occur prior to any mobile portion of an automation system crosses a line perpendicular to the face of the sign, or a speed limit sign may represent a speed limit that is active from starting at the sign and ending at the next speed limit sign (or an end of speed limit sign). In some embodiments, the region for which the constraint is active may also be included as part of the virtual object. For example, a stop sign may include a line indicative of where the stop must occur, or a speed limit sign may include an area for which the speed limit is active. In some embodiments, the region for which the constraint is active may be displayed optionally (e.g., when the virtual object is selected).

In some embodiments, sequence 1600 includes calculating locations(s) on an at least partially transparent display for image(s) of the virtual objects so that the virtual objects appear to be at the location provided, causing the display device to display the image(s) at the calculated location on the display, and repeating the calculations and display so that the virtual objects appear to stay at the location from a changing viewer perspective in steps 1608, 1610, and 1612 respectively. These steps have been previously discussed. Advantageously, displaying the virtual objects on an AR headset with an at least partially transparent display allows the operator to view the virtual objects with the real-world objects in the XR environment 651. However, similar steps can be performed to view the XR environment 651 on an opaque screen with a recreation (e.g., by displaying images from a camera) of the real-world environment on the display.

Configurations and Exemplary Embodiments

A system or module is described as configured to perform a function (or described as performing the function) may include embodiments for which the system or module is configured to cause the performance of the function (or is causing the performance of the function). A system or module is described as configured to cause the performance of a function (or described as causing the performance of a function) may include embodiments for which the system or module is configured to perform the function (or is performing the function). Accordingly, a system or module may be embodied by a circuit containing a memory device and processor to perform a function or may be embodied by a memory device storing instructions to cause the performance of the function and may be described with an of the previously mentioned forms.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A system for monitoring and troubleshooting an automation system in an extended-reality environment with virtual objects using a display device having an at least partially transparent display, the system comprising:

one or more memory devices having instructions stored thereon that, when executed by one or more processors, cause the one or more processors to perform operations comprising:

obtaining historical location data indicating historical locations for a portion of the automation system at a plurality of historical times;

causing the display device to display the virtual objects representing the portion of the automation system on the at least partially transparent display such that the virtual objects appear at locations in the extended-reality environment based on the historical location data for a first historical time when viewed from a changing viewer perspective through the at least partially transparent display; and updating the locations at which the virtual objects appear in the extended-reality environment based on the historical location data for subsequent historical times such that the virtual objects appear to be moving between the historical locations in the extended-reality environment.

2. The system of claim 1, wherein the locations are updated at a rate such that time appears to progress faster or slower than real time.

3. The system of claim 2, the operations further comprising storing a time of an event of interest, wherein the locations are updated at the rate such that time appears to progress slower than real time for a time period proximate the time of the event.

4. The system of claim 1, the operations further comprising storing a plurality of times of events of interest and receiving, from a viewer, a selected time of the plurality of times for which to provide the historical location data.

5. The system of claim 1, the operations further comprising interpolating between stored samples of the historical location data to determine the locations at which the virtual objects appear in the extended-reality environment.

6. The system of claim 5, wherein the interpolating comprises at least one of:

linear interpolation;

spline interpolation;

curve fitting; or using a dynamic system model to obtain best estimates of the locations.

7. The system of claim 1, wherein the extended-reality environment comprises real-world devices displayed at current locations and the virtual objects displayed at the historical locations, the operations further comprising indicating the real-world devices of the extended-reality environment that are not updated based on the historical location data.

8. The system of claim 1, wherein the extended-reality environment comprises a fixed volume that appears to remain in a fixed location in the extended-reality environment when viewed from the changing viewer perspective through the at least partially transparent display, wherein the virtual objects appear to remain within the fixed volume of the extended-reality environment as the virtual objects move between the historical locations and are shown from a perspective of a virtual camera that moves between the historical locations along with the virtual objects.

9. The system of claim 1, wherein the extended-reality environment comprises a fixed volume that appears to remain in a fixed location in the extended-reality environment when viewed from the changing viewer perspective through the at least partially transparent display, wherein the virtual objects are positioned within the fixed volume in the extended-reality environment and a location of the fixed volume differs from an actual location of the portion of the automation system represented by the virtual objects in the fixed volume.

10. One or more non-transitory computer-readable storage media having instructions stored thereon that, when executed by one or more processors, cause the one or more processors to:

obtain historical location data indicating historical locations for a portion of an automation system at a plurality of historical times;

cause a display device to display virtual objects representing the portion of the automation system on an at least partially transparent display such that the virtual objects appear at locations in an extended-reality environment based on the historical location data for a first historical time when viewed from a changing viewer perspective through the at least partially transparent display; and update the locations at which the virtual objects appear in the extended-reality environment based on the historical location data for subsequent historical times such that the virtual objects appear to be moving between the historical locations in the extended-reality environment.

11. The computer-readable storage media of claim 10, wherein the locations are updated at a rate such that time appears to progress faster or slower than real time.

12. The computer-readable storage media of claim 11, the instructions causing the one or more processors to store a time of an event of interest, wherein the locations are updated at the rate such that time appears to progress slower than real time for a time period proximate the time of the event.

13. The computer-readable storage media of claim 10, the instructions causing the one or more processors to store a plurality of times of events of interest and receiving, from a viewer, a selected time of the plurality of times for which to provide the historical location data.

14. The computer-readable storage media of claim 10, the instructions causing the one or more processors to interpolate between stored samples of the historical location data to determine the locations at which the virtual objects appear in the extended-reality environment.

15. The computer-readable storage media of claim 14, wherein the interpolating comprises at least one of:

linear interpolation;

spline interpolation;

curve fitting; or a simulation of the portion of the automation system.

16. The computer-readable storage media of claim 10, the instructions causing the one or more processors to indicate, on the at least partially transparent display, real-world devices of the extended-reality environment that are not updated based on the historical location data.

17. The computer-readable storage media of claim 10, wherein the extended-reality environment comprises a fixed volume that appears to remain in a fixed location in the extended-reality environment when viewed from the changing viewer perspective through the at least partially transparent display, wherein the virtual objects appear to remain within the fixed volume of the extended-reality environment as the virtual objects move between the historical locations and are shown from a perspective of a virtual camera that moves between the historical locations along with the virtual objects.

18. A system for monitoring and troubleshooting an automation system in a virtual-reality environment with virtual objects using a headset display device having an at least partially transparent display, the system comprising:

one or more memory devices having instructions stored thereon that, when executed by one or more processors, cause the one or more processors to perform operations comprising:

causing the headset display device to display the virtual objects representing a portion of the automation system on the at least partially transparent display such that the virtual objects appear at locations in the virtual-reality environment based on historical location data for a time when viewed from a changing viewer perspective through the at least partially transparent display;

interpolating between stored samples of the historical location data to determine the locations at which the virtual objects appear; and updating the locations at which the virtual objects appear based on subsequent historical location data.

19. The system of claim 18, wherein the locations are updated at a rate such that time appears to progress faster or slower than real time.

20. The system of claim 19, the operations further comprising storing a time of an event of interest, wherein the locations are updated at the rate such that time appears to progress slower than real time for a time period proximate the time of the event.

* * * * *